United States Patent
Howard et al.

(10) Patent No.: US 12,418,252 B2
(45) Date of Patent: Sep. 16, 2025

(54) ELECTROSTATIC CLUTCH FOR POWER TOOL

(71) Applicant: BLACK & DECKER INC., New Britain, CT (US)

(72) Inventors: Geoffrey S. Howard, Columbia, MD (US); Matthew J. Lazzaro, Forest Hill, MD (US); Tal Gottesman, Lutherville, MD (US); Thomas Streett, Fallston, MD (US); Daniel L. Schwarz, Timonium, MD (US); Parth Amrapurkar, Owings Mills, MD (US); Scott M. Rudolph, Aberdeen, MD (US); Kristian Brian Sims, Baltimore, MD (US)

(73) Assignee: Black & Decker Inc., New Britain, CT (US)

( * ) Notice: Subject to any disclaimer, the term of this patent is extended or adjusted under 35 U.S.C. 154(b) by 0 days.

(21) Appl. No.: 19/073,800

(22) Filed: Mar. 7, 2025

(65) Prior Publication Data
US 2025/0211140 A1  Jun. 26, 2025

Related U.S. Application Data

(63) Continuation of application No. PCT/US2023/073828, filed on Sep. 11, 2023.
(Continued)

(51) Int. Cl.
*H02N 13/00* (2006.01)
*B25B 21/02* (2006.01)
(Continued)

(52) U.S. Cl.
CPC ............. *H02N 13/00* (2013.01); *B25F 5/001* (2013.01); *B25B 21/026* (2013.01); *B25B 23/1453* (2013.01); *B25B 23/1475* (2013.01)

(58) Field of Classification Search
CPC ........ H02N 13/00; B25F 5/001; B25B 21/026
See application file for complete search history.

(56) References Cited

U.S. PATENT DOCUMENTS

| 5,897,454 A | 4/1999 | Cannaliato |
| 6,431,289 B1 | 8/2002 | Potter |

(Continued)

FOREIGN PATENT DOCUMENTS

| JP | 48-41469 | * 12/1973 |
| WO | 2022/221050 A1 | 10/2022 |

OTHER PUBLICATIONS

Patent Cooperation Treaty, International Search Report and Written Opinion issued in corresponding International Application No. PCT/US2023/073828, dated Apr. 4, 2024.
(Continued)

*Primary Examiner* — Daniel Jeremy Leeds
(74) *Attorney, Agent, or Firm* — Brake Hughes Bellermann LLP

(57) ABSTRACT

A power tool includes an electrostatic clutch assembly disposed between a motor and an end effector. A control circuit causes a first voltage to be applied to a first electrode of the electrostatic clutch assembly and a second voltage to be applied to a second electrode of the electrostatic clutch assembly, the first voltage being different from the second voltage, generating a first attractive force between the first and second electrodes, causing a shaft and a clutch housing to be coupled to each other when a torque on one of the shaft or the clutch housing is less than or equal to a first threshold value, and allowing the one of the shaft or the clutch housing to rotationally slip relative to the other of the shaft or the clutch housing when the torque on the one of the shaft or the clutch housing exceeds the first threshold value.

20 Claims, 33 Drawing Sheets

Related U.S. Application Data

(60) Provisional application No. 63/406,063, filed on Sep. 13, 2022.

(51) Int. Cl.
  *B25B 23/145* (2006.01)
  *B25B 23/147* (2006.01)
  *B25F 5/00* (2006.01)

(56) References Cited

U.S. PATENT DOCUMENTS

| | | |
|---|---|---|
| 6,491,111 B1 | 12/2002 | Livingston et al. |
| 7,452,304 B2 | 11/2008 | Hagan et al. |
| 9,494,200 B2 | 11/2016 | Kelleher et al. |
| 10,138,953 B1 | 11/2018 | Koenig et al. |
| 10,220,500 B2 | 3/2019 | Lim et al. |
| 10,406,662 B2 | 9/2019 | Leh et al. |
| 10,663,016 B2 | 5/2020 | Schmitz et al. |
| 11,260,515 B2 | 3/2022 | Ito |
| 2019/0107157 A1 | 4/2019 | Schmitz et al. |

OTHER PUBLICATIONS

Patent Cooperation Treaty, International Preliminary Report on Patentability issued in PCT/US2023/073828, pp. 1-15, Mar. 1, 2025.
International Search Report and Written Opinion issued in corresponding International Application No. PCT/US2023/073828, dated Apr. 4, 2024.

* cited by examiner

ELECTROSTATIC CLUTCH FOR POWER TOOL

CROSS-REFERENCE TO RELATED APPLICATIONS

This patent application is a continuation of International Application No. PCT/US2023/073828, entitled "ELECTROSTATIC CLUTCH FOR POWER TOOL", filed Sep. 11, 2023, which claims priority to U.S. Provisional Patent Application Ser. No. 63/406,063 ("the '063 Provisional Patent Application") entitled "ELECTROSTATIC CLUTCH FOR POWER TOOL", filed Sep. 13, 2022. The entireties of these applications are incorporated herein by reference.

FIELD

The present patent application relates to power tools and electrostatic clutches/mechanisms for power tools.

BACKGROUND

Many power tools, such as power drills, power drivers, power fastening tools and/or other power tools, have a mechanical clutch that interrupts power transmission to the output spindle/shaft when the output torque exceeds a threshold value of a maximum torque. U.S. Pat. No. 9,494,200, which is incorporated by reference in the patent application in its entirety, provides an exemplary prior art mechanical clutch. Such a mechanical clutch is a purely mechanical device that breaks a mechanical connection in the transmission to prevent torque from being transmitted from the motor to the output spindle/shaft of the power tool. Clutches or slip clutches are generally used in the power tools to provide torque limited application at the working bit. Traditional slip clutches have been executed mechanically with balls, springs, and clutch plates. In these mechanical clutches, the maximum torque threshold value may be user adjustable, often by a clutch collar that is attached to the power tool between the power tool and the tool holder/chuck. The user may rotate the clutch collar among a plurality of different positions for different maximum torque settings. The components of the mechanical clutches, however, tend to wear over time, and add excessive bulk and weight to a power tool.

In order to save length and cost, some power tools additionally or alternatively include an electronic clutch. Such an electronic clutch electronically senses the output torque (e.g., via a torque transducer) or infers the output torque (e.g., by sensing another parameter such as current drawn by the motor). U.S. Pat. No. 10,220,500, which is incorporated by reference in the present patent application its entirety, provides an exemplary prior art electronic clutch. When the electronic clutch determines that the sensed output torque exceeds a threshold value, power transmission to the output shaft/spindle may be interrupted or reduced, e.g., mechanically (e.g., by actuating a solenoid to break a mechanical connection in the transmission) and/or electrically (e.g., by interrupting or reducing current delivered to the motor, and/or by actively braking the motor). Existing electronic clutches may be overly complex and/or inaccurate. For example, some electronic clutches are inaccurate because they sense current at the motor module to estimate the applied torque at the working bit. Intermediary elements between the motor and current controller (e.g., the motor & transmission) also may result in latency in sensing torque and introduce inaccuracies.

Other type of clutches, such as electromagnetic clutches may feature fast activation and moderate torque density, but may require continuous electrical power to stay active. Magnetorheological clutches may be able to sense large torques, but may be heavy and may require continuous power to remain active. Because of power requirements, both of these systems may require large batteries or tethered electrical connections.

SUMMARY

The present patent application provides power tools and electrostatic clutches/mechanisms for power tools.

One aspect of the present patent application provides a power tool. The power tool may include a power tool housing, a motor received in the power tool housing and configured to be driven by a power source, an end effector configured to perform an operation on a workpiece, an electrostatic clutch assembly, and a control circuit. The electrostatic clutch assembly may be disposed in the power tool housing and may be between the motor and the end effector. The electrostatic clutch assembly may comprise a shaft, a first electrode and a second electrode axially arranged along an axial direction of the shaft, the first electrode and the second electrode being substantially parallel and adjacent to each other, a dielectric layer arranged between the first electrode and the second electrode; and a clutch housing containing the first electrode, the second electrode, and at least a portion of the shaft. The first electrode may be non-rotatably coupled to the clutch housing and may be axially movable relative to the clutch housing. The second electrode may be non-rotatably coupled to the shaft and may be axially movable relative to the shaft. The control circuit may be disposed in the power tool housing and may be operatively cooperable with the electrostatic clutch assembly. The control circuit causes a first voltage difference to be applied between the first electrode and the second electrode, generating a first attractive force between the first and second electrodes, causing the shaft and the clutch housing to be coupled to each other when a torque on one of the shaft or the clutch housing is less than or equal to a first threshold value, and allowing the one of the shaft or the clutch housing to rotationally slip relative to the other of the shaft or the clutch housing when the torque on the one of the shaft or the clutch housing exceeds the first threshold value.

The shaft and the clutch housing may be non-rotatably coupled to each other when the torque on the shaft is less than or equal to the first threshold value. The first electrode may be one of a plurality of first electrodes in the electrostatic clutch assembly. The second electrode may be one of a plurality of second electrodes in the electrostatic clutch assembly. The first electrode and the second electrode may form an electrode pair. The electrode pair may be one of a plurality of electrode pairs that are axially arranged along the axial direction of the shaft. The plurality of electrode pairs may be substantially parallel to each other.

Each first electrode of the plurality of electrode pairs may include an annular plate member, and each second electrode of the plurality of electrode pairs may include an annular plate member.

Each first electrode of the plurality of electrode pairs may have a first surface and a second surface and each second electrode of the plurality of electrode pairs may have a first surface and a second surface that is facing the first surface of each first electrode. The dielectric layer may be on at least one of the first surface of each first electrode or the second surface of each second electrode. The dielectric layer may be disposed on surfaces of the first electrode and the second electrode that face each other.

The electrostatic clutch assembly may further comprise a conductive material on at least one of the first surface of each first electrode or the second surface of each second electrode. The conductive material may be disposed on surfaces of each first electrode and each second electrode that face each other.

Each first electrode of the plurality of electrode pairs may be electrically couplable to the power source. Each second electrode of the plurality of electrode pairs may be electrically couplable to the power source.

The other of the shaft or the clutch housing may be configured to be rotationally driven by the motor.

The other of the shaft or the clutch housing may be operatively connected to the motor via an input shaft that is driven by a motor assembly. The motor assembly may include the motor and a planetary transmission. The other of the shaft or the clutch housing may be non-rotatably coupled to an output carrier of the planetary transmission. The other of the shaft or the clutch housing may be fixed to or integral with the output carrier of the planetary transmission. The other of the shaft or the clutch housing may be splined to the output carrier of the planetary transmission.

The motor assembly may include the motor and a planetary transmission. The clutch housing may be mounted to a ring gear of the planetary transmission. The ring gear may be in an output stage of the planetary transmission.

The electrostatic clutch assembly may be disposed between an output shaft of the motor and an input member of a planetary transmission. The other of the shaft or the clutch housing may be splined to the output shaft of the motor and the one of the shaft or the clutch housing is fixed to a first stage sun gear of the planetary transmission. The other of the shaft or the clutch housing may be fixed to or integral with the output shaft of the motor and the one of the shaft or the clutch housing is fixed to a first stage sun gear of the planetary transmission.

The one of the shaft or the clutch housing of the electrostatic clutch assembly may be configured to rotationally drive the end effector that is mounted to an output spindle of the power tool. The one of the shaft or the clutch housing may be integral with or fixed to the output spindle of the power tool. The one of the shaft or the clutch housing may be splined to the output spindle of the power tool.

The end effector may include a tool holder that is configured to receive a tool bit portion therein. The shaft may have a first portion and a second portion. One of the first portion and the second portion of the shaft may be operatively connected to each second electrode of the plurality of electrode pairs. The other of the first portion and the second portion of the shaft may be operatively connected to the output spindle of the power tool. The power tool may include a power drill.

The end effector may be mounted to an output spindle of the power tool. The power tool may include the motor, and an impact mechanism that may be configured to apply intermittent rotational impacts to the output spindle. The impact mechanism may be a rotational impact mechanism.

The impact mechanism may comprise a Pott-type impact mechanism, and wherein the other of the shaft or the clutch housing is operatively coupled to an output of the Pott-type impact mechanism. The Pott-type impact mechanism may comprise a cam shaft rotationally driven by the motor, a hammer received at least partially over the cam shaft and operatively coupled to the cam shaft to be movable axially and rotationally relative to the cam shaft, an anvil, and a spring axially biasing the hammer toward the anvil. When the torque is at or below a threshold value, the cam shaft, the hammer, and the anvil rotate in unison. When the torque exceeds the threshold value, the hammer moves axially and rotationally along the cam shaft to apply rotational impacts to the anvil. The other of the shaft or the clutch housing may be operatively coupled to the anvil.

The impact mechanism may include a twin hammer impact mechanism. The other of the shaft or the clutch housing may be operatively coupled to an output of the twin hammer impact mechanism. The motor may be a pneumatic motor. The motor may be an electric motor.

The impact mechanism may include an oil pulse impact mechanism. The other of the shaft or the clutch housing may be operatively coupled to an output of the oil pulse impact mechanism.

The electrostatic clutch assembly may be configured to receive an input torque from the impact mechanism and produce an output torque in response thereto, the output torque being limited to a maximum threshold value and transmitted to the output spindle of the power tool. The maximum threshold value may be a fixed value. The maximum threshold value may be configured to be adjusted dynamically. The maximum threshold value may be a variable value. The maximum threshold value may be a function of time.

Another aspect of the present patent application provides a power tool. The power tool may comprise a power tool housing, a motor received in the power tool housing and configured to be driven by a power source, an output spindle at least partially received in and rotatable relative to the power tool housing, an impact mechanism, an electrostatic clutch assembly, and a control circuit. The impact mechanism may be operatively coupled with the motor and may be configured to be driven thereby. The impact mechanism may be configured to generate intermittent rotational impacts that are transmitted to the output spindle of the power tool. The electrostatic clutch assembly may be disposed in the power tool housing and may be between the impact mechanism and the output spindle. The electrostatic clutch assembly may comprise a shaft, a first electrode and a second electrode axially arranged along an axial direction of the shaft, the first electrode and the second electrode being substantially parallel to each other, and a clutch housing containing the first electrode, the second electrode and at least a portion of the shaft. The first electrode may be non-rotatably coupled to the clutch housing and is axially movable relative to the clutch housing. The second electrode may be non-rotatably coupled to the shaft and is axially movable relative to the shaft. The control circuit may be disposed in the power tool housing and may be operatively cooperable with the electrostatic clutch assembly. The control circuit causes a first voltage difference to be applied between the first electrode and the second electrode, generating a first attractive force between each of the first and second electrodes, causing the shaft to rotate together with the clutch housing when a torque on the shaft is less than or equal to a first threshold value and causing the shaft to rotationally slip relative to the clutch housing when the torque on the shaft exceeds the first threshold value. The electrostatic clutch assembly is configured to receive an input torque from the impact mechanism and produce an output torque in response thereto, the output torque being limited to a maximum threshold value and transmitted to the output spindle of the power tool.

The maximum threshold value may be a fixed value. The maximum threshold value may be configured to be adjusted dynamically. The maximum threshold value may be a variable value. The maximum threshold value may be a function of time. The input torque from the impact mechanism may vary in magnitude and/or duration. The output torque from the impact mechanism may vary in duration and may be constant in magnitude.

The impact mechanism may be a rotational impact mechanism.

The impact mechanism may comprise a Pott-type impact mechanism that includes a cam shaft rotationally driven by the motor, a hammer received at least partially over the cam shaft and operatively coupled to the cam shaft to be movable axially and rotationally relative to the cam shaft, an anvil, and a spring axially biasing the hammer toward the anvil. One of the shaft or the clutch housing is operatively coupled to an output of the Pott-type impact mechanism.

The impact mechanism may comprises a Pott-type impact mechanism that includes a cam shaft rotationally driven by the motor, a hammer received at least partially over the cam shaft and operatively coupled to the cam shaft to be movable axially and rotationally relative to the cam shaft, an anvil, and a spring axially biasing the hammer toward the anvil. One of the shaft or the clutch housing is operatively coupled to the anvil.

The impact mechanism may include a twin hammer impact mechanism. One of the shaft or the clutch housing is operatively coupled to an output of the twin hammer impact mechanism.

The motor may be a pneumatic motor. The motor may be an electric motor.

The impact mechanism may include an oil pulse impact mechanism. One of the shaft or the clutch housing is operatively coupled to an output of the oil pulse impact mechanism.

The electrostatic clutch assembly may be configured to receive an input torque from the impact mechanism and produce an output torque in response thereto. The output torque may be limited to a maximum threshold value and transmitted to the output spindle of the power tool.

Yet another aspect of the present patent application provides a power tool. The power tool may comprise a power tool housing, a motor received in the power tool housing and configured to be driven by a power source, a planetary transmission configured to be rotationally driven by the motor, an end effector, an electrostatic clutch assembly, and a control circuit. The planetary transmission may include an output planet carrier as a rotational output of the transmission. The end effector may be configured to perform an operation on a workpiece. The electrostatic clutch assembly may be disposed in the power tool housing between the planetary transmission and the end effector. The electrostatic clutch assembly may include an input member non-rotatably coupled to a first electrode, an output member non-rotatably coupled to a second electrode, and a dielectric layer arranged between the first and second electrodes. The control circuit may be disposed in the power tool housing and may be operatively cooperable with the electrostatic clutch assembly to control power delivery from the power source to the first electrode and the second electrode. The input member may be operatively coupled to the output planet carrier of the transmission to rotate with the output planet carrier and the output member may be operatively coupled to the end effector to rotate with the end effector. The control circuit causes a first voltage difference to be applied between the first electrode and the second electrode, generating a first attractive force between the first and second electrodes, causing the output member and the input member to be coupled to each other when a torque on the output member is less than or equal to a first threshold value, and allowing the output member to rotationally slip relative to the input member when the torque on the output member exceeds the first threshold value.

The input member of the electrostatic clutch assembly may be fixed to or integral with the output carrier of the planetary transmission. The input member of the electrostatic clutch assembly may be splined to the output carrier of the planetary transmission.

The input member of the electrostatic clutch assembly may be coupled to a ring gear of the planetary transmission.

The ring gear may be in an output stage of the planetary transmission.

The electrostatic clutch assembly may be disposed between an output shaft of the motor and an input member of the planetary transmission.

One of the shaft or the clutch housing may be fixed to a first stage sun gear of the planetary transmission and the other of the shaft or the clutch housing may be splined to the output shaft of the motor and the one of the shaft or the clutch housing is fixed to a first stage sun gear of the planetary transmission.

One of the shaft or the clutch housing may be fixed to a first stage sun gear of the planetary transmission and the other of the shaft or the clutch housing may be fixed to or integral with the output shaft of the motor and the one of the shaft or the clutch housing is fixed to a first stage sun gear of the planetary transmission.

Yet another aspect of the present patent application provides a power tool. The power tool may comprise a power tool housing, a motor received in the power tool housing and configured to be driven by a power source, an end effector configured to perform an operation on a workpiece, a planetary transmission configured to be rotationally driven by the motor, an electrostatic clutch assembly, and a control circuit. The planetary transmission may include a ring gear. The electrostatic clutch assembly may be disposed in the power tool housing between the planetary transmission and the end effector. The electrostatic clutch assembly may include a first member non-rotatably coupled to a first electrode, a second member non-rotatably coupled to a second electrode, and a dielectric layer arranged between the first and second electrodes. The control circuit may be disposed in the power tool housing and may be operatively cooperable with the electrostatic clutch assembly to control power delivery from the power source to the first electrode and the second electrode. The first member may be non-rotatably coupled to the ring gear and the second member may be non-rotatably coupled to the power tool housing. The control circuit causes a first voltage difference to be applied between the first electrode and the second electrode, generating a first attractive force between the first and second electrodes, causing the ring gear to remain stationary relative to the power tool housing, enabling torque transmission from the planetary transmission to the end effector, when a torque on the second member is less than or equal to a first threshold value, and allowing the ring gear to rotate relative to the power tool housing, interrupting torque transmission from the planetary transmission to the end effector, when the torque on the second member exceeds the first threshold value. The ring gear may be in an output stage of the planetary transmission.

Yet another aspect of the present patent application provides a power tool. The power tool may comprise a power source, a motor configured to be driven by the power source, an end effector configured to perform an operation on a workpiece, an electrostatic clutch assembly between the motor and the end effector, a control circuit, and a switch circuit. The electrostatic clutch assembly may comprise a first electrode and a second electrode that is substantially parallel and adjacent to each other; and a dielectric layer arranged between the first electrode and the second electrode. The control circuit may be operatively cooperable with the electrostatic clutch assembly to control power delivery from the power source to the first electrode and the second electrode. The control circuit causes a first voltage difference to be applied between the first electrode and the second electrode. The switch circuit may be operatively cooperable with the control circuit. The switch circuit may be configured to selectively apply power to the first electrode and the second electrode. The switch circuit may also be configured to change a voltage polarity of the first electrode and the second electrode, such that in a first configuration, the first electrode is at a first voltage at a first polarity and the second electrode is at a second voltage at a second polarity, and in a second configuration, the first electrode is at the first voltage at the second polarity and the second electrode is at the second voltage at the first polarity.

The switch circuit may further be configured to drain residual voltages from the first and second electrodes. The power tool may further comprise a sense circuit that is configured to sense a voltage potential measurement representative of a voltage difference between the first voltage applied to the first electrode and the second voltage applied to the second electrode. The sense circuit may be configured to provide the voltage potential measurement as an input to the control circuit. The control circuit may be configured to determine, based on the input, the first voltage to be applied to the first electrode and the second voltage to be applied to the second electrode.

The sense circuit may be configured to sense a current measurement representative of a current flow between the first electrode and the second electrode. The sense circuit may be configured to provide the current measurement as an input to the control circuit. The control circuit may be configured to determine, based on the input, the first voltage to be applied to the first electrode and the second voltage to be applied to the second electrode.

The sense circuit may be configured to sense a motor rotation speed measurement. The sense circuit may be configured to provide the motor rotation speed measurement as an input to the control circuit. The control circuit may be configured to determine, based on the input, the first voltage to be applied to the first electrode and the second voltage to be applied to the second voltage.

The sense circuit may be configured to sense a reaction torque measurement. The sense circuit may be configured to provide the reaction torque measurement as an input to the control circuit. The control circuit may be configured to determine an error using the reaction torque measurement and an applied torque. The control circuit may be configured to determine, based on the error, the first voltage to be applied to the first electrode and the second voltage to be applied to the second electrode.

The sense circuit may be configured to sense a torque setting interface measurement. The sense circuit may be configured to provide the torque setting interface measurement as an input to the control circuit. The control circuit may be configured to determine, based on the input, the first voltage to be applied to the first electrode and the second voltage to be applied to the second electrode.

Yet another aspect of the present patent application provides a method of operating a power tool. The power tool may comprise a motor, an electrostatic clutch assembly, an output spindle, and a control circuit. The electrostatic clutch assembly may comprise a first electrode, a second electrode and a dielectric layer arranged between the first electrode and the second electrode. The electrostatic clutch assembly may be positioned between the motor and the output spindle. The method of operating a power tool comprises actuating the motor; applying a first voltage difference between the first electrode and the second electrode; controlling the motor to increase a torque applied to the output spindle until the torque applied to the output spindle reaches a first threshold value. One of the first electrode and the second electrode rotationally slips relative to the other of the first electrode and the second electrode when the torque on the output spindle exceeds the first threshold value. The method of operating a power tool may also comprise initiating a protective action upon detecting that one of the first electrode and the second electrode rotationally slips relative to the other of the first electrode and the second electrode.

The initiating a protective action may include discharging the first voltage from the first electrode and the second voltage from the second electrode. The initiating a protective action may include reducing or interrupting power delivery to the motor. The initiating a protective action may include braking the motor. The first threshold value may correspond to a holding force between the first electrode and a second electrode. The holding force may correspond to a magnitude of a difference between the first voltage and the second voltage. The holding force is proportional to a square of the magnitude of the difference between the first voltage and the second voltage.

These and other aspects of the present patent application, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. In one embodiment of the present patent application, the structural components illustrated herein are drawn to scale. It is to be expressly understood, however, that the drawings are for the purpose of illustration and description only and are not intended as a definition of the limits of the present patent application. It shall also be appreciated that the features of one embodiment disclosed herein can be used in other embodiments disclosed herein. As used in the specification and in the claims, the singular form of "a", "an", and "the" include plural referents unless the context clearly dictates otherwise.

DETAILED DESCRIPTION

Figure 1:
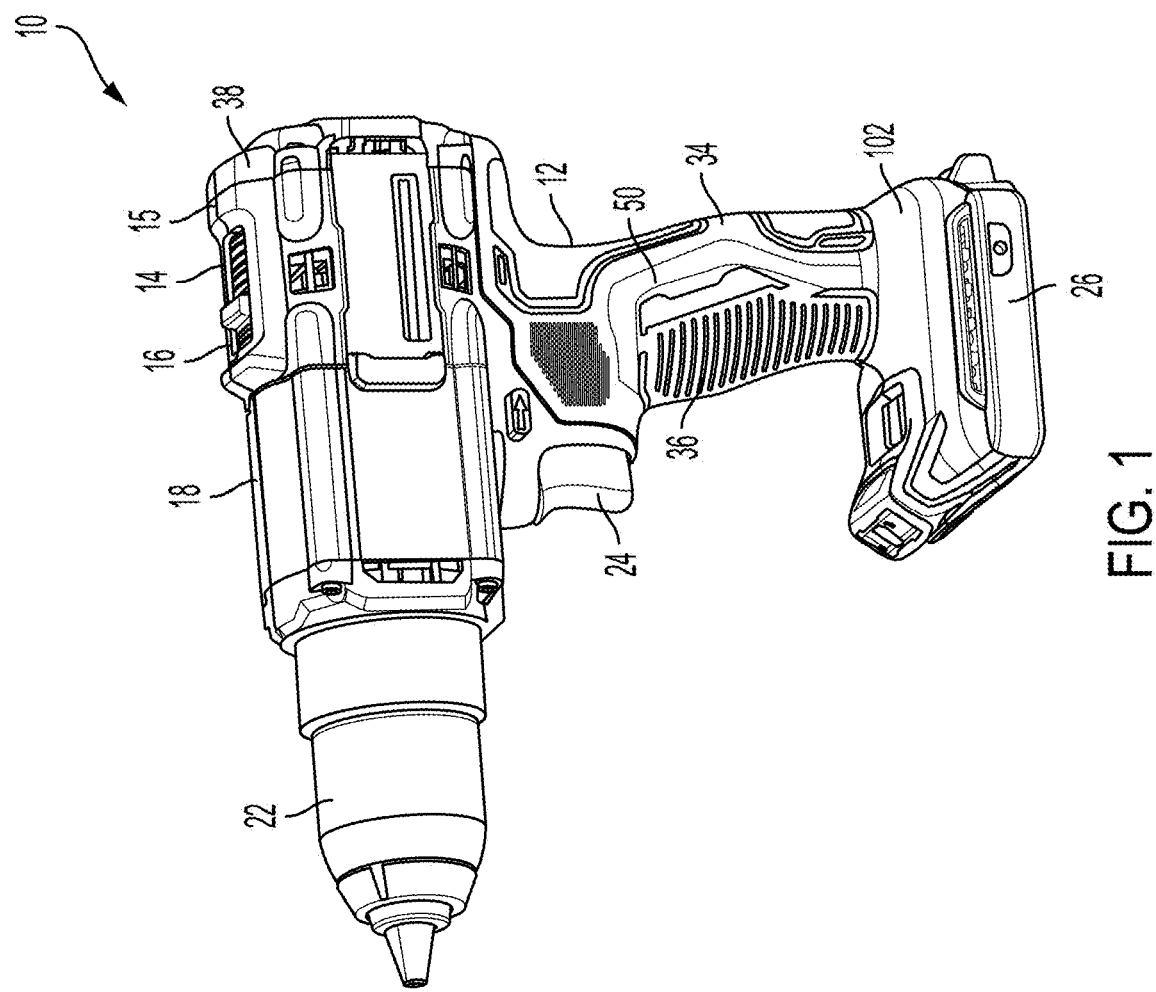
FIG. 1 shows an exemplary power tool according to various embodiments of the present patent application.

In an embodiment, the present patent application provides electrostatic clutches or electroadhesive clutches for power tools.

Referring to FIGS. 1-2, 6-8, and 10-20, the present patent application provides a power tool 10. As a person of ordinary skill in the art would appreciate, embodiments may include either a corded power tool/device or a cordless (battery operated) power tool/device. In one embodiment, the power tool 10 is a portable device.

In one embodiment, the power tool 10 is a power drill or drill/driver. The power tool 10 also may be a power screwdriver, a power fastener/fastening tool, a power driver, a power expansion tool, and/or other power devices/tools. An exemplary power drill 10 is shown in FIGS. 1-2, 6-8, and 10-14. In another embodiment, the power tool may be an impact tool/device. The power tool may be a power rotary impact tool, a power impact tool, a power impact driver, a power impact wrench, and/or other power devices/tools. An exemplary power impact tool is shown in FIGS. 15-20.

The power tool 10 includes a housing 12, a motor and transmission assembly 14, an end effector 22, an electrostatic clutch assembly 18, and a control circuit 50. The housing 12 may be interchangeably referred to as power tool housing. The housing 12 may have a power supply interface 102 configured to be coupled to a power source or an electrical power source 2, such as a battery pack 26. The motor and transmission assembly 14 is received in the housing 12. In one embodiment, the motor and transmission assembly 14 may include a motor 15 and a transmission 16, such as a multi-speed transmission assembly, that are received in the housing 12. In another embodiment, the motor and transmission assembly 14 may include the motor 15 that is received in the housing 12. The motor 15 is configured to be powered by the power source 26.

Referring to FIG. 1, the housing 12 may include a pair of mating handle shells 34 that cooperate to define a handle portion 36 and a drive train or body portion 38. In one embodiment, the body portion 38 includes a motor receiving portion and a transmission receiving portion. The handle portion 36 is configured to be coupled to the power source. In one embodiment, the power source includes a battery pack 26 or an AC power source (not shown) as described in detail below.

The power tool 10 may also include a trigger assembly 24. The trigger assembly 24 and the battery pack 26 are mechanically coupled to the handle portion 36 and are electrically coupled to the motor and transmission assembly 14 in a conventional manner that is not specifically shown but which is readily understood by and within the capabilities of a person of ordinary skill in the art. In one embodiment, the power tool 10 includes other sources of power (e.g., alternating current (AC) power cord/cable, compressed air source and/or other sources of power) coupled to a distal end of the handle portion 36. In one embodiment, the trigger assembly 24 is a variable speed trigger. The trigger assembly 24 may be configured to be operatively coupled to the housing 12 for selectively actuating and controlling the speed of the motor 15, for example, by controlling a pulse width modulation (PWM) signal delivered to the motor 15.

The power tool 10 may also include an output member/spindle 68 that is at least partially received in and rotatable relative to the power tool housing 12. The output member/spindle 68 may be interchangeably referred to as output shaft 68.

Figure 2:
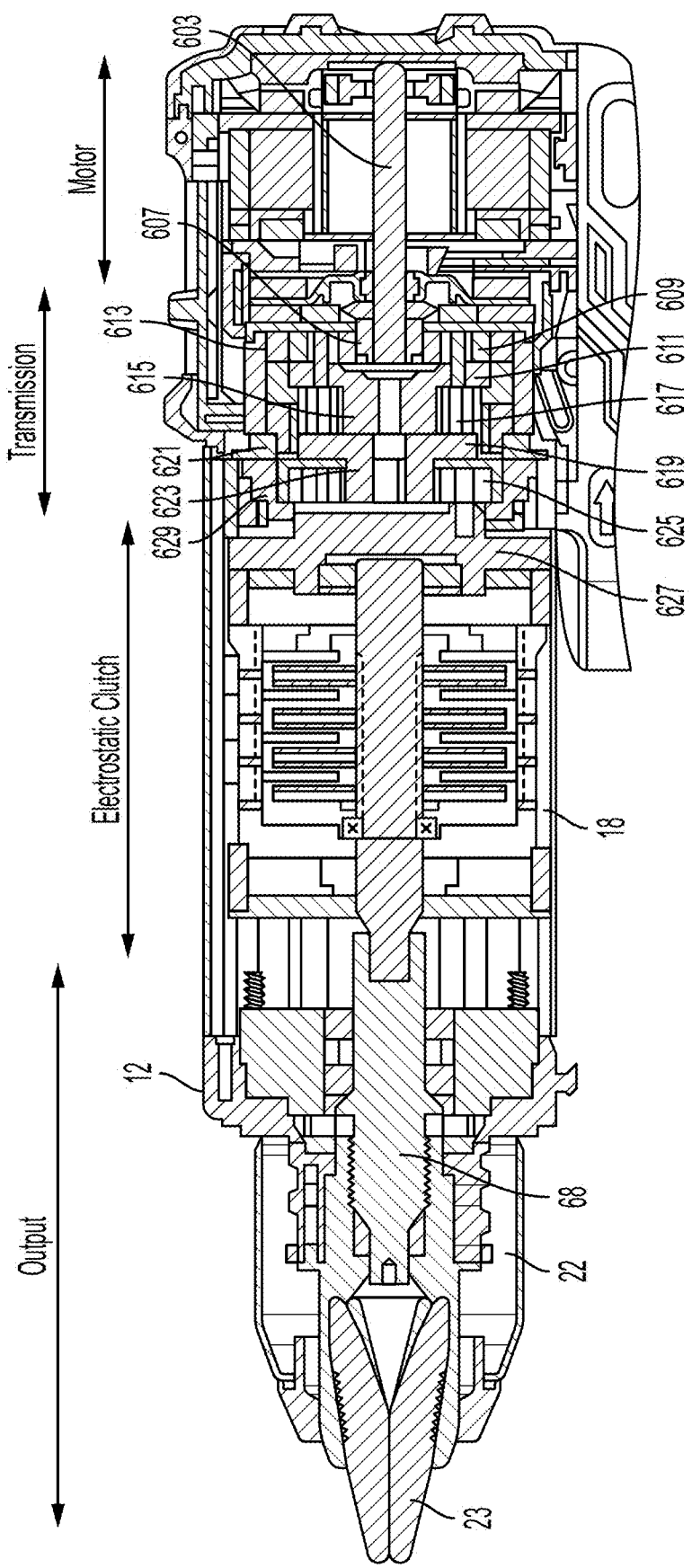
FIG. 2 shows a cross-sectional side view of a portion of the power tool of FIG. 1, the power tool having an exemplary electrostatic clutch assembly according to various embodiments of the present patent application.

The end effector 22 of the power tool 10 is mounted to the output spindle 68 of the power tool 10. The end effector 22 is operatively coupled to the housing 12 and is configured to perform an operation on a workpiece (not shown). As shown in FIG. 2, the end effector 22 may include or may be interchangeably referred to as chuck/tool holder 22. The tool holder 22 may be configured for holding a power tool accessory, such as a drill bit, an expansion bit, a screwdriver bit, and/or other tool bits. The tool holder 22 may include a tool bit holder portion, such as chuck jaws 23, therein. In one embodiment, the tool holder 22 may be a keyless chuck, although it should be understood that the tool holder can have other tool holder configurations such as a quick release tool holder, a hex tool holder, or a keyed tool holder/chuck.

A person of ordinary skill in the art would understand that several of the components of the power tool 10, such as the tool holder 22, the trigger assembly 24 and the battery pack 26, are conventional in nature and therefore need not be discussed in significant detail in the present patent application. Reference may be made to a variety of patents/patent publications for a more complete understanding of the conventional features of the power tool 10. Examples of such patents include U.S. Pat. No. 5,897,454 issued Apr. 27, 1999 and U.S. Pat. No. 6,431,289, issued Aug. 13, 2002, which are hereby incorporated by reference in their entirety in the present patent application.

The power tool or impact tool 10 may include an impact mechanism 402 that is operatively coupled to the motor 15 (e.g., via the transmission 16) and is configured to be driven thereby. The impact mechanism 402 is configured to generate intermittent rotational impacts that are transmitted to the output spindle 68 of the power tool 10. The impact mechanism 402 will be described in detail below with respect to FIGS. 15-20.

In one embodiment, the motor 15 is disposed/received in the housing 12. The motor 15 may be housed in the motor receiving portion of the drive train or body portion 38 of the housing 12. The motor 15 may include a rotatable output motor shaft, which extends into the transmission receiving portion of the drive train or body portion 38 of the housing 12. A motor pinion having a plurality of gear teeth may be coupled for rotation with the rotatable output motor shaft. The motor 15 may be a brushless or electronically commutated motor, although the motor 15 may be another type of brushed DC motor or universal motor. The trigger assembly 24 and battery pack 26 may cooperate to selectively provide electric power to the motor and transmission assembly 14 in a manner that is generally well known in the art so as to permit the user of the power tool 10 to control the speed and direction with which the rotatable output motor shaft rotates.

The motor output shaft extends from the motor 15 to the transmission 16, which transmits torque from the motor output shaft to one of a shaft 302 and a clutch housing 310 of the electrostatic clutch assembly 18, which transmits torque to the other of the shaft 302 and the clutch housing 310 of the electrostatic clutch assembly 18 and to the end effector 22. The electrostatic clutch assembly 18 and the shaft 302 and the clutch housing 310 of the electrostatic clutch assembly 18 are all described in detail below. The motor 15 is configured to provide a torque to one of the shaft 302 and the clutch housing 310 of the electrostatic clutch assembly 18 (e.g., via the transmission 16).

The transmission 16 may be housed in the transmission receiving portion of the drive train or body portion 38 of the housing 12. The transmission 16 may comprise a single speed transmission. The transmission 16 may comprise a multi-speed transmission having a plurality of gears and settings that allow the speed reduction through the transmission 16 to be changed, in a manner well understood to a person of ordinary skill in the art. The transmission 16 may include a multi-stage planetary gear set, with each stage having an input sun gear, a plurality of planet gears meshed with the sun gear and pinned to a rotatable planet carrier, and a ring gear meshed with and surrounding the planet gears. For each stage of the multi-stage planetary gear set, if a ring gear is rotationally fixed relative to the housing 12, the planet gears orbit the sun gear when the sun gear rotates, transferring power at a reduced speed to their planet carrier, thus causing a speed reduction through that stage. If a ring gear is allowed to rotate relative to the housing 12, then the sun gear causes the planet carrier to rotate at the same speed as the sun gear, causing no speed reduction through that stage. By varying which one or ones of the stages have the ring gears are fixed against rotation, the total amount of speed reduction through the transmission 16 can be controlled, and thus the speed setting of the transmission 16 (e.g., among high, medium, and low) can be adjusted. This adjustment of the speed setting is achieved via a shift ring that surrounds the ring gears and that is shiftable along an axis of the output shaft to lock different stages of the ring gears against rotation. The power tool 10 may include a speed selector switch for selecting the speed reduction setting of the transmission 16. The speed selector switch is operatively coupled to the shift ring by spring biased pins so that axial movement of the speed selector switch causes the axial movement of the shift ring. Further details regarding an exemplary multi-speed transmission is described in U.S. Pat. No. 7,452,304 which is incorporated by reference in its entirety in the present patent application. It should be understood that other types of single speed or multi-speed transmissions and other mechanisms for shifting the transmission among the speeds are within the scope of the present patent application. For example, the transmission may include a parallel axis transmission, a spur gear transmission, a right angle transmission. In yet further embodiments, there may be no transmission and the motor may directly drive the input shaft or clutch housing of the electrostatic clutch assembly.

In various embodiments, the electrostatic clutch assembly 18 of the present patent application may employ features of the electrostatic clutches disclosed in detail in U.S. Pat. Nos. 10,663,016; 10,138,953; and/or Japanese Utility Model Publication No. Sho 48-41469, each of which is incorporated by reference in their entirety in the present patent application. In another embodiment, the electrostatic clutch assembly 18 may include structure and operation as described in detail with respect to FIGS. 3-5B of the present patent application.

The electrostatic clutch assembly 18 may be disposed in the power tool housing 12. Referring to FIGS. 6-11 and 13-14, in some embodiments, the electrostatic clutch assembly 18 may be disposed between the transmission assembly 14 and the end effector 22.

Figure 12:
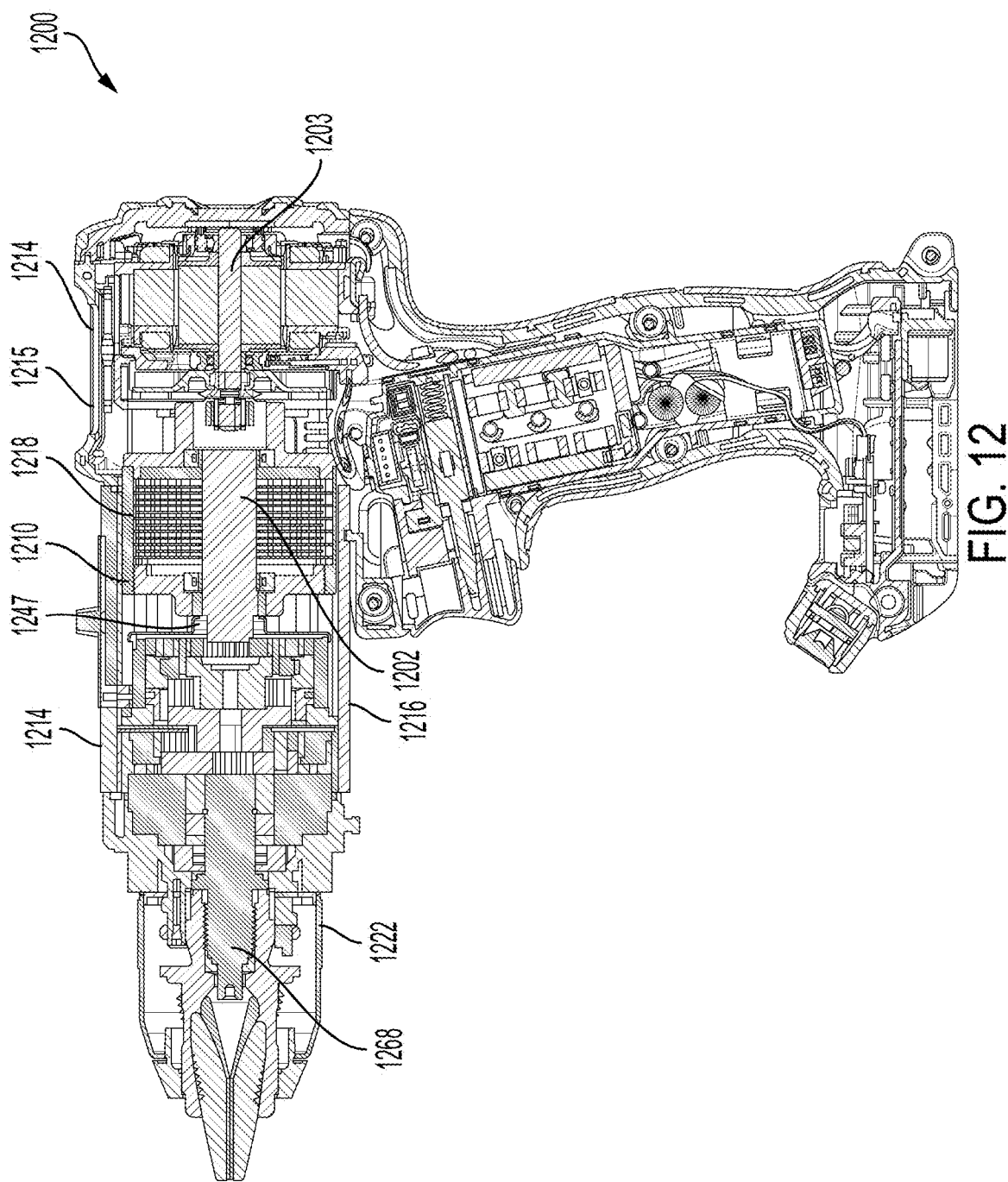
FIG. 12 shows a cross-sectional view of another exemplary embodiment of a power tool having an electrostatic clutch assembly according to various embodiments of the present patent application, where the electrostatic clutch is positioned between a motor and a transmission of the power tool.

Referring to FIG. 12, in another embodiment, the electrostatic clutch assembly 18 may be disposed between the transmission 16 and the motor 15.

Referring to FIGS. 15-20, in yet other embodiments, the electrostatic clutch assembly 18 may be disposed in the power impact tool housing 12 between an output spindle/shaft 68 and an impact mechanism of an impact power tool 10

Referring to FIGS. 3-5B, the electrostatic clutch assembly 18 comprises a shaft 302, a first electrode 304, a second electrode 306, a dielectric layer 308, and a clutch housing 310. The first electrode 304 and the second electrode 306 are axially arranged along an axial direction (e.g., AD-AD in FIG. 3) of the shaft 302 and/or the clutch housing 310.

The first electrode 304 and the second electrode 306 are substantially parallel and are disposed adjacent to each other. The first and second electrodes 304, 306 are generally planar. The first and second electrodes 304, 306 may generally have annular plate/disc shaped configurations.

One of the first electrode 304 and the second electrode 306 is mounted on the shaft 302. For example, in the illustrated embodiment in FIGS. 3-5B, the electrode 306 may be referred to as a shaft electrode. The shaft electrode 306 is mounted on the shaft 302 such that the second electrode 306 and the shaft 302 rotate together. That is, the shaft electrode 306 does not touch the clutch housing 310.

Figure 5:
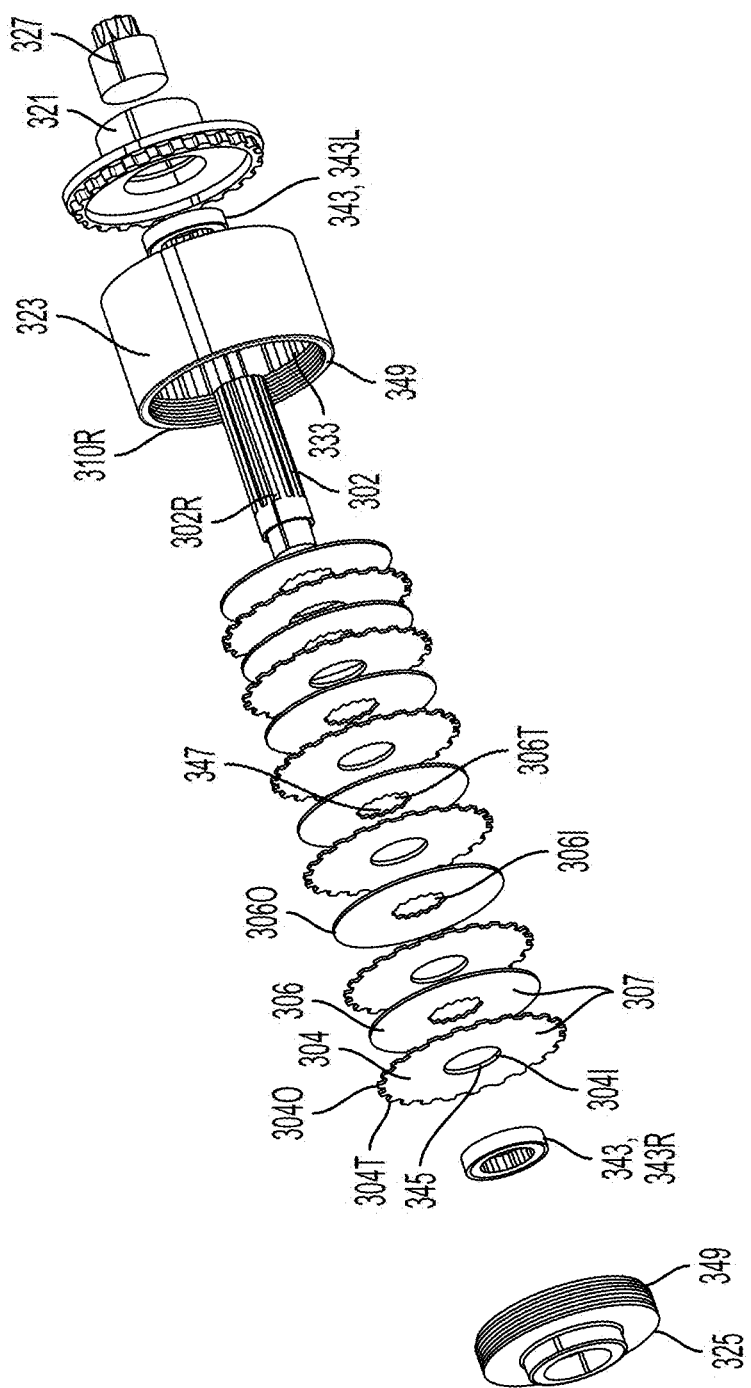
FIG. 5 shows an exploded view of the electrostatic clutch assembly of FIGS. 3 and 4 according to various embodiments of the present patent application.

Referring to FIG. 5, the shaft electrode 306 includes an annular plate/disc shaped configuration having outer circumference 3060 and an inner circumference 3061. The inner circumference 3061 of the shaft electrode 306 may include a toothed arrangement having teeth 306T that are configured to be received in grooves 302R (e.g., on an outer circumferential surface) on the shaft 302 when the second electrode 306 is mounted on the shaft 302. The second electrode 306 may also include an opening 347 that is configured to receive the shaft 302 therein.

The other of the first electrode 304 and the second electrode 306 is arranged along the shaft 302. The other of the first electrode 304 and the second electrode 306 may or may not touch the shaft 302. For example, in the illustrated embodiment in FIGS. 3-5B, the electrode 304 may be referred to as a housing electrode. The housing electrode 304 is mounted to the clutch housing 310 such that housing electrode 304 and the clutch housing 310 rotate together. That is, the housing electrode 304 does not touch the shaft 302.

The housing electrode 304 includes an annular plate/disc shaped configuration having outer circumference 3040 and an inner circumference 3041. The outer circumference 3040 of the housing electrode 304 has a toothed arrangement having teeth 304T that are configured to be received in grooves 310R on the inner (circumferential) surface 333 of the clutch housing 310 when the first electrode 304 is received in the clutch housing 310. The first electrode 304 may also include an opening 345 that is configured to receive the shaft 302 therein.

One of the first electrode 304 and the second electrode 306 may also be referred to as an input member/electrode of the electrostatic clutch assembly 18 that is configured to be rotationally driven by the motor and transmission assembly 14 or driven by the impact mechanism 402. That is, one of the first electrode 304 and the second electrode 306 along with the shaft 302 or clutch housing 310 to which it is non-rotatably coupled are configured to be rotationally driven by the motor and transmission assembly 14 or driven by the impact mechanism 402.

The other of the first electrode 304 and the second electrode 306 may also be referred to as an output member/electrode of the electrostatic clutch assembly 18 that is configured to rotationally drive the end effector 22. That is, the other of the first electrode 304 and the second electrode 306 along with the shaft 302 or clutch housing 310 to which it is non-rotatably coupled are configured to rotationally drive the end effector 22 via the output shaft/spindle 68.

The first electrode 304 is one of a plurality of first electrodes 304 in the electrostatic clutch assembly 18 and the second electrode 306 is one of a plurality of second electrodes 306 in the electrostatic clutch assembly 18. The first electrode 304 and the second electrode 306 form an electrode pair 307. The electrode pair 307 is one of a plurality of electrode pairs 307 that are axially arranged along the axial direction AD-AD of the shaft 302, and the plurality of electrode pairs 307 is substantially parallel to each other. The number of electrode pairs 307 (i.e., each including the first electrode 304 and the second electrode 306) may vary and may depend on the application.

As discussed above, each first electrode 304 of the plurality of electrode pairs 307 includes an annular plate member/configuration, and each second electrode 306 of the plurality of electrode pairs 307 includes an annular plate member/configuration.

In the illustrated embodiment of FIGS. 3-5B, each first electrode 304 is non-rotatably coupled to the clutch housing 310 (so that it will rotate with the clutch housing) and each second electrode 306 is non-rotatably coupled to the shaft 302 (so that it will rotate with the shaft 302).

The term axially movable may include an axial movement between two components. At least one of the electrodes 304, 306 is axially moveable relative to the other electrode 304, 306. In one implementation, the first electrode 304 is axially movable (i.e., along the axial direction (e.g., AD-AD in FIG. 3) of the shaft 302/the clutch housing 310) relative to the clutch housing 310, while the second electrode 306 is axially fixed to the shaft 302. In another implementation, the second electrode 306 is axially movable (i.e., along the axial direction (e.g., AD-AD in FIG. 3) of the shaft 302/the clutch housing 310) relative to the shaft 302, while the first electrode is axially fixed to the clutch housing 310. In yet another implementation, both the first electrode 304 is axially movable relative to the clutch housing 310 and second electrode 306 is axially movable relative to the shaft 302. In yet further implementations, the first electrode 304 may be axially fixed to the clutch housing 310, the second electrode 306 may be axially fixed to the shaft 302, and one or both of the clutch housing 310 and the shaft 302 may be axially moveable relative to the other of the clutch housing 310 and the shaft 302.

The term non-rotatably coupled may include two components that rotate together. As each first electrode 304 is non-rotatably coupled to the clutch housing 310, each first electrode 304 and the clutch housing 310 rotate together. Similarly, as each second electrode 306 is non-rotatably coupled to the shaft 302, each second electrode 306 and the shaft 302 rotate together.

International Patent Application No.: PCT/US2022/022346 ("PCT Application '346"), filed Mar. 29, 2022, titled "ELECTROSTATIC CLUTCH FOR POWER TOOL," which is hereby incorporated by reference in its entirety. As is disclosed in detail and is claimed in the PCT application '346, in an alternative embodiment, the electrostatic clutch assembly 18 may include a single electrode (e.g., one of the electrode 304 or 306) coupled to an input shaft and a single electrode (e.g., the other of the electrode 304 or 306) coupled to an output shaft, with no clutch housing, and at least one electrode 304, 306 axially moveable relative to the other electrode 304, 306.

Figure 3:
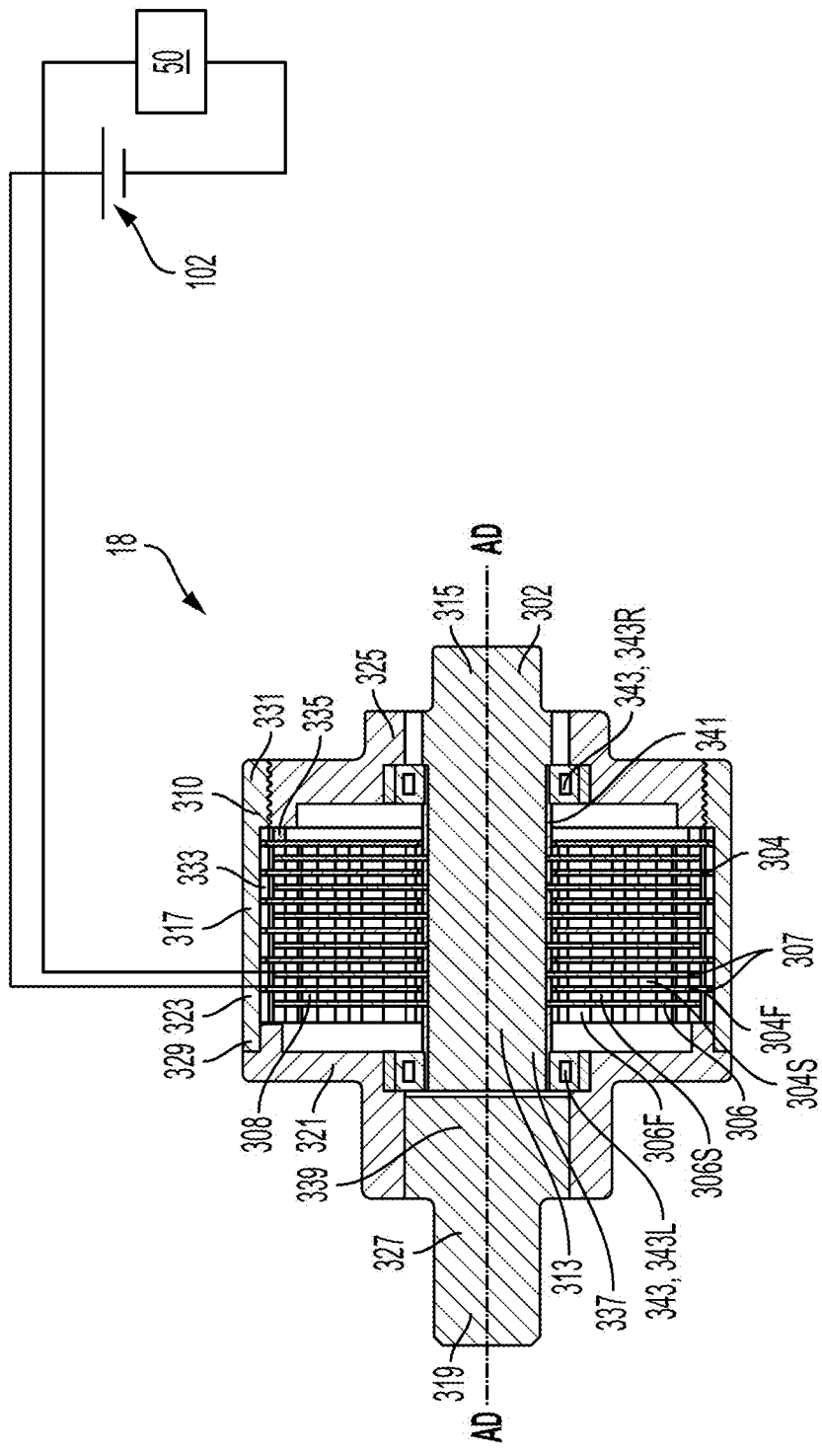
FIGS. 3 and 4 show cross-sectional views of an electrostatic clutch assembly according to various embodiments of the present patent application.
Figure 4:
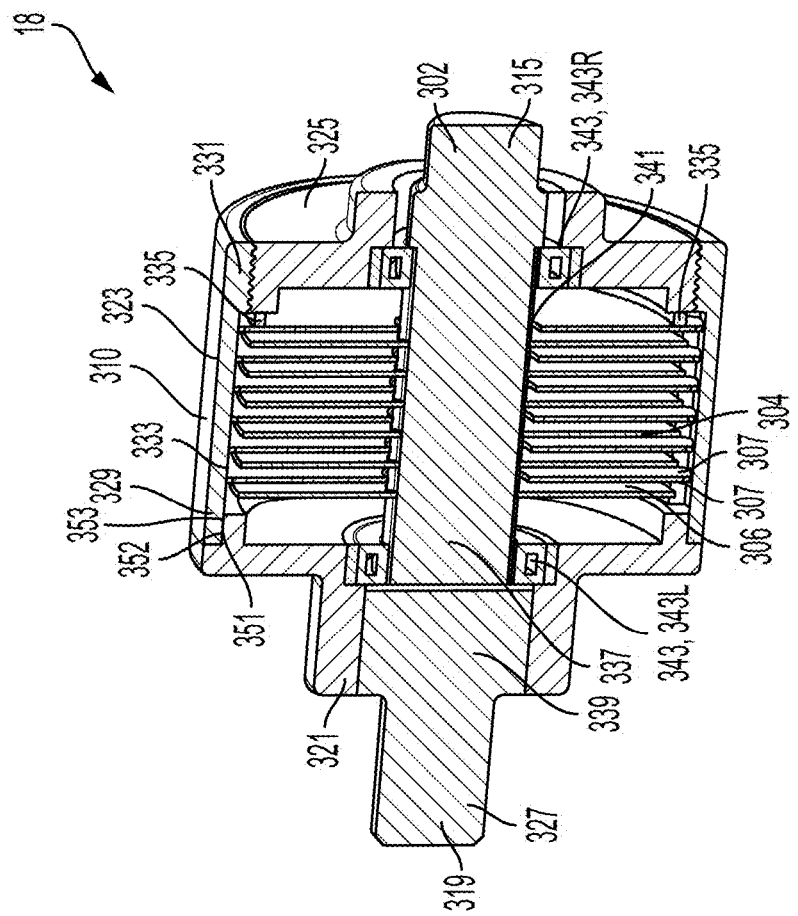

The first electrode 304 and the second electrode 306 are electrically couplable to the power source 102. In FIG. 3, only one first electrode 304 of the plurality of electrode pairs 307 and only one second electrode 306 of the plurality of electrode pairs 307 are shown electrically couplable to the power source 102 for sake of clarity and ease of understanding. A person of ordinary skill in the art would appreciate that each first electrode 304 of the plurality of electrode pairs 307 is electrically couplable to the power source 102 and each second electrode 306 of the plurality of electrode pairs 307 is electrically couplable to the power source 102.

In another embodiment, each first electrode 304 (and the clutch housing 310) and each second electrode 306 (and the shaft 302) are electrically couplable to the electrical power source 102 via brushes 371, springs 373, discs 363, 367, inner brush 365, etc. as described in detail below with respect to FIGS. 5A-5B.

The dielectric layer 308 is arranged between each first electrode 304 and each second electrode 306. The dielectric layer 308 separates each first electrode 304 and each second electrode 306. With a pair 307 of electrodes 304, 306, at least one electrode 304, 306 is covered in the dielectric material/layer 308 to maintain the gap between the conductive surfaces of the electrodes 304, 306. The two electrostatic films are always separated by the dielectric layer 308. The dielectric layer is very thin and has dimension in the order of microns. The dielectric layer 308 is a layer of dielectric material. If the dielectric layer is a layer of material 308, the dielectric layer of material 308 is layered over one or both of the electrodes 304, 306.

When the electrodes 304, 306 are energized, the dielectric layer 308 of one electrode 304, 306 is configured to touch the other electrode 304, 306. When the electrodes 304, 306 are energized, the dielectric layer 308 of one electrode 304, 306 is configured to touch the dielectric layer 308 of the other electrode 304, 306. When the electrodes 304, 306 are deenergized, there may be an air gap between the dielectric layer 308 on one electrode 304, 306 and the other electrode 304, 306. When the electrodes 304, 306 are deenergized, there may be an air gap between the dielectric layer 308 on one electrode 304, 306 and the dielectric layer 308 on the other electrode 304, 306. In one embodiment, it is not necessary for both electrodes 304, 306 to have a dielectric layer 308 and the electrostatic clutch assembly 18 works just fine, and maybe better, with a dielectric layer 308 on only one electrode 304, 306.

Referring to FIG. 3, each first electrode 304 of the plurality of electrode pairs 307 has a first surface 304F and a second surface 304S and each second electrode 306 of the plurality of electrode pairs 307 has a first surface 306F and a second surface 306S that is facing the first surface 304F of each first electrode 304. The dielectric layer 308 is on at least one of the first surface 304F of each first electrode 304 or the second surface 306S of each second electrode 306. The dielectric layer 308 is disposed on surface 304F of the first electrode 304 and surface 306S the second electrode 306 that face each other.

Each of the first electrode 304 and the second electrode 306 may include a substrate and an electrostatic layer/coating/film deposited thereon. Each of the facing surfaces 304F, 306S of the first electrode 304 and the second electrode 306 are coated with the electrostatic layer. In one embodiment, the electrostatic clutch assembly 18 may include a plurality of layers of electrostatic layers that are layered on top of one another for greater holding force.

Each of the first electrode 304 and the second electrode 306 may include a conductive material disposed on at least a portion thereof. In one embodiment, the conductive material is disposed beneath surfaces 304F, 306S of the first electrode 304 and the second electrode 306 that face each other. Each of the first electrode 304 and the second electrode 306 includes at least one conductive material/layer. The conductive material is disposed on surfaces 304F, 306S of each first electrode 304 and each second electrode 306 that face each other. The conductive material on at least one of the first surface 304F of each first electrode 304 or the second surface 306S of each second electrode 306.

Each of the first and second electrodes 304, 306 and/or the electrostatic layer/coating/film comprise a lightweight conductive material, such as aluminum-sputtered biaxially-oriented polyethylene terephthalate. Each of the first and second electrodes 304, 306 may include aluminum-sputtered BOPET (Bi-axially Oriented Polyethylene Terephthalate) film, also known as Mylar® film. The aluminum deposition acts as the conductive layer and the BOPET acts as the substrate. Aluminum-sputtered BOPET films of this type can have a thickness of around 25 microns. Despite the thin profile, the material is sufficiently strong to act as a force transmission component. In addition, very little electrode material is required to hold a charge, making thin and lightweight electrodes 304, 306 possible. In alternative embodiments, a single-layer, conductive electrode, such as a metallic foil, is used.

The electrostatic clutch assembly 18 may include a plurality of clutch settings. Each clutch setting may correspond to a desired output operation of the power tool 10. That is, the clutch setting of the electrostatic clutch 18 can be set by the user based on a desired output operation. For example, the desired output operation can include an amount of material to be removed from a workpiece. Each clutch setting may have the set or predetermined torque. Each clutch setting may be associated with a different clutch disengage torque (i.e., a torque at which the electrostatic clutch assembly 18 disengages to thereby prevent the transmission of torque transmission between the motor and transmission assembly 14 or the impact mechanism 402 and the output shaft 68). Each predetermined clutch setting may include a maximum clutch setting, a minimum clutch setting, and a plurality of intermediate clutch settings between the maximum and minimum clutch settings.

Each predetermined clutch setting may at least include a first configuration in which the shaft 302 and the clutch housing 310 of the electrostatic clutch assembly 18 are non-rotatably coupled to each other when a torque on the output spindle 68 is less than or equal to the predetermined clutch setting, and a second configuration in which the shaft 302 and the clutch housing 310 of the electrostatic clutch assembly 18 rotationally slip relative to each other when the torque on the output spindle 68 is greater than the predetermined clutch setting. The power tool 10 may also include a clutch setting switch or collar that may be used by a user so as to adjust a clutch setting of the electrostatic clutch assembly 18.

When a voltage above a certain minimum threshold is applied to the electrodes 304, 306, the electrodes 304, 306 are charged and electrostatically attract with an attractive force to non-rotatably couple to each other, such that the shaft 302 and the clutch housing 310 of the electrostatic clutch assembly 18 rotate together. Below the minimum threshold of the applied voltage, the electrodes 304, 306 are allowed to fully decouple so that one of the shaft 302 and the clutch housing 310 of the electrostatic clutch assembly 18 can rotate relative to the other of the shaft 302 and the clutch housing 310 of the electrostatic clutch assembly 18. Above the minimum threshold of voltage, the amount of holding force between the electrodes 304, 306 corresponds to the amount of voltage applied to the electrodes, such that the holding force increases when the voltage increases above the minimum threshold. In an implementation, the holding force is proportional to the square of the voltage applied to the electrodes. When a torque applied to the shaft 302 or the housing 310 exceeds a threshold amount that corresponds to the holding force between the electrodes 304, 306, the electrodes 304, 306 may slip or rotate relative to one another, which interrupts torque transmission between the shaft and the clutch housing. In one embodiment, the transitions between the states of the clutch being fully engaged and slipping may have an observable electrical signature/signal or may be sensed by another sensor, such as a Hall sensor, and may be transmitted to the power tool control module(s)/controller/control circuit 50, such that a response to this may be ceasing rotation of the power tool's motor 15 and/or discharging the electrostatic charge from the electrodes. In one embodiment, the torque transfer function may be descriptively a function of charge rather than voltage.

In one embodiment, depending on the amount of voltage applied to the electrodes 304, 306, the charge and their holding force can vary. There can be different clutch settings for different amounts of voltage applied to the electrodes 304, 306. The applied voltage corresponding to the torque at which the electrostatic clutch assembly 18 begins to slip or rotate is different for different clutch settings (e.g., greater applied voltage corresponds to greater torque or clutch setting).

Figure 5A:
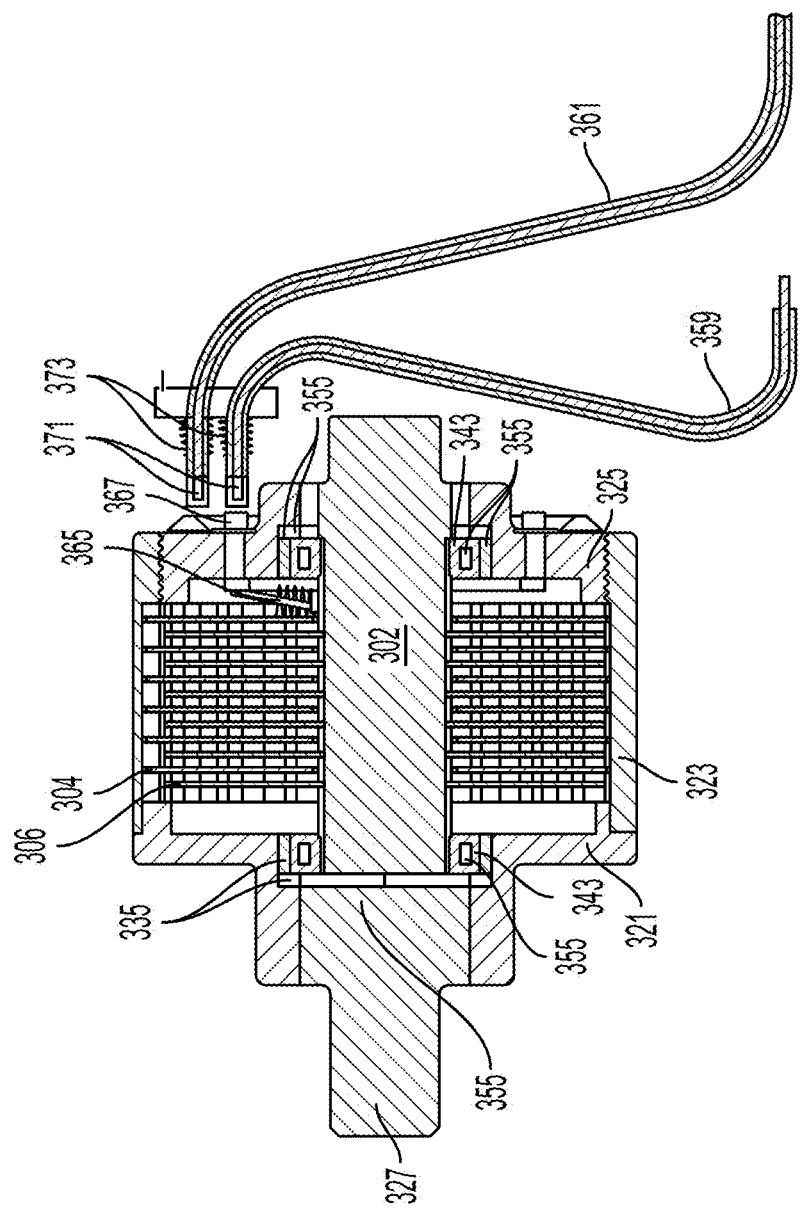
FIGS. 5A and 5B show additional cross-sectional views of the electrostatic clutch assembly of FIGS. 3 and 4, where some portions of the electrostatic clutch assembly are not shown in FIGS. 3-5B to better illustrate other portions of the electrostatic clutch assembly.

The electrostatic clutch assembly 18 may include positive and negative brushes 371 (as shown in FIG. 5A). In one embodiment, the first electrode 304 and the second electrode 306 are operatively coupled to one or more positive and negative brushes 371, respectively, through the shaft 302 and the clutch housing 310. For example, the first electrode 304 is coupled to a negative brush 371 via the clutch housing 310 and the second electrode 306 is coupled to a positive brush 371 via the shaft 302. In another embodiment, the first electrode 304 is coupled to a positive brush 371 via the clutch housing 310 and the second electrode 306 is coupled to a negative brush 371 via the shaft 302. The positive and negative brushes 371 are stationary relative to the tool housing 12. The positive and negative brushes 371 are configured to provide electrical current to charge the clutch housing 310, the shaft 302 and/or their respective electrodes 304, 306.

In one embodiment, one of the shaft 302 and the clutch housing 310 of the electrostatic clutch assembly 18 is proximate to the front end of the housing 12 and is operatively coupled to the tool holder 22 (e.g., via the output spindle 68 of the power tool 10) or to the output spindle 68 of the power tool 10. In one embodiment, one of the shaft 302 and the clutch housing 310 of the electrostatic clutch assembly 18 is configured to rotationally drive the end effector 22, which is mounted to the output spindle 68 of the power tool 10 and is configured to receive the tool bit portion 23 therein.

In one embodiment, one of the shaft 302 and the clutch housing 310 is integral with the output spindle 68 of the power tool 10. In another embodiment, one of the shaft 302 and the clutch housing 310 is fixed to the output spindle 68 of the power tool 10. In another embodiment, one of the shaft 302 and the clutch housing 310 is splined or otherwise removably coupled to the output spindle 68 of the power tool 10. A person of ordinary skill in the art would readily understand that splined herein refers to securing/connecting one of the shaft 302 and the clutch housing 310 to the output spindle 68, for example, by means of a spline arrangement.

In one embodiment, the other of the shaft 302 and the clutch housing 310 of the electrostatic clutch assembly 18 is operatively coupled to the impact mechanism 402, to the motor 15, to the transmission 16, or to the motor and transmission assembly 14. In one embodiment, the other of the shaft 302 and the clutch housing 310 of the electrostatic clutch assembly 18 is configured to be driven by the impact mechanism 402, the motor 15, the transmission 16, or the motor and transmission assembly 14. The operatively coupled connection between the other of the shaft 302 and the clutch housing 310 of the electrostatic clutch assembly 18 and the impact mechanism 402, the motor 15, the transmission 16, or the motor and transmission assembly 14 are shown in and described in detail below with respect to FIGS. 2, 6-8, and 10-20.

The clutch housing 310 may interchangeably referred to as can. The clutch housing 310 may be either the output or the input of the electrostatic clutch assembly 18. The clutch housing 310 contains the first electrode 304, the second electrode 306, the dielectric layer 308 between the first electrode 304 and the second electrode 306, and at least a portion of the shaft 302. The clutch housing 310 may also contain an inner brush 365, bearings 343, 343L, 343R, insulation 355 that is disposed around the bearings 343, 343L, 343R, and an elastic member 335 that is configured to pretension the first electrode 304 and the second electrode 306 as will be described in detail below.

The clutch housing 310 may include a first portion 317 and an opposing second portion 319. The clutch housing 310 may serve as either the input or the output of the electrostatic clutch assembly 18. When the clutch housing 310 serves as the input of the electrostatic clutch assembly 18, the shaft 302 serves as the output of the electrostatic clutch assembly 18. When the clutch housing 310 serves as the output of the electrostatic clutch assembly 18, the shaft 302 serves as the input of the electrostatic clutch assembly 18.

When the clutch housing 310 serves as the input of the electrostatic clutch assembly 18, in the illustrated embodiment, the second portion 319 of the clutch housing 310 is operatively coupled to the motor transmission assembly 14, to the motor 15, to the transmission 16 or to the impact mechanism 402, while the first portion 317 of the clutch housing 310 may be operatively connected to the one or more first electrodes 304 (i.e., each first electrode 304 of the plurality of electrode pairs 307).

When the clutch housing 310 serves as the output of the electrostatic clutch assembly 18, in the illustrated embodiment, the second portion 319 of the clutch housing 310 is operatively coupled to the tool holder 22 (e.g., via the output spindle 68 of the power tool 10) or to the output spindle 68 of the power tool 10, while the first portion 317 of the clutch housing 310 may be operatively connected to the one or more first electrodes 304 (i.e., each first electrode 304 of the plurality of electrode pairs 307).

Referring to FIGS. 3-5A, the clutch housing 310 may include a front/first end portion 321, a middle portion 323, a rear/second end portion 325 and a shaft member 327. The middle portion 323 may be configured to accommodate the plurality of electrode pairs 307 therein. The shaft member 327 may be pressed onto the front portion 321 of the clutch housing 310. At least a portion of the front portion 321 may be configured to receive at least a portion of the shaft member 327.

The front portion 321 and the middle portion 323 may be integrally formed. The front portion 321 and the middle portion 323 may be separately formed and connected to each other (e.g., at their end portions). One end 329 of the middle portion 323 may be connected to the front portion 321. An outer surface 351 of the front portion 321 may be configured to have connection portions 353 that are configured to engage/connect with connection portions 352 on the inner surface 333 of the middle portion 323.

The other end 331 of the middle portion 323 may be connected to the rear portion 325. The middle portion 323 and the rear portion 325 may be threadably connected (e.g., via screwed connections 349) to each other. The middle portion 323 and the rear portion 325 may be connected to each other by other releasably connection mechanisms as would be appreciated by a person of ordinary skill in the art.

The front portion 321, the middle portion 323, and the rear portion 325 are constructed and arranged to accommodate the plurality of electrode pairs 307 therein. The middle portion 323 and the rear portion 325 are also constructed and arranged to receive at least portion of the shaft 302 therein.

The front end portion 321, the middle portion 323, the rear end portion 325 and the shaft member 327 of the clutch housing 310 are all configured to provide a sealed arrangement for the electrostatic clutch assembly 18 and for the plurality of electrode pairs 307 accommodated therein.

The inner surface 333 of the middle portion 323 may be configured to non-rotatably couple each of the plurality first electrodes 304 to the clutch housing 310. The inner surface 333 of the middle portion 323 may also be configured to allow axial movement of each of the plurality first electrodes 304 relative to the clutch housing 310. In one embodiment, each of the plurality first electrodes 304 are toothed on the inner surface 333 of the middle portion 323.

As shown in FIG. 3, the electrostatic clutch assembly 18 may also include an elastic member 335 (e.g., a silicone rubber member) that is disposed in the clutch housing 310 and is configured to pretension the electrodes 304, 306 when the electrodes 304, 306 are received in the clutch housing 310.

The electrostatic clutch assembly 18 may also include two bearings 343 (e.g., right side bearing 343R and left side bearing 343L) that are positioned adjacent to the front portion 321 and the rear portion 325 of the clutch housing 310 when the electrostatic clutch assembly 18 is in its assembled configuration.

The shaft 302 is configured to extend through at least portions of the front portion 321, the middle portion 323, and the rear portion 325 of the clutch housing 310 and the bearings 343, 343R, 343L when the shaft 302 is received in the clutch housing 310. Also, referring to FIG. 4, one end 337 of the shaft 302 is configured to be adjacent one end 339 of the shaft member 327 when the shaft 302 is received in the clutch housing 310.

Outer (circumferential) surface 341 of the shaft 302 may be configured to non-rotatably couple each of the plurality second electrodes 306 to the shaft 302. The outer surface 341 of the shaft 302 is configured to allow axial movement of each of the plurality second electrodes 306 relative to the shaft 302. In one embodiment, each of the plurality second electrodes 306 are toothed on the outer surface 341 of the shaft 302.

The shaft 302 may include a first portion 313 and an opposing second portion 315. The shaft 302 may serve as either the input or the output of the electrostatic clutch assembly 18. When the shaft 302 serves as the input of the electrostatic clutch assembly 18, the clutch housing 310 serves as the output of the electrostatic clutch assembly 18. When the shaft 302 serves as the output of the electrostatic clutch assembly 18, the clutch housing 310 serves as the input of the electrostatic clutch assembly 18.

When the shaft 302 serves as the input of the electrostatic clutch assembly 18, in the illustrated embodiment, the second portion 315 of the shaft 302 is operatively coupled to the motor transmission assembly 14, to the motor 15, to the transmission 16 or to the impact mechanism 402, while the first portion 313 may be operatively connected to the one or more second electrodes 306 (i.e., each second electrode 306 of the plurality of electrode pairs 307).

When the shaft 302 serves as the output of the electrostatic clutch assembly 18, the second portion 315 of the shaft 302 is operatively coupled to the tool holder 22 (e.g., via the output spindle 68 of the power tool 10) or to the output spindle 68 of the power tool 10, while the first portion 313 of the shaft 302 may be operatively connected to the one or more second electrodes 306 (i.e., each second electrode 306 of the plurality of electrode pairs 307).

Figure 5B:
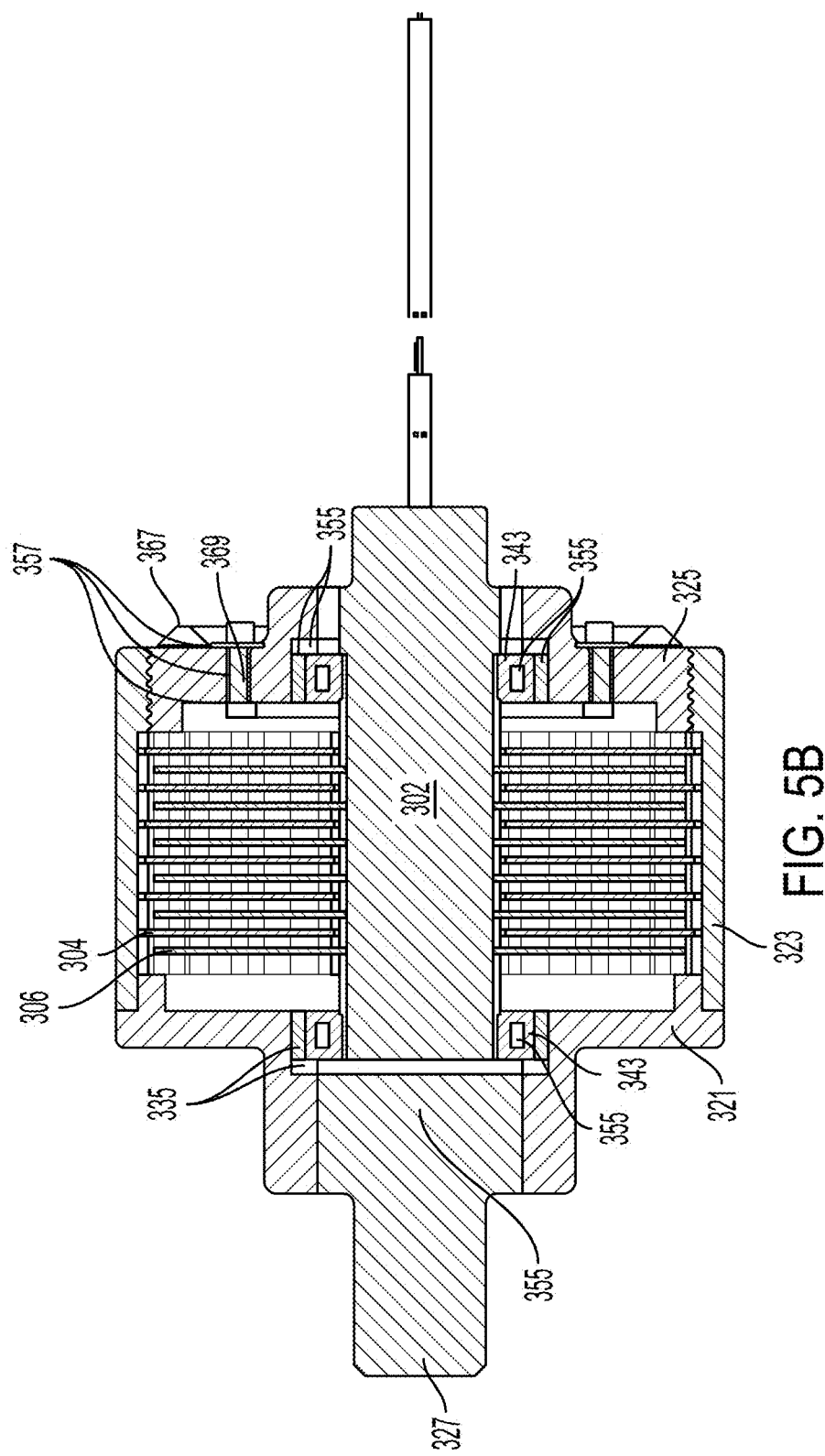

Referring to FIGS. 5A and 5B, the electrostatic clutch assembly 18 may also include insulation portions 355 positioned around the bearings 343. In one embodiment, the tool housing 12 is configured to insulate the electrostatic clutch assembly 18. In one embodiment, scaling arrangements, including but not limited to, gaskets with O-rings may be used, additionally or alternatively, to seal the clutch housing 310 of the electrostatic clutch assembly 18.

The electrostatic clutch assembly 18 may also include a wired connection 359 for a shaft and brush connection 365 (i.e., an inner brush 365), a disc 363 for the shaft and brush connection 365, and a connection 369 from the disc 363 to the inner brush 365. The shaft and brush connection 365 (i.e., the inner brush 365) is configured to connect the shaft 302 and the corresponding brush 371. The electrostatic clutch assembly 18 may also include a wired connection 361 for the clutch housing and brush connection and a disc 367 for the clutch housing and brush connection.

Also, the electrostatic clutch assembly 18 may include other insulation portions 357 between the clutch housing 310 and the brush connection components 365, 363, 369, and 367. The electrostatic clutch assembly 18 may also include the brushes 371 and springs 373.

The brushes 371 are configured to provide electrical current/deliver power from the power source 102 (e.g., battery pack 26 of the power tool 10 via the wired connections 359, 361) to charge the clutch housing 310, the shaft 302 and/or their respective electrodes 304, 306. The springs 373 are configured to maintain the connections between the wired connections 359, 361 and their respective brushes 371. The discs 363, 367 are configured to operatively connect the respective brushes 371 with either the clutch housing 310 or the shaft 302. The inner brush 365 is configured to operatively connect the disc 363 to the shaft 302. Thus, the power from the power source 102 (e.g., battery pack 26 of the power tool 10) is delivered to charge the clutch housing 310, the shaft 302 and/or their respective electrodes 304, 306 via the wired connections 359, 361, the brushes 371 (using the springs 373 and the inner brush 365), and the discs 363, 367.

The control circuit or controller 50 of the power tool 10 may be disposed in the power tool housing 12 and may be operatively cooperable with the electrostatic clutch assembly 18. The control circuit 50 may be interchangeably referred to as controller.

The control circuit or controller 50 may be operatively cooperable with the motor and transmission assembly 14 and the electrostatic clutch assembly 18 to control electrical power/power delivery from the power source 102 to the motor and transmission assembly 14 and to the first and second electrodes 304, 306.

The motor and transmission assembly 14 may have a second control circuit or controller that is independent of the first control circuit or controller 50 for the electrostatic clutch assembly 18 that is configured to control power delivery from the power source 102 to the motor and transmission assembly 14. In one embodiment, the second control circuit or controller is operatively connected to the first control circuit or controller 50. The second control circuit or controller is optional.

In one embodiment, the control circuit or controller 50 may be implemented as a microcontroller. In other embodiments, the control circuit or controller 50 may be implemented as, be part of, or include an electronic circuit, an Application Specific Integrated Circuit (ASIC), a processor (shared, dedicated, or group) and/or memory (shared, dedicated, or group) that execute one or more software or firmware programs, a combinational logic circuit, and/or other suitable components that provide the described functionality. For ease of reference, the control circuit or controller 50 is referred to generally herein as a control circuit 50; however, it should be understood that the term control circuit includes any of the aforementioned implementations.

The control circuit 50 may be configured to cause a first voltage difference to be applied between the first electrode 304 and the second electrode 306, generating a first attractive force between the first and second electrodes 304 and 306, causing the shaft 302 and the clutch housing 310 to be coupled to each other when a torque on one of the shaft 302 and the clutch housing 310 is less than or equal to a first threshold value, and allowing one of the shaft 302 and the clutch housing 310 to rotationally slip relative to the other of the shaft 302 and the clutch housing 310 when the torque on one of the shaft 302 and the clutch housing 310 of the electrostatic clutch assembly 18 exceeds the first threshold value. That is, the shaft 302 and the clutch housing 310 of the electrostatic clutch assembly 18 are non-rotatably coupled to each other when the torque on one of the shaft 302 and the clutch housing 310 of the electrostatic clutch assembly 18 is less than or equal to the first threshold value. For example, in one embodiment, the control circuit 50 may be configured to cause a first voltage to be applied to the first electrode 304 and a second voltage to be applied to the second electrode 306, the first voltage is different from the second voltage.

The control circuit 50 may be configured to cause a voltage difference or a voltage potential to be applied across the first and second electrodes 304, 306, generating a first attractive force between the first and second electrodes 304, 306. For example, a first voltage may be applied to the first electrode 304 and a second voltage with a polarity opposite a polarity the first voltage may be applied to the second electrode 306, generating a first attractive force between the first and second electrodes 304 and 306. That is, the control circuit 50 may cause the first voltage to be applied to the first electrode 304 and a different second voltage to be applied to the second electrode 306. This causes the shaft 302 and the clutch housing 310 to rotate together when a torque on one of the shaft 302 and the clutch housing 310 is less than or equal to a first threshold value and allows one of the shaft 302 and the clutch housing 310 to rotationally slip relative to the other of the shaft 302 and the clutch housing 310 when the torque on one of the shaft 302 and the clutch housing 310 exceeds the first threshold value, interrupting torque transmission between the shaft 302 and the clutch housing 310.

FIG. 3 shows operational connections between the control circuit 50, the electrical power source 102 and the first and second electrodes 304, 306 in accordance with an embodiment of the present patent application. FIGS. 5A and 5B show operational connections between the control circuit 50, the electrical power source 102 and the first and second electrodes 304, 306 in accordance with another embodiment of the present patent application (as described in detail throughout the present patent application). These operational connections may be configured to enable the control circuit 50, disposed in the housing 12 and operatively cooperable with the electrostatic clutch assembly 18, to control electrical power delivery from the electrical power source 102 to the first electrode 304 (e.g., via the clutch housing 310) and to the second electrode 306 (e.g., via the shaft 302), which in turn enables one of the first and second electrodes 304, 306 to be a positively charged electrode and the other of the first and second electrodes 304, 306 to be a negatively charged electrode. One of the first and second electrodes 304, 306 may be positively charged when a first voltage is applied to one of the first and second electrodes 304, 306 and the other of the first and second electrodes 304, 306 may be negatively charged when a second voltage may be applied to the other of the first and second electrodes 304, 306. In one embodiment, the second voltage is different from the first voltage. In one embodiment, the second voltage has a polarity opposite a polarity the first voltage. In yet another embodiment, the second voltage is different from and has a polarity opposite to a polarity the first voltage. In one embodiment, each pair of the first and second electrodes 304, 306 of the electrostatic clutch assembly 18 comprise a parallel-plate capacitor (i.e., two conducting plates 304, 306, with a dielectric therebetween). The plates are oppositely charged, as with any capacitor.

The controller 50 may include a current sensing circuit and a position/rotation speed sensing circuit. The current sensing circuit may include a current sensor (e.g., a shunt resistor) that senses the amount of current being delivered to the motor 15 and provides a current sensing signal corresponding to the sensed current to the controller 50. The position/rotation speed sensing circuit may include one or more position/rotation speed sensors that sense changes in the angular position of the motor output shaft and provides a signal corresponding to the angular rotation, speed, and/or acceleration of the motor 15 to the controller 50. In one embodiment, the position sensors are Hall sensors that are already part of a brushless motor. For example, the power tool 10 may include a three-phase brushless motor, where the rotor includes a four-pole magnet, and there are three Hall sensors positioned at 120° intervals around the circumference of the rotor. As the rotor rotates, each Hall sensor senses when one of the poles of the four-pole magnet passes over the Hall sensor. Thus, the Hall sensors can sense each time the rotor, and thus the motor output shaft, rotates by an increment of 60°. In one embodiment, the rotation sensing circuit can use the signals from the Hall sensors to infer or calculate the amount of angular rotation, speed, and/or acceleration of the rotor. For example, the rotation sensing circuit includes a clock or counter that counts the amount of time or the number of counts between each 60° rotation of the rotor. The controller 50 can use this information to calculate or infer the amount of angular rotation, speed, and/or acceleration of the motor 15. In one embodiment, the current sensing circuit, the current sensor, the position/rotation sensing circuit, and the position/rotation sensors are optional.

The power tool/system 10 may include a sensor configured to sense whether the electrostatic clutch assembly 18 is in a fully engaged mode, a fully disengaged mode, or is slipping and output a signal to the controller 50. In one embodiment, the controller 50, in response to the received signal from the sensor, is configured to stop the rotation of the motor and transmission assembly 14. The sensor may comprise one or more of a current sensor, a position sensor, and a rotational motion sensor. The power tool system 10 may include a sensor that senses when the electrostatic clutch assembly 18 slips or rotates (e.g., a current sensor or a rotational motion sensor as described above) and that causes the control circuit/controller 50 to de-energize the electrostatic films/layers after the electrostatic clutch assembly 18 slips or rotates.

Referring to FIGS. 2 and 6-9B, in an embodiment, the power tool 10 comprises a drill or drill/driver that includes a housing 12, a motor 15, a planetary transmission 16, an end effector 22, an electrostatic clutch assembly 18, and a control circuit 50. One of the shaft 302 and the clutch housing 310 of the electrostatic clutch assembly 18 is configured to be rotationally driven by the motor 15. One of the shaft 302 and the clutch housing 310 of the electrostatic clutch assembly 18 is operatively connected to the motor 15 via an input shaft/member that is driven by the motor 15. The motor assembly 14 may interchangeably referred to as the motor and transmission assembly and includes the motor 15 and the planetary transmission 16.

One of the shaft 302 and the clutch housing 310 of the electrostatic clutch assembly 18 may be non-rotatably coupled to an output carrier 627 of the planetary transmission 16. That is, one of the shaft 302 and the clutch housing 310 of the electrostatic clutch assembly 18 and the output carrier 627 of the planetary transmission 16 rotate together. In one embodiment, one of the shaft 302 and the clutch housing 310 of the electrostatic clutch assembly 18 is fixed to the output carrier 627 of the planetary transmission 16. In another embodiment, one of the shaft 302 and the clutch housing 310 of the electrostatic clutch assembly 18 is integral with the output carrier 627 of the planetary transmission 16. In yet another embodiment, one of the shaft 302 and the clutch housing 310 is splined to the output carrier 627 of the planetary transmission 16 by using a spline arrangement.

For example, a person of ordinary skill in the art would appreciate the planetary transmission 16 may include a multi-stage planetary gear set. Each stage includes an input sun gear, a plurality of planet gears meshed with the sun gear and pinned to a rotatable planet carrier, and a ring gear meshed with and surrounding the planet gears. For each stage of the multi-stage planetary gear set, if a ring gear is rotationally fixed relative to the housing 12, the planet gears orbit the sun gear when the sun gear rotates, transferring power at a reduced speed to their planet carrier, thus causing a speed reduction through that particular stage. If a ring gear is allowed to rotate relative to the housing 12, then the sun gear causes the planet carrier to rotate at the same speed as the sun gear, causing no speed reduction through that stage. By varying which one or ones of the stages have the ring gears are fixed against rotation, the total amount of speed reduction through the transmission 16 can be controlled, and thus the speed setting of the transmission 16 (e.g., among high, medium, and low) can be adjusted.

For example, referring to FIG. 2, the planetary transmission 16 may include a three-stage planetary gear set. The first stage planetary gear set includes an input sun gear 607, a plurality of planet gears 609 meshed with the sun gear 607 and pinned to a rotatable planet carrier 611, and a ring gear 613 meshed with and surrounding the planet gears 609. The input sun gear 607 is fixed to the output motor shaft 603 of the motor 15. The ring gear 613 is rotationally fixed relative to the housing 12 such that the planet gears 609 orbit the sun gear 607 when the sun gear 607 rotates, transferring power at a reduced speed to their planet carrier 611, thus causing a speed reduction through the first stage planetary gear set.

Similarly, referring to FIG. 2, the second stage planetary gear set includes a sun gear 615, a plurality of planet gears 617 meshed with the sun gear 615 and pinned to a rotatable planet carrier 619, and a ring gear 621 meshed with and surrounding the planet gears 617. The sun gear 615 is operatively connected to the first stage planet carrier 611. The ring gear 621 is rotationally fixed relative to the housing 12 such that the planet gears 617 orbit the sun gear 615 when the sun gear 615 rotates, transferring power at a reduced speed to their planet carrier 619, thus causing a speed reduction through the second stage planetary gear set.

Further similarly, referring to FIG. 2, the third stage planetary gear set includes a sun gear 623, a plurality of planet gears 625 meshed with the sun gear 623 and pinned to the rotatable planet carrier 627, and a ring gear 629 meshed with and surrounding the planet gears 625. The sun gear 623 is operatively connected to the second stage planet carrier 619. The ring gear 629 is rotationally fixed relative to the housing 12 such that the planet gears 625 orbit the sun gear 623 when the sun gear 623 rotates, transferring power at a reduced speed to their planet carrier 627, thus causing a speed reduction through the through stage planetary gear set. The third second stage planet carrier 627 may be interchangeably referred to as output carrier of the three-stage planetary gear set.

Although three stage planetary gear set is described here, the number of stages in the planetary gear set may vary and may depend on the application. In one embodiment, the planetary gear set may include one stage planetary gear set. In another embodiment, the planetary gear set may include two stage planetary gear set.

The planetary transmission 16 may be configured to be rotationally driven by the motor 15. The planetary transmission 16 includes the output planet carrier 627 as a rotational output of the transmission 16. As shown in FIG. 2, the electrostatic clutch assembly 18 is disposed in the power tool housing 12 between the planetary transmission 16 and the end effector 22. The electrostatic clutch assembly 18 includes the input member (e.g., one of the shaft 302 and the clutch housing 310) that is non-rotatably coupled to the first electrode 304, the output member (e.g., other of the shaft 302 and the clutch housing 310) that is non-rotatably coupled to the second electrode 306, and the dielectric layer 308 arranged between the first and second electrodes 304, 306. The control circuit 50 is disposed in the power tool housing 12 and is operatively cooperable with the electrostatic clutch assembly 18 to control power delivery from the power source 102 to the first electrode 304 and the second electrode 306.

The input member (e.g., one of the shaft 302 and the clutch housing 310) of the electrostatic clutch assembly 18 is operatively coupled to the output planet carrier 627 of the transmission 16 to rotate with the output planet carrier 627 and the output member (e.g., one of the shaft 302 and the clutch housing 310) is operatively coupled to the end effector 22 to rotate with the end effector 22. The control circuit 50 causes a first voltage to be applied to the first electrode 304 and a second voltage to be applied to the second electrode 306, the first voltage being different from the second voltage, generating a first attractive force between the first and second electrodes 304, 306, causing the input member (e.g., one of the shaft 302 and the clutch housing 310) of the electrostatic clutch assembly 18 and the output member (e.g., other of the shaft 302 or the clutch housing 310) of the electrostatic clutch assembly 18 to be coupled to each other when a torque on the output member (e.g., other of the shaft 302 and the clutch housing 310) is less than or equal to a first threshold value, and allowing the output member (e.g., other of the shaft 302 and the clutch housing 310) of the electrostatic clutch assembly 18 to rotationally slip relative to the input member (e.g., one of the shaft 302 and the clutch housing 310) of the electrostatic clutch assembly 18 when the torque on the output member (e.g., other of the shaft 302 and the clutch housing 310) of the electrostatic clutch assembly 18 exceeds the first threshold value.

Figure 6:
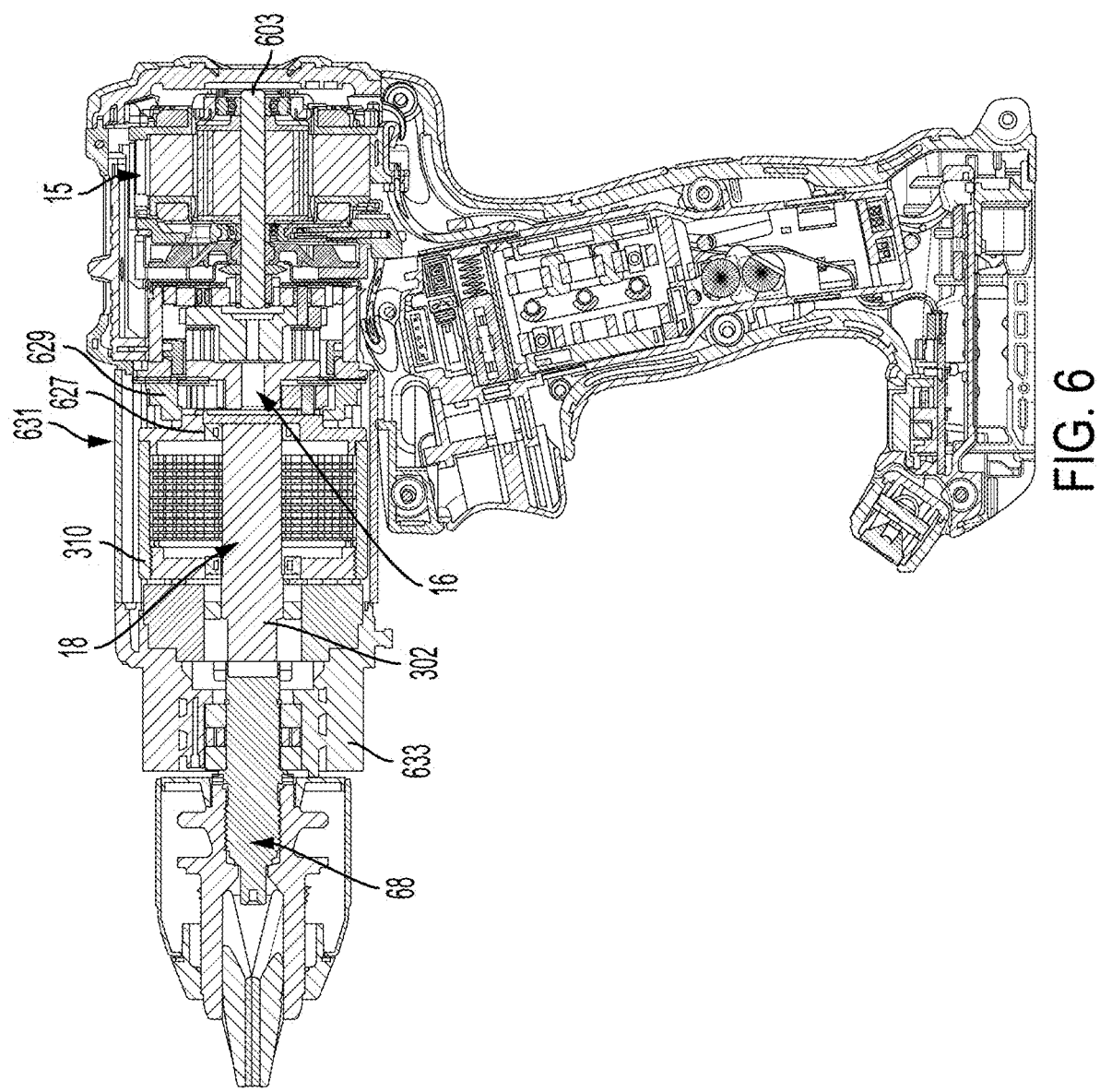
FIG. 6 shows another cross-sectional view of the exemplary power tool of FIG. 1, the power tool having an electrostatic clutch assembly according to various embodiments of the present patent application, where the electrostatic clutch assembly is configured to be integrally mounted to an output carrier of a planetary transmission.
Figure 7:
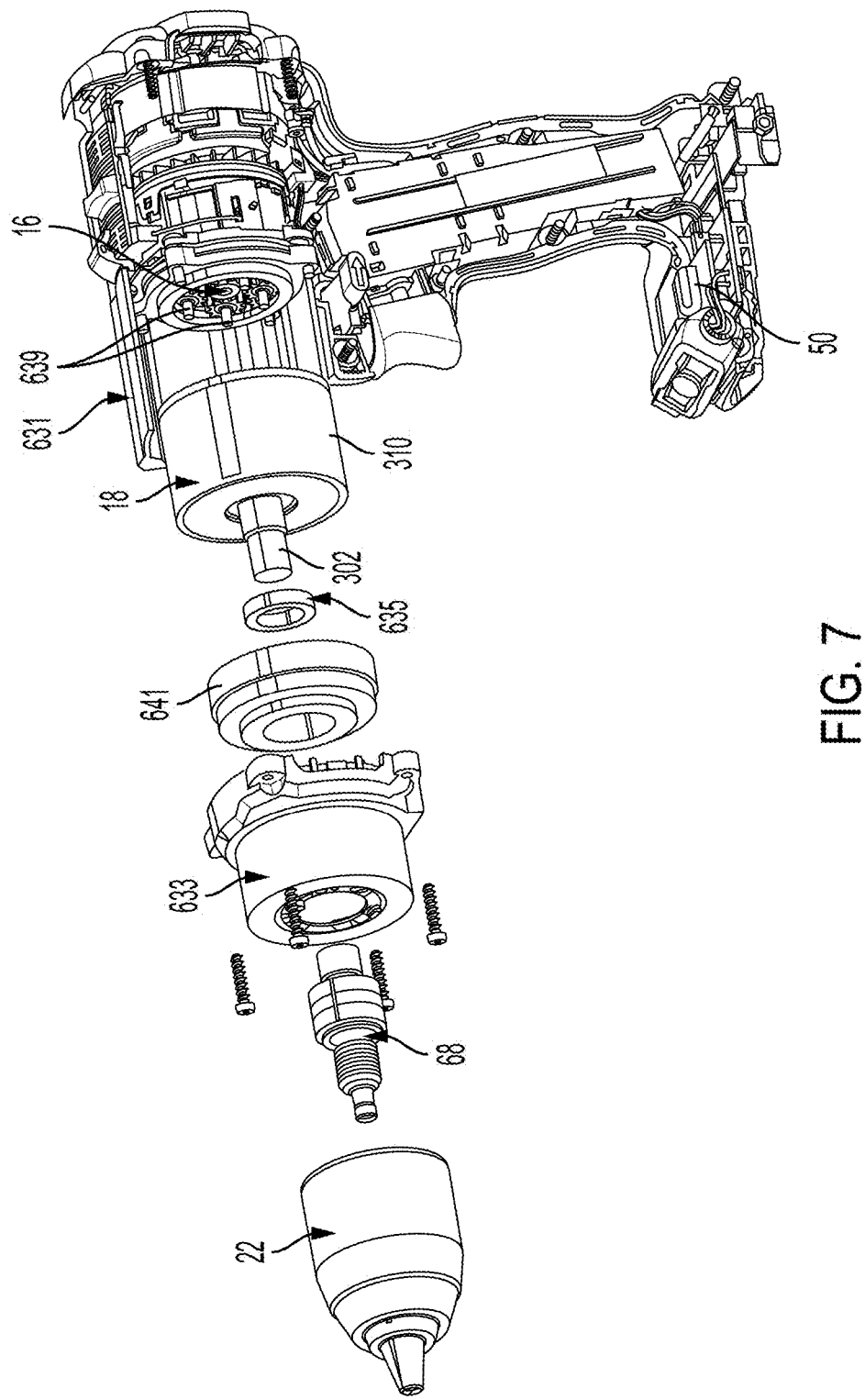
FIGS. 7-8 show partial exploded views of the power tool of FIG. 6, the power tool having the electrostatic clutch assembly according to various embodiments of the present patent application, where some portions of the power tool are not shown to better illustrate other portions of the power tool.
Figure 8:
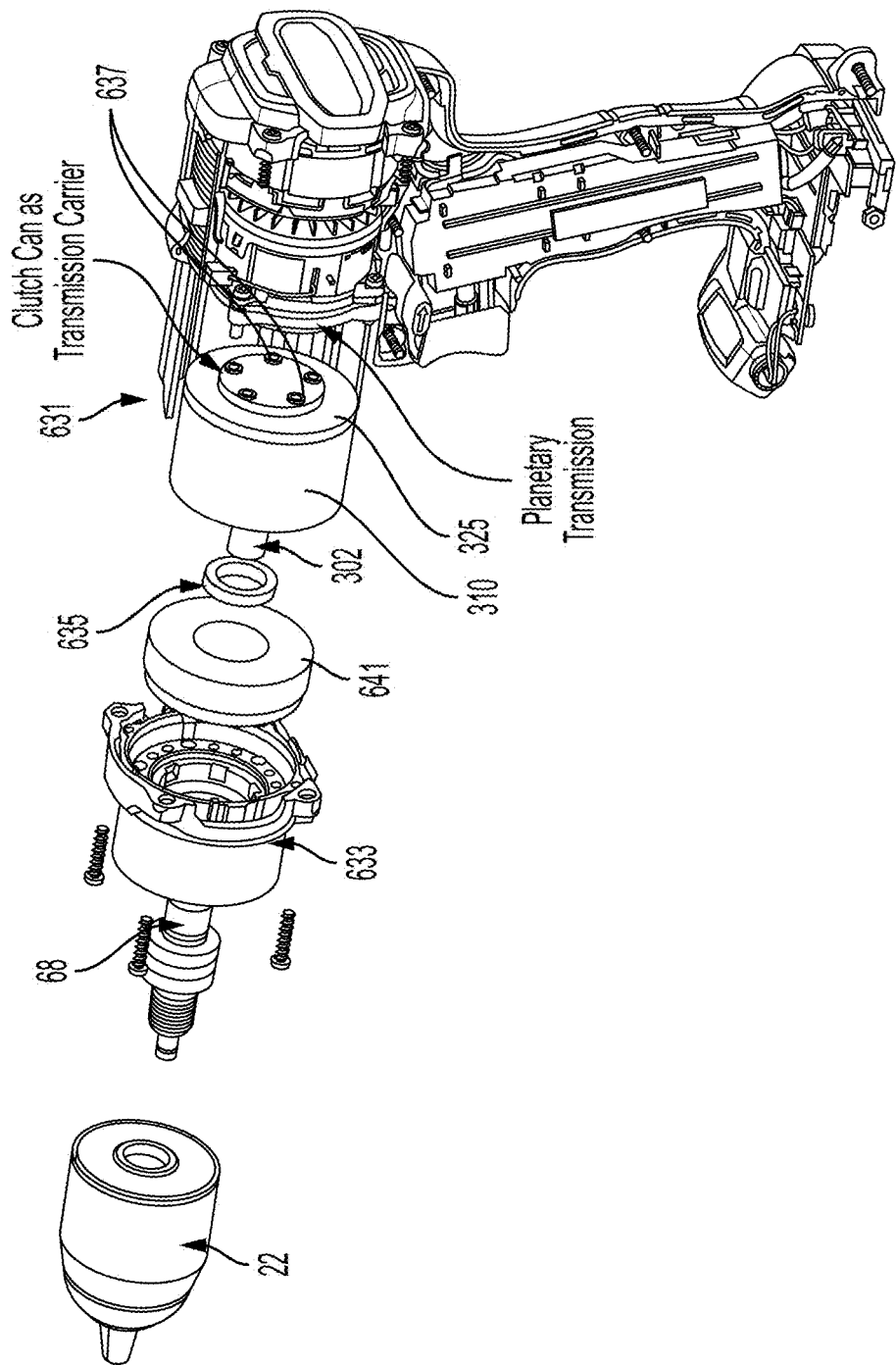
Figure 10:
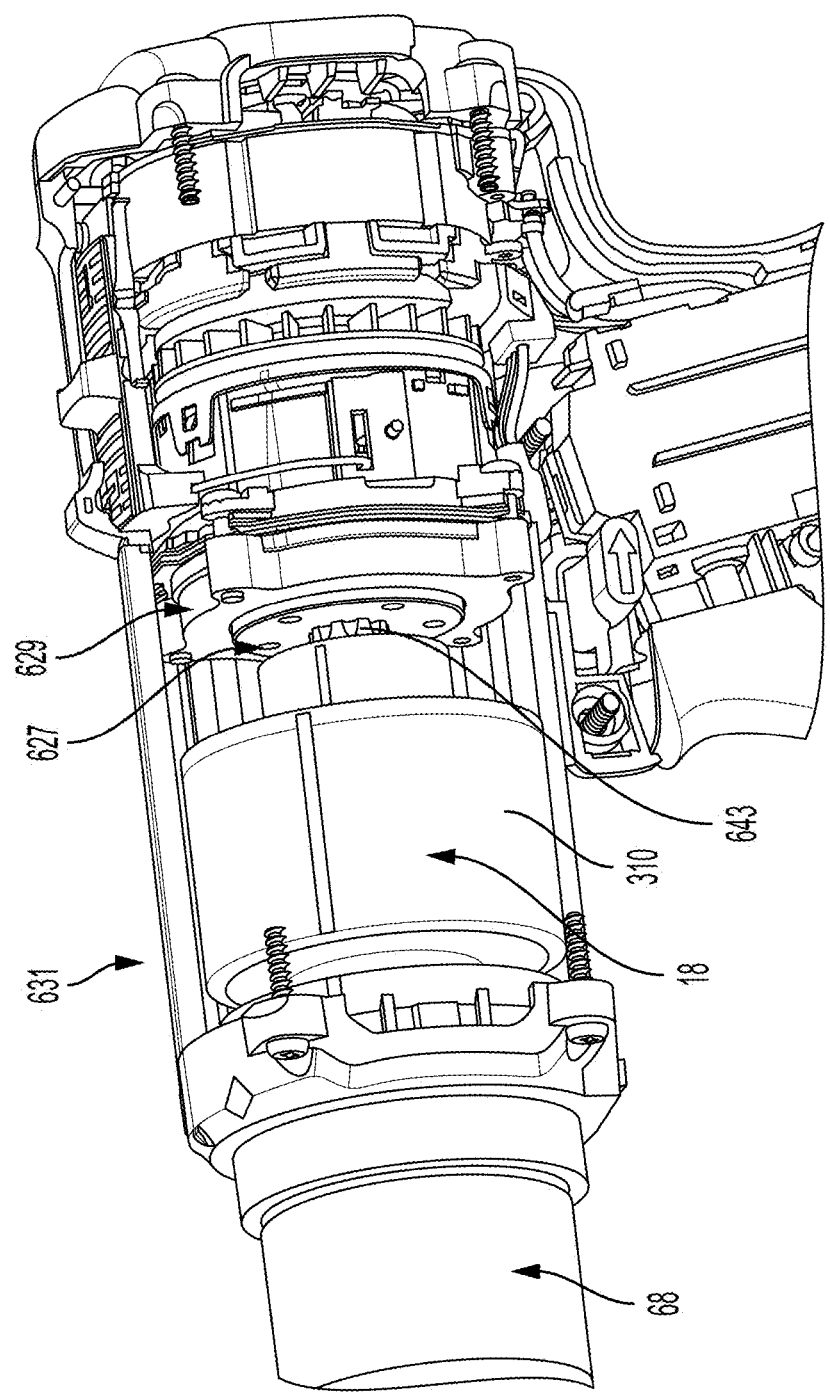
FIGS. 10 and 11 show a partial assembled view and a partial exploded view, respectively, of another exemplary power tool having an electrostatic clutch assembly according to various embodiments of the present patent application, where some portions of the power tool are not shown to better illustrate other portions of the power tool, and where the electrostatic clutch assembly is configured to be splined to the output carrier of the planetary transmission.
Figure 11:
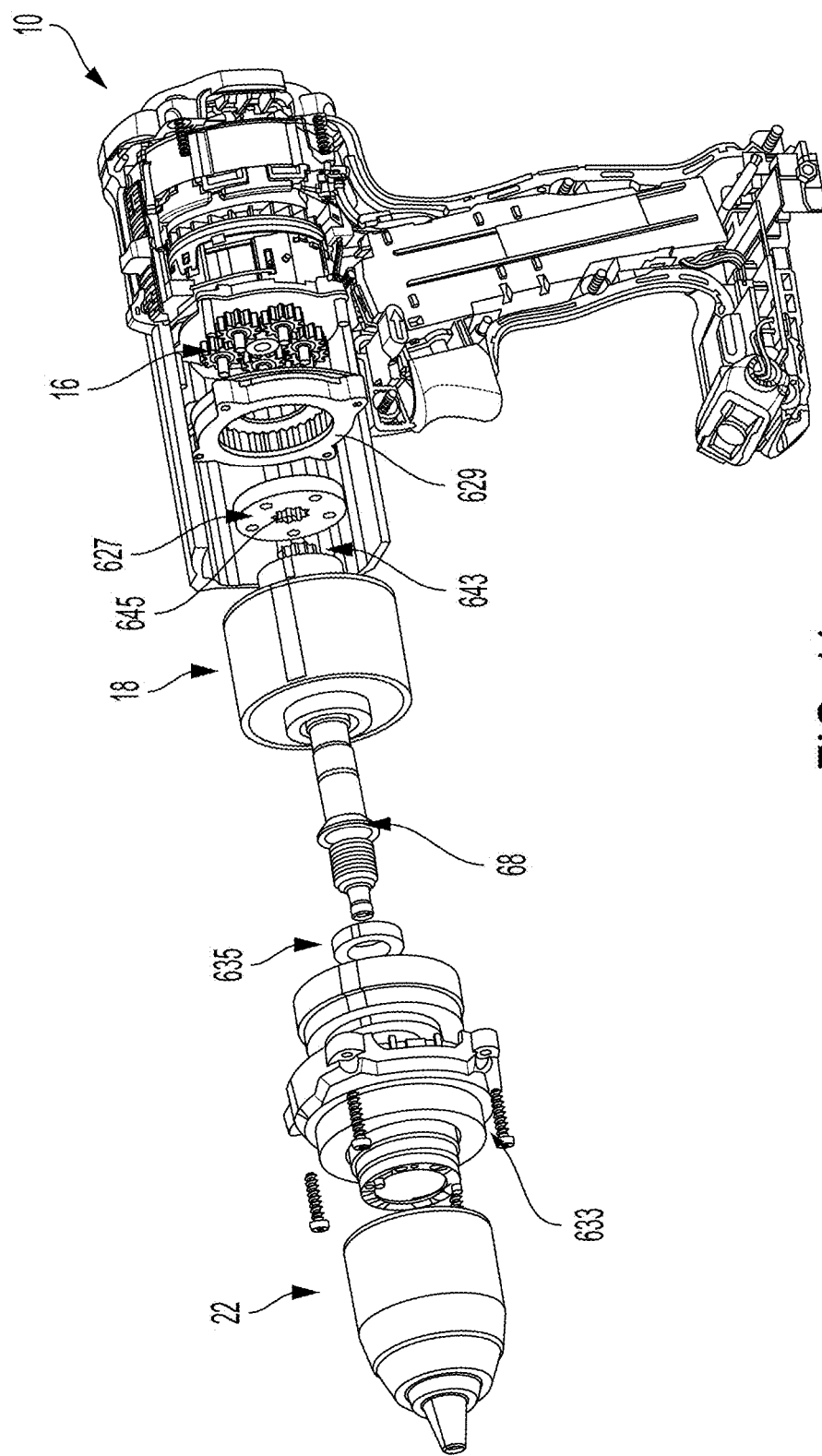

As shown in FIGS. 6-8, the input member (e.g., one of the shaft 302 and the clutch housing 310) of the electrostatic clutch assembly 18 may be fixed to the output carrier 627 of the planetary transmission 16. Also, as shown in FIGS. 6-8, the input member (e.g., one of the shaft 302 and the clutch housing 310) of the electrostatic clutch assembly 18 may be integral with the output carrier 627 of the planetary transmission 16. As shown in FIGS. 10-11, the input member (e.g., one of the shaft 302 and the clutch housing 310) of the electrostatic clutch assembly 18 may be splined to the output carrier 627 of the planetary transmission 16, for example, using a splined arrangement.

In one embodiment, the shaft 302 of the electrostatic clutch assembly 18 is fixed to/integral with or is splined to the output carrier 627 of the planetary transmission 16, while the clutch housing 310 of the electrostatic clutch assembly 18 is fixed to/integral with or is splined to the output spindle 68 of the power tool 10.

In another embodiment, as illustrated in FIGS. 6-8, the clutch housing 310 of the electrostatic clutch assembly 18 is fixed to/integral with or is splined to the output carrier 627 of the planetary transmission 16, while the shaft 302 of the electrostatic clutch assembly 18 is fixed to/integral with or is splined to the output spindle 68 of the power tool 10.

Figure 9B:
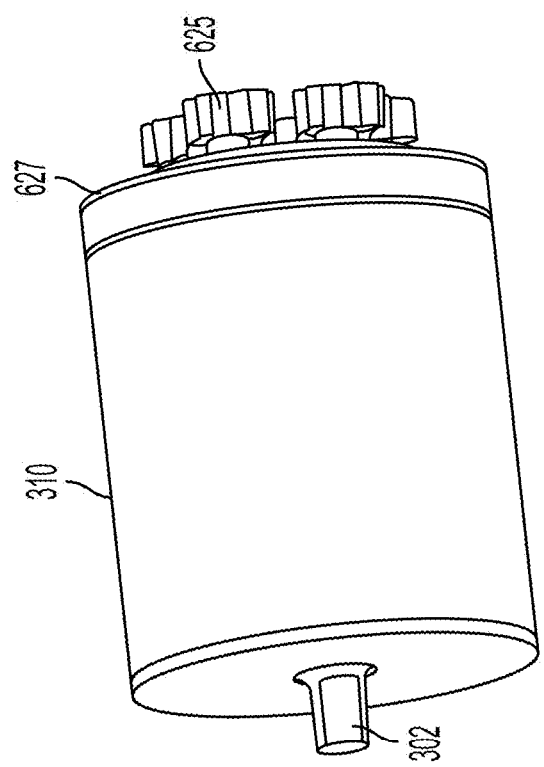
FIGS. 9A-9B show the electrostatic clutch assembly according to the embodiment of FIG. 6, where the electrostatic clutch assembly is configured to be integrally mounted to the output carrier of the planetary transmission.
Figure 9A:
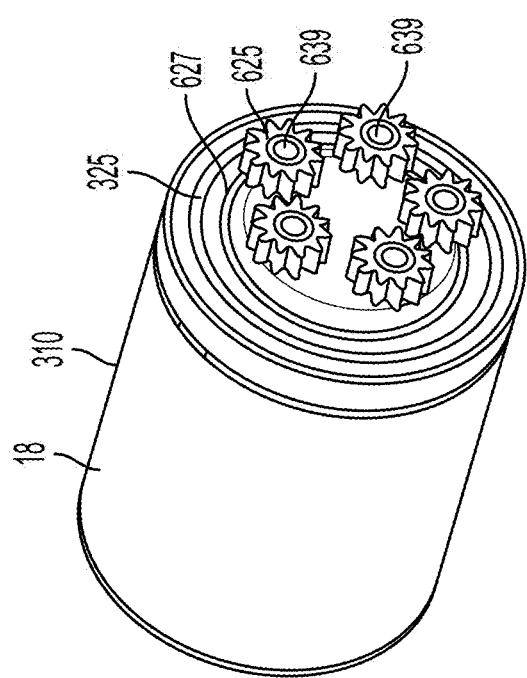

As shown in FIGS. 6-8, when the clutch housing 310 of the electrostatic clutch assembly 18 is configured to serve as the output carrier, the rear portion 325 of the electrostatic clutch assembly 18 includes openings 637 that are configured to receive pins 639, which are configured to pin the plurality of planet gears 625 of the third stage planetary gear set to the output carrier/clutch housing 310 of the electrostatic clutch assembly 18. FIGS. 9A-9B show the output carrier/clutch housing 310 of the electrostatic clutch assembly 18 with the plurality of planet gears 625 of the third stage planetary gear set being pinned thereto.

Referring to FIGS. 10-11, when the clutch housing 310 of the electrostatic clutch assembly 18 is splined to the transmission 16, the rear portion 325 of the electrostatic clutch assembly 18 includes a splined connection 643 that is configured to be received in an (correspondingly shaped) opening 645 of the output carrier 627 of the transmission 16 so as to operatively connect the electrostatic clutch assembly 18 to the transmission 16.

The slip torque for the electrostatic clutch assembly may be more accurate and reproducible in this embodiment, in which one of the shaft 302 and the clutch housing 310 of the electrostatic clutch assembly 18 is mounted to the output carrier 627 of the planetary transmission 16 and the other of the shaft 302 and the clutch housing 310 of the electrostatic clutch assembly 18 is operatively connected to the output spindle 68 of the power tool 10. In this embodiment, the electrostatic clutch assembly 18 is close to the output spindle 68 of the power tool 10 with no intervening transmission components to introduce slack or backlash.

Also, referring to FIGS. 6-8, the power tool 10 may also include insulating housing 631 that is configured to insulate the electrostatic clutch assembly 18. The insulating housing 631 may be part of the housing 12 of the power tool 10. The insulating housing 631 may be disposed adjacent to and may surround the electrostatic clutch assembly 18 so as to insulate the electrostatic clutch assembly 18.

Referring to FIGS. 6-8, the power tool 10 may also include an insulating front housing 633, a bearing support ring/front portion 641 and an output bearing 635 that are configured to insulate the shaft 302/output member of the electrostatic clutch assembly 18 near a front portion of the electrostatic clutch assembly 18. When the electrostatic clutch assembly 18 is assembled, the insulating front housing 633, the front portion 641, the output bearing 635 and the insulating housing 631 together completely insulate the electrostatic clutch assembly 18 on the front and the sides of the electrostatic clutch assembly 18.

The insulating front housing 633, the front portion 641, the output bearing 635 may also be configured to operatively connect the output (e.g., the shaft 302) of the electrostatic clutch assembly 18 to the output spindle 68. In one embodiment, the front portion 641 of the power tool may be referred to as a carrier or bushing.

In another embodiment of a drill or drill/driver 1200, as shown in FIG. 12, the electrostatic clutch assembly 1218 may be disposed between the motor 1215 and the transmission 1216. That is, the electrostatic clutch assembly 1218 is disposed between the output shaft/member 1203 of the motor 1215 and an input member (e.g., a sun gear or a first stage sun gear) 1247 of the planetary transmission 1216. The drill/driver 1200, the electrostatic clutch assembly 1218, the motor 1215, the transmission 1216, the output shaft/member 1203, the input member (e.g., a sun gear or a first stage sun gear) 1247 of the planetary transmission 1216, the end effector 1222, the output spindle 1268, the shaft 1202, the clutch housing 1210, and the motor and transmission assembly 1214 are substantially similar to the drill/driver 10, the electrostatic clutch assembly 18, the motor 15, the transmission 16, the output shaft/member 603, the input member (e.g., a sun gear or a first stage sun gear) 647 of the planetary transmission 16, the end effector 22, the output spindle 68, the shaft 302, the clutch housing 310, and the motor and transmission assembly 14 described in detail in the present patent application.

In one embodiment, one of the shaft 1202 and the clutch housing 1210 is fixed to a first stage sun gear 1247 of the planetary transmission 1216 and the other of the shaft 1202 and the clutch housing 1210 is splined to the output shaft 1203 of the motor 1215. In another embodiment, one of the shaft 1202 and the clutch housing 1210 is fixed to the first stage sun gear 1247 of the planetary transmission 1216 and the other of the shaft 1202 and the clutch housing 1210 is fixed to or integral with the output shaft 1203 of the motor 1215.

The slip torque accuracy in this embodiment, in which the electrostatic clutch assembly 1218 is disposed between the motor 1215 and the transmission 1216, may not be as accurate as in the above-described embodiment, in which the electrostatic clutch assembly 1218 is disposed between the motor and transmission assembly 1214 (including the motor 1215 and/or the transmission 1216) and the end effector 1222. In this embodiment, the electrostatic clutch assembly 1218 is located before the transmission 1216 (e.g., in a direction starting with the motor 1215 and moving towards the output spindle 1268) and the transmission 1216 can introduce slack or backlash. However, this embodiment also may require less holding torque because the torque before the transmission 1216 is lower than the torque at the output of the transmission 1216.

Figure 13:
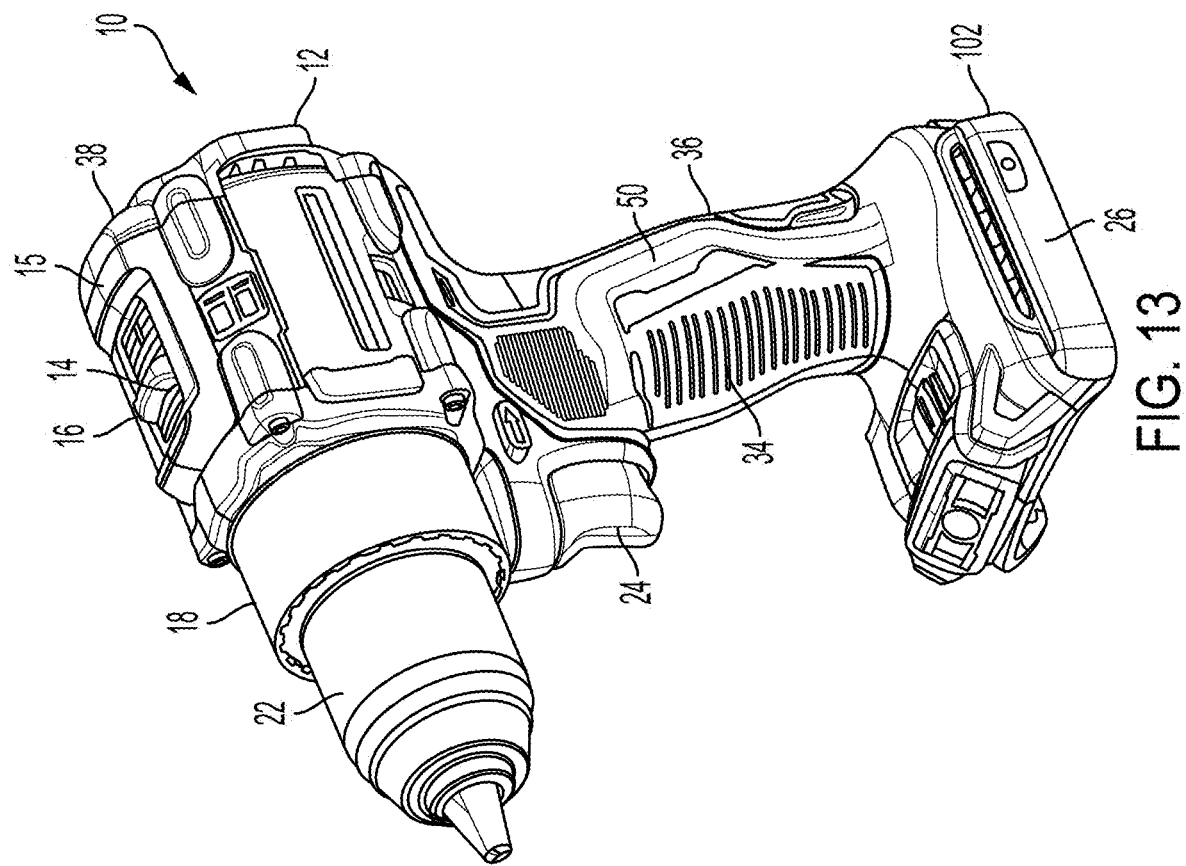
FIGS. 13 and 14 show a perspective view and a cross-sectional view, respectively, of another exemplary embodiment of a power tool with an electrostatic clutch assembly according to various embodiments of the present patent application, where the electrostatic clutch assembly is configured to be coupled to a ring gear of a transmission.
Figure 14:
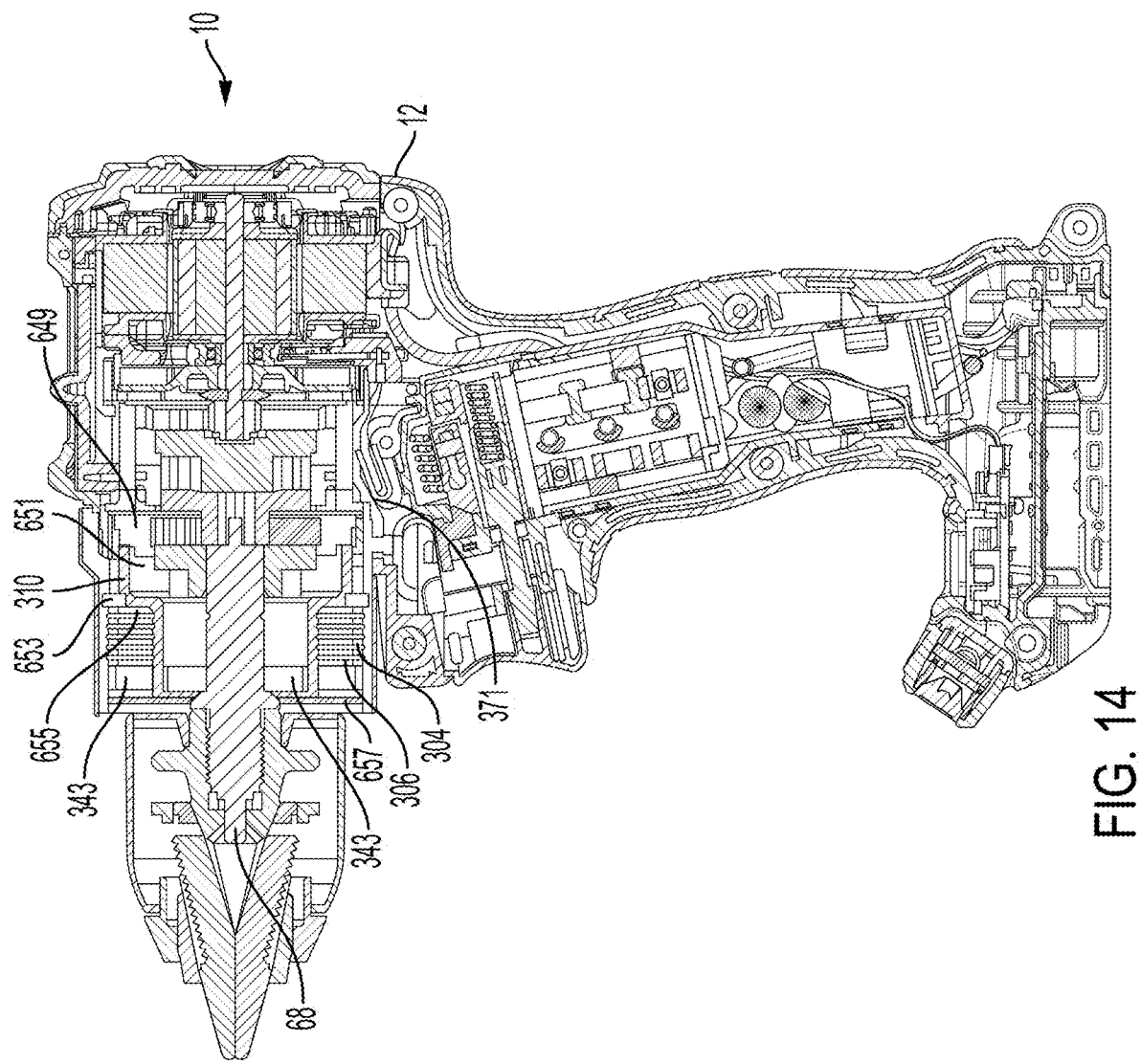

Referring to FIGS. 13-14, in another embodiment of a drill or drill/driver 10, the electrostatic clutch assembly 18 may be configured to selectively couple and decouple the output ring gear of a planetary transmission to the tool housing. In this embodiment, one of the shaft 302 and the clutch housing 310 of the electrostatic clutch assembly 18 is non-rotatably coupled to an output stage ring gear 649 of the planetary transmission 16. The other of the shaft 302 and the clutch housing 310 is non-rotatably coupled to the tool housing. The gears in the planetary transmission 16 are configured to be rotationally driven by the motor 15.

The electrostatic clutch assembly 18 includes a first member (e.g., one of the shaft 302 and the clutch housing 310) that is non-rotatably coupled to the first electrode 304 and a second member (e.g., the other of the shaft 302 and the clutch housing 310) that is non-rotatably coupled to a second electrode 306, and that dielectric layer 308 that is arranged between the first and second electrodes 304, 306. The control circuit 50 is disposed in the power tool housing 12 and operatively cooperable with the electrostatic clutch assembly 18 to control power delivery from the power source 102 to the first electrode 304 and the second electrode 306.

The control circuit 50 causes a first voltage to be applied to the first electrode 304 and a second voltage to be applied to the second electrode 306, the first voltage being different from the second voltage, generating a first attractive force between the first and second electrodes 304, 306, causing the ring gear 649 to remain stationary relative to the power tool housing 12, enabling torque transmission from the planetary transmission 16 to the end effector 22. When a torque on the end effector exceeds a threshold value that corresponds to the holding force between the first and second electrodes, the electrodes slip relative to one another, which allows the ring gear 649 to rotate relative to the power tool housing 12, interrupting torque transmission from the planetary transmission 16 to the end effector 22.

FIGS. 13-14 illustrate how the electrostatic clutch assembly 18 acts on the ring gear 649 of the output stage of the planetary transmission 16. One of the first and second electrodes 304, 306 is coupled to the clutch housing 310, which is fixed to the housing 12. In the ring gear clutch embodiment, one of the electrodes never rotates. The other of the first and second electrodes 304, 306 is coupled to a member 651 that is coupled to the output stage ring gear 649.

When the output torque on the output spindle 68 is below the clutch setting, the first and second electrodes 304, 306 do not rotate relative to one another, and the ring gear 649 is held stationary relative to the housing 12, which allows torque to be transmitted through the output stage of the planetary transmission 16. When the torque on the output spindle 68 exceeds the set value, the first and second electrodes 304, 306 slip and the member 651 rotates, which allows the ring gear 649 to rotate, interrupting torque transmission through the output stage of the planetary transmission 16. That is, the ring gear 649 is configured to rotate when the torque on the output spindle 68 exceeds the set value.

This embodiment of the electrostatic clutch assembly 18 requires only one set of electrodes 304, 306 to be energized by brushes because only one set of electrodes 304, 306 is movable relative to the tool housing. However, this design of the electrostatic clutch assembly 18 may be less accurate than the embodiment of the electrostatic clutch assembly 18 in FIGS. 2 and 6-11, in which one of the shaft 302 and the clutch housing 310 is mounted on the output carrier 627 of the planetary transmission 16 because it is acting on the output ring gear 649 of the planetary transmission 16 and not the output carrier 627 of the planetary transmission 16, so there may be some backlash or slack introduced.

Referring to FIG. 14, the power tool 10 may also include a seal member (e.g., grease seal) 653 and a compression member 655 on one side of the plurality of electrode pairs 307 of the electrostatic clutch assembly 18 and may include bearing 343 and a stop plate 657 on the other side of the plurality of electrode pairs 307 of the electrostatic clutch assembly 18. Also, FIG. 14 shows another configuration in which the brush 371 is connected to the clutch housing 310.

In other embodiments, referring to FIGS. 15-20, an electrostatic clutch assembly 418, 518, 818 may be configured for an impact tool 410, 510, 810, in which the electrostatic clutch assembly 418, 518, 818 is configured to limit a torque transmitted to the output spindle 468, 568, 868 of the impact tool 410, 510, 810 to a maximum threshold value.

In these embodiments, an impact power tool 410, 510, 810 may generally include a power tool housing 412, 512, 812, a motor 415, 515, 815 that is received in the power tool housing 412, 512, 812 and configured to be powered by a power source 4102, 5102, 8102 and an output spindle 468, 568, 868 that is at least partially received in and rotatable relative to the power tool housing 412, 512, 812, an end effector 422, 522, 822 coupled to the output spindle 468, 568, 868 an electrostatic clutch assembly 418, 518, 818 and one or more control circuits/controllers 450, 550, 850 configured to control power delivery and operation of the motor 415, 515, 815 and the electrostatic clutch assembly 418, 518, 818. The electrostatic clutch assembly 418, 518, 818 includes a shaft 4302, 5302, 8302 a first electrode 4304, 5304, 8304 and a second electrode 4306, 5306, 8306 axially arranged along an axial direction of the shaft 4302, 5302, 8302. In one embodiment, the end effector 422, 522, 822 of the impact power tool 410, 510, 810 may be the same as the end effector 22 in the power drill 10. In another embodiment, the end effector 422, 522, 822 of the impact power tool 410, 510, 810 may be different than the end effector 22 in the power drill 10.

The first electrode 4304, 5304, 8304 and the second electrode 4306, 5306, 8306 are substantially parallel to each other. The electrostatic clutch assembly 418, 518, 818 includes a clutch housing 4310, 5310, 8310 containing the first electrode 4304, 5304, 8304, the second electrode 4306, 5306, 8306, and at least a portion of the shaft 4302, 5302, 8302. The first electrode 4304, 5304, 8304 is non-rotatably coupled to the clutch housing 4310, 5310, 8310. The second electrode 4306, 5306, 8306 is non-rotatably coupled to the shaft 4302, 5302, 8302. At least one of the electrodes is axially moveable relative to the other electrode, as described above. In one embodiment, the power tool housing, the motor, the control circuit/controller, the electrostatic clutch assembly, the output spindle and the power source in the impact power tools may be similar to the power tool housing 12, the motor 15, the controller/control circuit 50, the transmission 16, the electrostatic clutch assembly 18, the output spindle 68, and the power source 102, respectively as shown and described in other embodiments of the present patent application, and thus these will not be shown and described in detail here.

The transmission 416, 516, 816 in the impact tool 410, 510, 810 may not necessarily be similar to the transmission in a drill/driver. For example, a drill/driver may have a multi-stage planetary transmission, while an impact tool 410, 510, 810 usually has only a single stage transmission. Also, the planet carrier in the impact tool 410, 510, 810 may generally be integral with the cam shaft (even though that is also part of the impact mechanism). The impact tool 410, 510, 810 may be referred to as power impact tool and the drill/driver 10 may be referred to as power drill/driver.

The impact power tool 410, 510, 810 also includes impact mechanism 402, 502, or 802 that is operatively coupled with the motor 415, 515, 815 and configured to be driven thereby. The impact mechanism 402, 502, or 802 is configured to generate/apply intermittent rotational impacts that are transmitted to the output spindle 468, 568, 868 of the power tool 410, 510, 810. The impact mechanism 402, 502, or 802 may be a rotational impact mechanism. The electrostatic clutch assembly 418, 518, 818 is disposed in the power tool housing 412, 512, 812 and between the impact mechanism 402, 502, 802 and the output spindle 468, 568, 868. The control circuit 450, 550, 850 is disposed in the power tool housing 412, 512, 812 and operatively cooperable with the electrostatic clutch assembly 418, 518, 818. The control circuit 450, 550, 850 causes a first voltage to be applied to the first electrode 4304, 5304, 8304 and a second voltage to be applied to the second electrode 4306, 5306, 8306, the first voltage is different from the second voltage, generating a first attractive force between each of the first and second electrodes 4304, 5304, 8304, 4306, 5306, 8306, causing the shaft 4302, 5302, 8302 to rotate together with the clutch housing 4310, 5310, 8310 when a torque on the shaft 4302, 5302, 8302 is less than or equal to a first threshold value and causing the shaft 4302, 5302, 8302 to rotationally slip relative to the clutch housing 4310, 5310, 8310 when the torque on the shaft 4302, 5302, 8302 exceeds the first threshold value.

Figure 15:
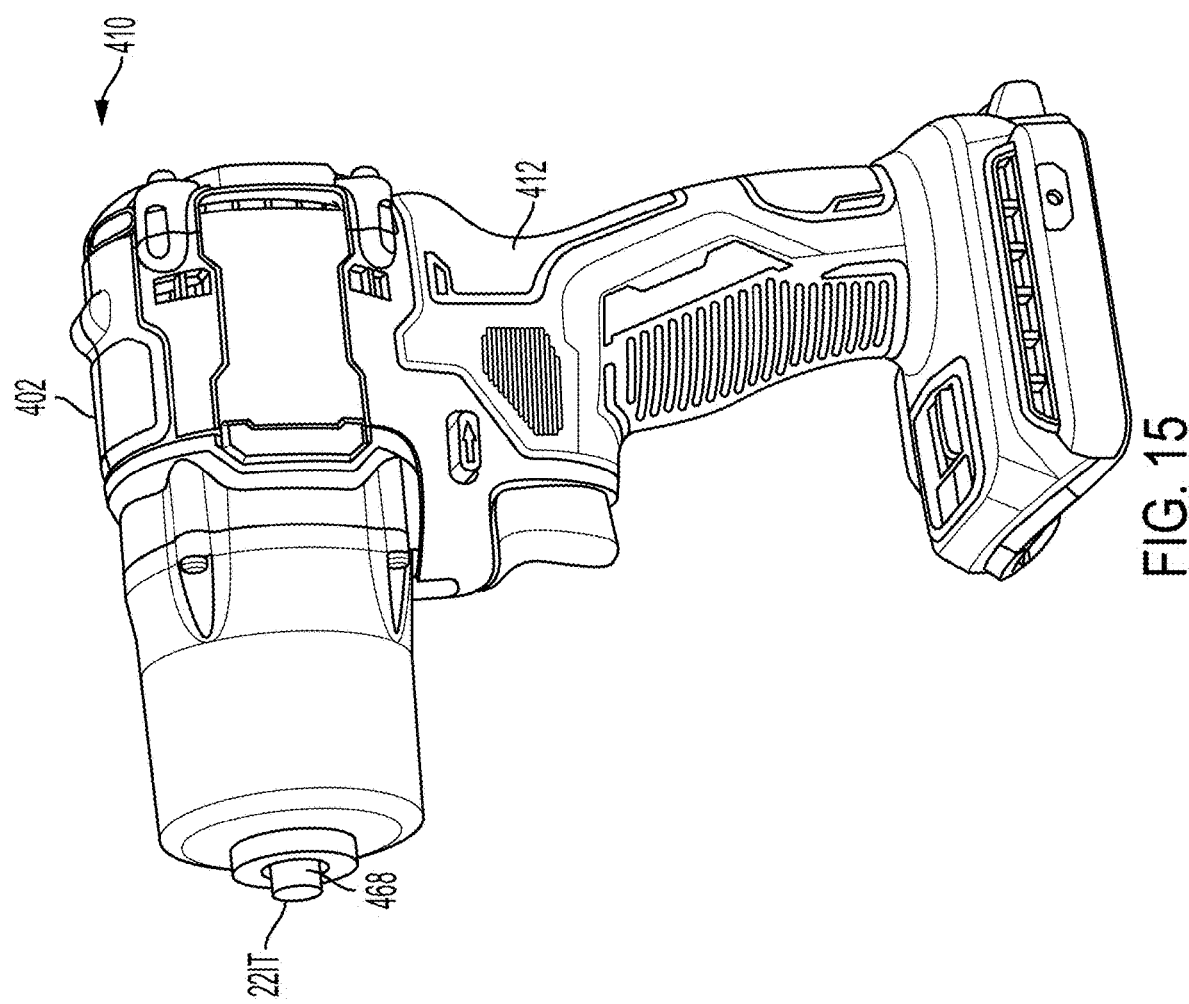
FIG. 15 shows a perspective view of an exemplary embodiment of a rotary impact power tool with a Pott-type impact mechanism and an electrostatic clutch assembly according to various embodiments of the present patent application.
Figure 16:
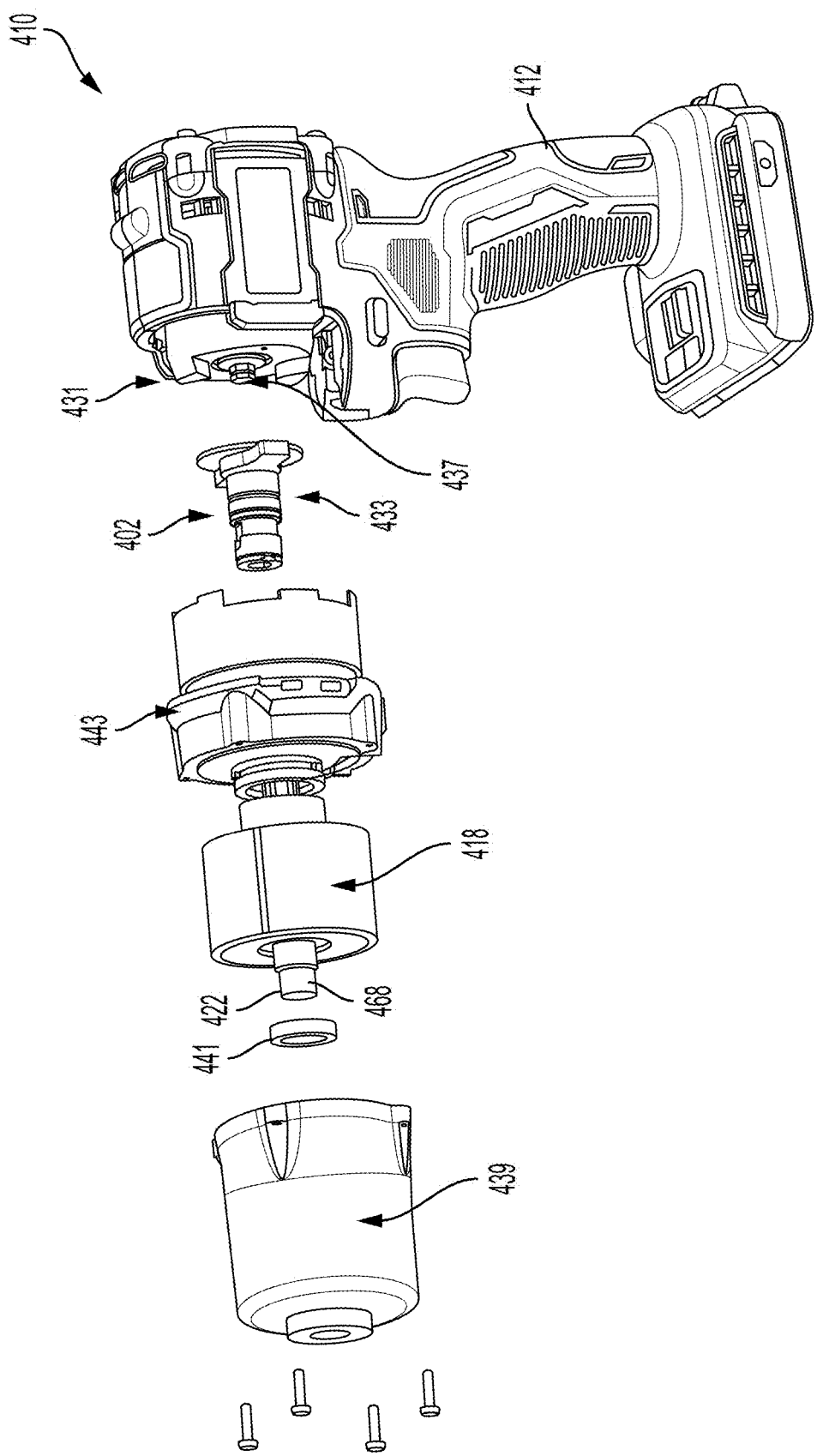
FIGS. 16 and 17 show a partial exploded view and a cross-sectional view, respectively, of the impact tool of FIG. 15.
Figure 17:
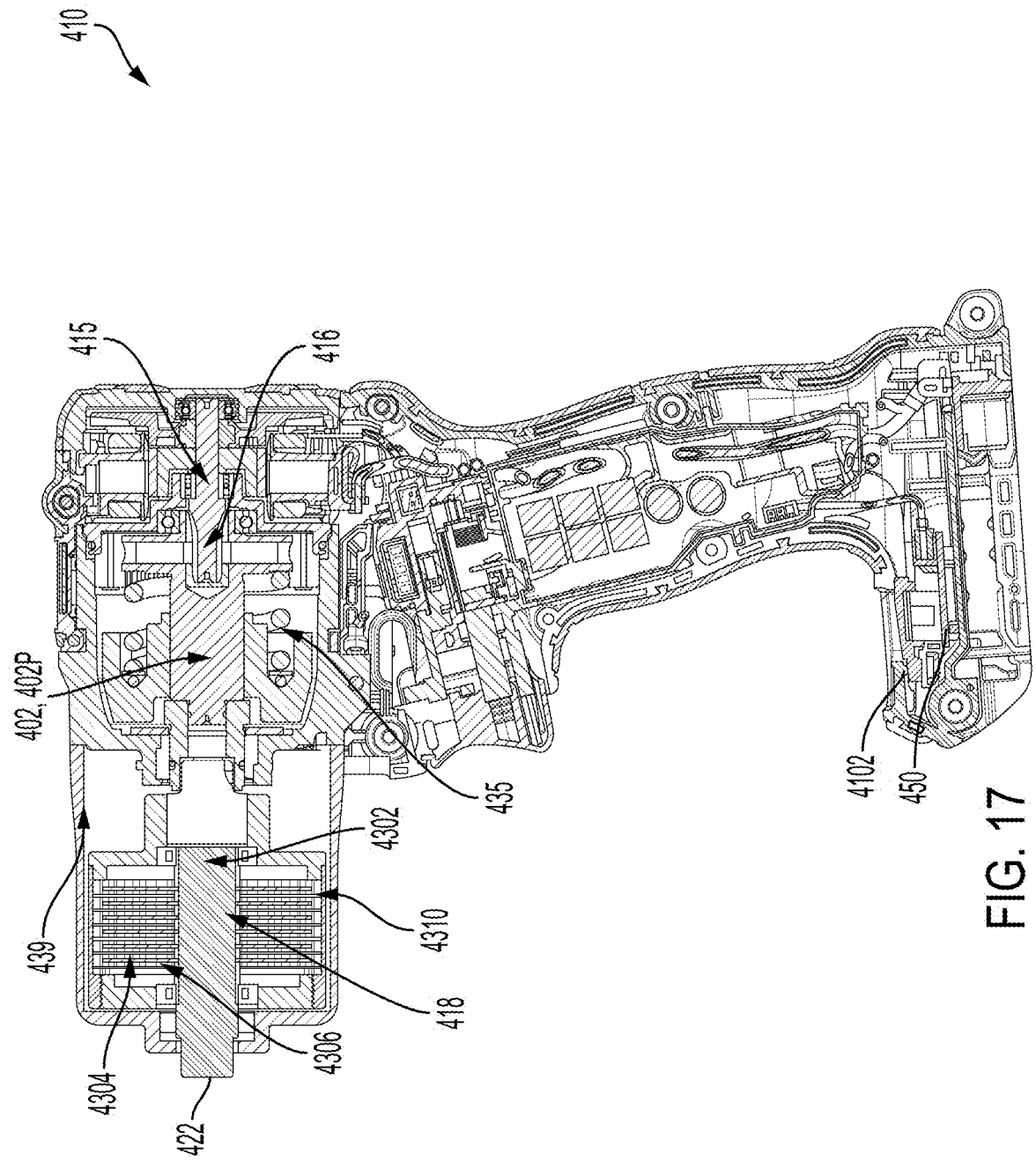

As shown in FIGS. 15-17, in an embodiment, a power tool 410 includes an impact mechanism 402 that comprises a Pott-type impact mechanism 402P. One of the shaft 4302 or the clutch housing 4310 of the electrostatic clutch assembly 418 is operatively coupled to the output spindle 468. The other of the shaft 4302 and the clutch housing 4310 is operatively coupled to an output of the Pott-type impact mechanism 402P. The Pott-type impact mechanism 402P comprises a cam shaft 437 rotationally driven by the output of the transmission (e.g., by the output carrier of a planetary transmission), a hammer 431 received at least partially over the cam shaft 437 and operatively coupled to the cam shaft 437 to be movable axially and rotationally relative to the cam shaft 437, an anvil 433, and a spring 435 axially biasing the hammer 431 toward the anvil 433. When the torque encountered by the output spindle 468 is at or below a first threshold (which corresponds to the mechanical interaction between the components of the impact mechanism 402P), the spring 435 maintains the hammer 431 in engagement with the anvil 433, so that the cam shaft 437, the hammer 431, and the anvil 433 rotate in unison. When the torque encountered by the output spindle 468 exceeds the first threshold, the hammer 431 moves axially and rotationally along the cam shaft 437 to apply rotational impacts to the anvil 433. The torque applied to the anvil when applying rotational impacts exceeds the torque applied when the hammer and the anvil rotate in unison and exceeds, and often greatly exceeds, the first threshold at which the impact tool begins impacting. For example, U.S. Pat. No. 10,406,662, which is incorporated by reference in the present patent application in its entirety, discloses an exemplary Pott-type impact mechanism.

In the illustrated embodiment, the electrostatic clutch assembly 418 is disposed in the power tool housing 412 between the anvil 433 and the output spindle 468, with the clutch housing 4310 fixedly coupled to the anvil 433 and the shaft 4302 fixedly coupled to the output spindle 468. In an alternative embodiment, the shaft 4302 may be fixedly coupled to the anvil 433 and the clutch housing 4310 may be fixedly coupled to the output spindle 468. As described further below, the electrostatic clutch assembly 418 will slip when the torque applied to the anvil 433 by the hammer 431 is above a second torque threshold (which corresponds to the holding force between the electrodes 4304, 4306, as described above). This will limit the amount of torque transmitted from the anvil 433 to the output spindle 468 to be less than or equal to the second torque threshold.

Referring to FIGS. 16-17, the power impact tool 410 may also include an insulating front housing 439 and an output bearing 441 that are configured to insulate the electrostatic clutch assembly 418 when the electrostatic clutch assembly 418 is assembled. The power impact tool 410 may also include a nose cone 443 disposed between the electrostatic clutch assembly 418 and the anvil 433 as shown in FIG. 16. The nose cone 443 may be configured to enable connection between the electrostatic clutch assembly 418 and (e.g., the anvil 433) of the Pott-type impact mechanism 402P.

Figure 18:
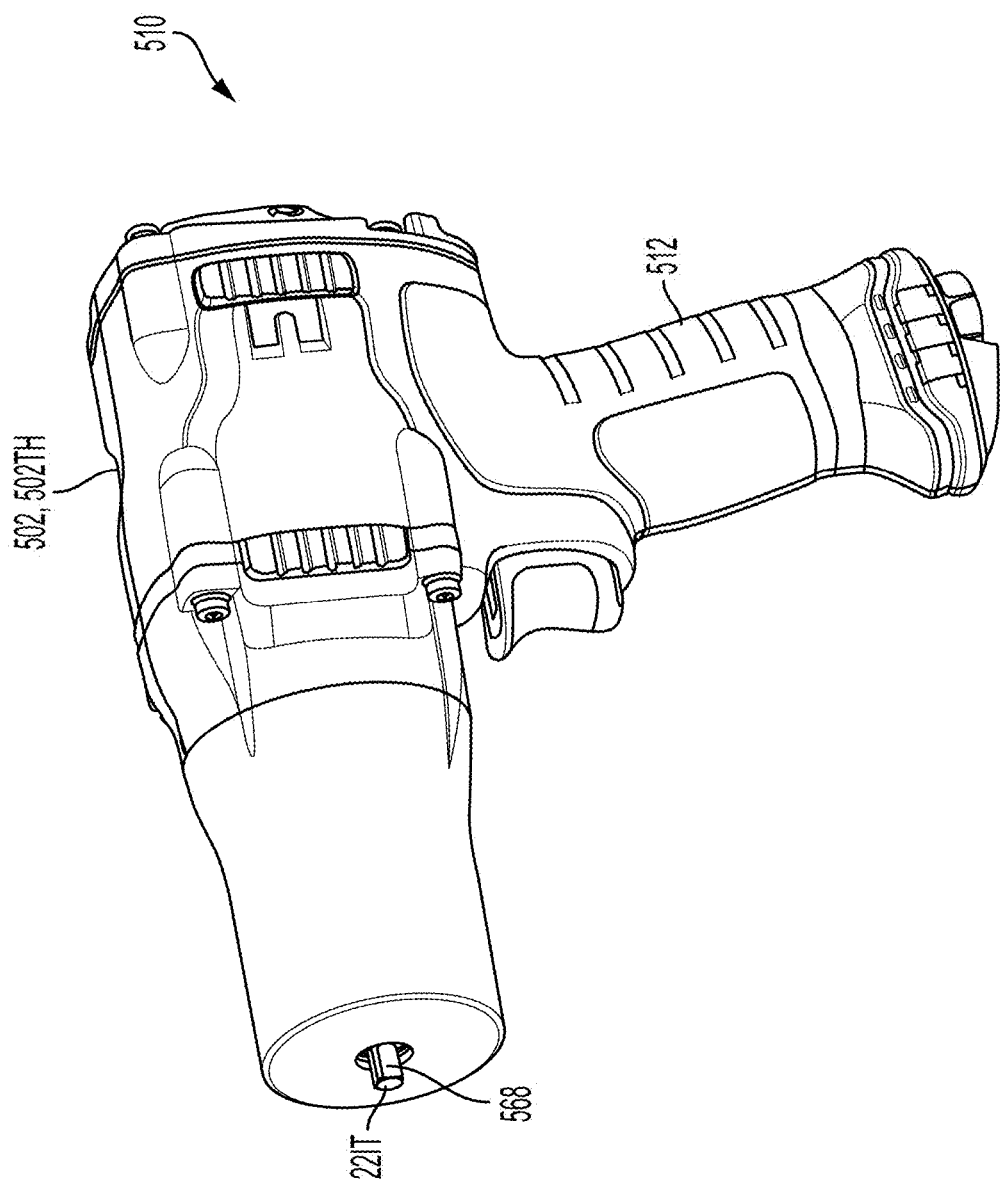
FIG. 18 shows a perspective view of another exemplary embodiment of a rotary impact power tool with a twin hammer impact mechanism and an electrostatic clutch assembly according to various embodiments of the present patent application.
Figure 19:
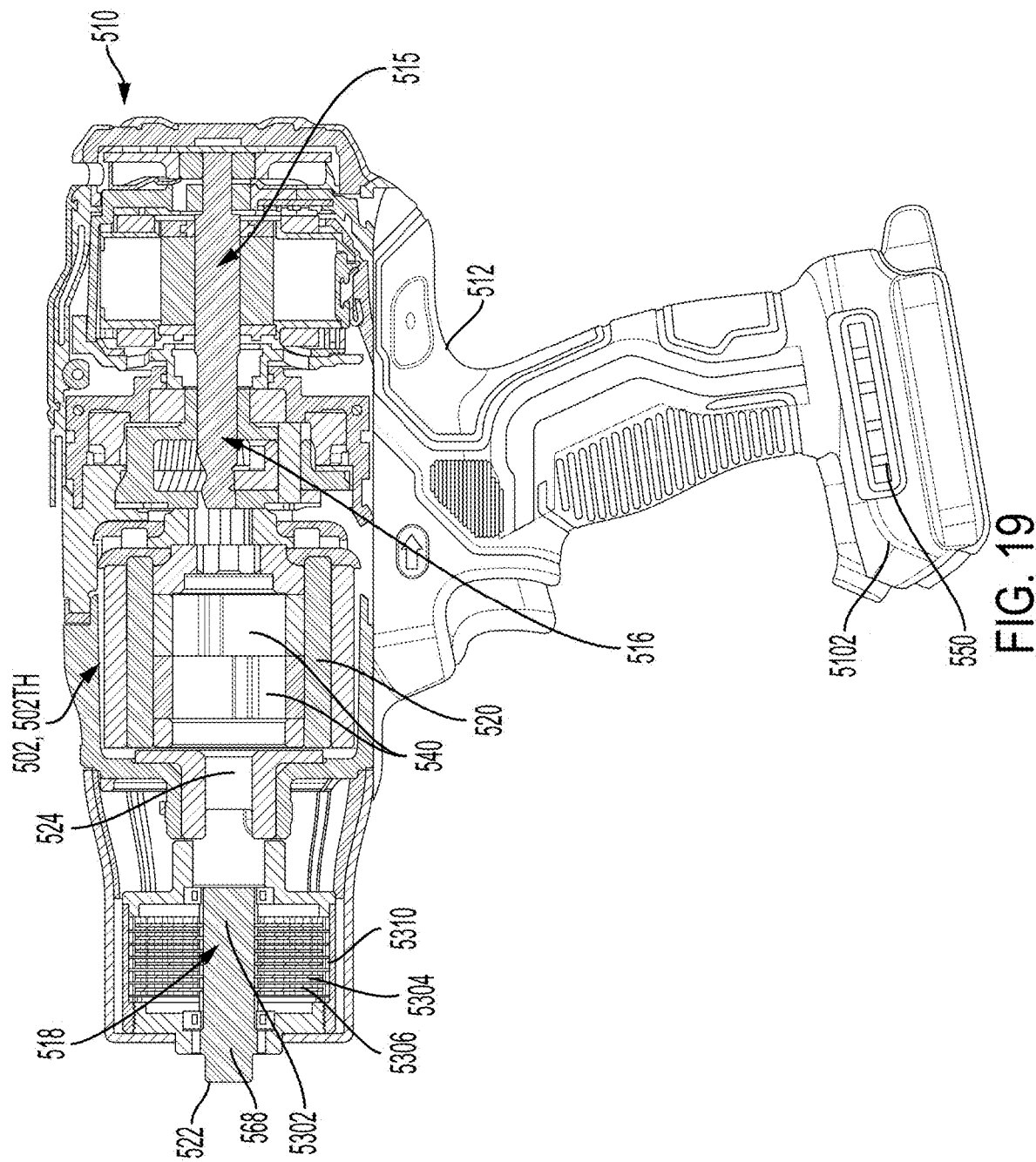
FIG. 19 shows a cross-sectional view of the impact tool of FIG. 18.

As shown in FIGS. 18-19, in another embodiment, the power tool 510 includes an impact mechanism 502 that comprises a twin hammer impact mechanism 502TH. One of the shaft 5302 and the clutch housing 5310 is operatively coupled to an output of the twin hammer impact mechanism 502TH. The other of the shaft 5302 or the clutch housing 5310 of the electrostatic clutch assembly 518 is operatively coupled to the output spindle 568. In one embodiment, the motor 515 is a pneumatic motor. In another embodiment, the motor 515 is an electric motor. The construction and operation of the twin hammer impact mechanism is well-known to a person of ordinary skill in the art. For example, U.S. Pat. No. 6,491,111, which is incorporated by reference in the present patent application in its entirety provides an exemplary twin hammer impact mechanism. As described in U.S. Pat. No. 6,491,111, the twin hammer impact mechanism 502TH includes a hollow cage or carrier member 520 rotatably drivable by the motor, an anvil 524 received in the carrier member 520 to allow rotation of the hollow cage or carrier member 520 relative to anvil 524, and hollow hammer members 540 mounted around the anvil 524.

Figure 20:
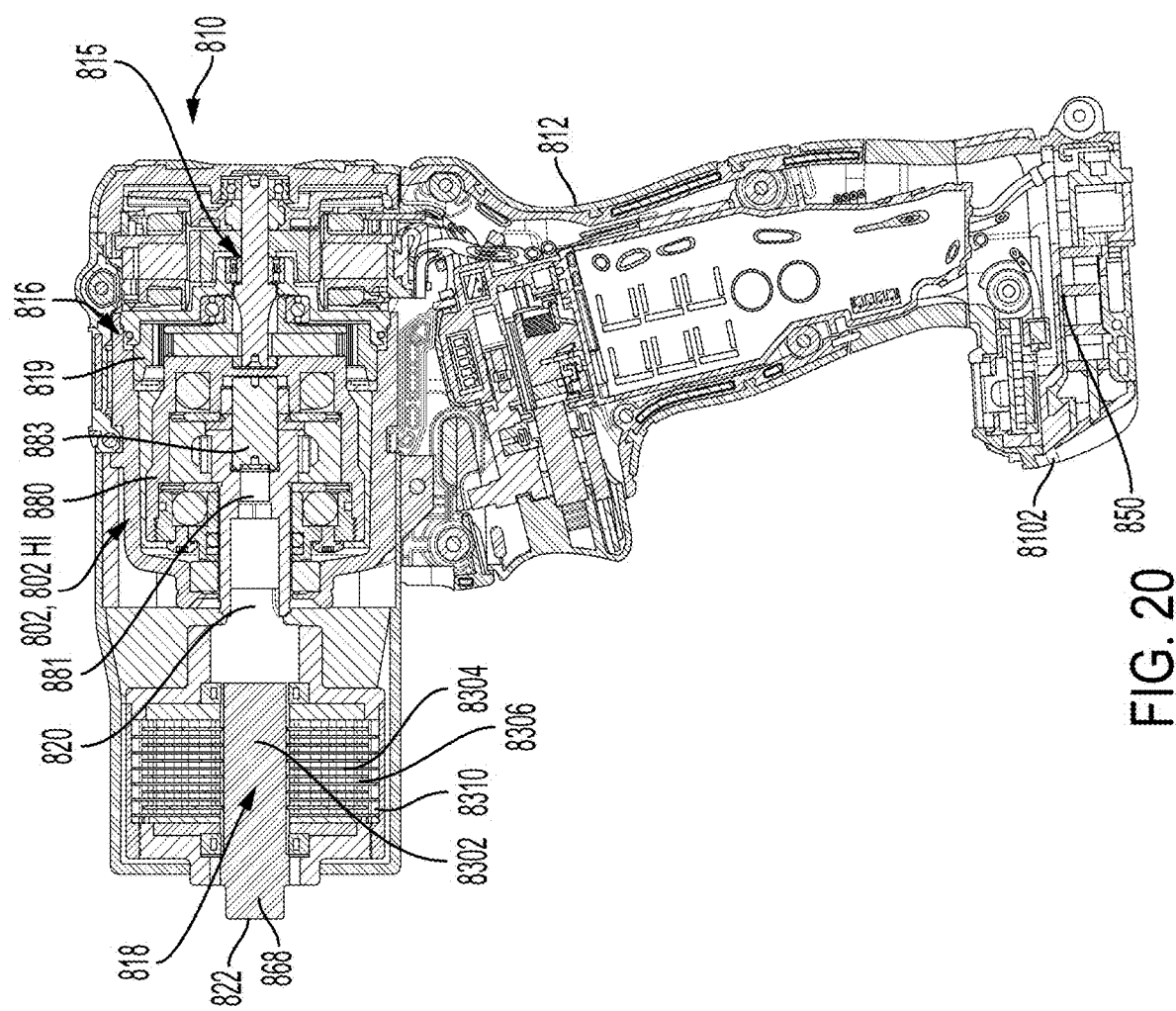
FIG. 20 shows a cross-sectional view of another exemplary embodiment of a rotary impact power tool with a hydraulic impulse impact mechanism and an electrostatic clutch assembly according to various embodiments of the present patent application.

In the illustrated embodiment, the electrostatic clutch assembly 518 is disposed in the power tool housing 512 between the anvil 524 and the output spindle 568, with the clutch housing 5310 fixedly coupled to the anvil 524 and the shaft 5302 fixedly coupled to the output spindle 568. In an alternative embodiment, the shaft 5302 may be fixedly coupled to the anvil 524 and the clutch housing 5310 may be fixedly coupled to the output spindle 568. As described further below, the electrostatic clutch assembly 518 will slip when the torque applied to the anvil 524 by the hammer 540 is above a second torque threshold (which corresponds to the holding force between the electrodes, as described above). This will limit the amount of torque transmitted from the anvil 524 to the output spindle 568 to be less than or equal to the second torque threshold As shown in FIG. 20, in another embodiment, the power impact tool 810 includes an impact mechanism 802 that comprises a hydraulic or oil impulse impact mechanism 802HI. One of the shaft 8302 and the clutch housing 8310 of the electrostatic clutch assembly 818 is operatively coupled to an output shaft 820 of the hydraulic/oil impulse impact mechanism 802HI. The construction and operation of the hydraulic/an oil impulse impact mechanism is well-known to a person of ordinary skill in the art. For example, U.S. Pat. No. 11,260,515, which is incorporated by reference in the present patent application in its entirety provides an exemplary oil pulse impact mechanism. As described in U.S. Pat. No. 11,260,515, the impact mechanism 802HI includes a generally cylindrical hammer 880 containing fluid such as oil and coupled for rotation with an output carrier 819 of a planetary transmission 816 that is driven by a motor 823. In other embodiments, the hammer 880 may be driven directly by the motor or by another component of a planetary or other type of transmission. The hammer 880 also includes an inwardly protruding impact member or lug (not shown). Received in the hammer 880 is a cam shaft 883 and an anvil shaft 881 that is coupled for rotation with the output shaft 820 of the oil pulse impact mechanism. The anvil shaft 881 includes a pair of impact members or blades (not shown) configured to be radially moveable relative to the anvil, and to be struck by the hammer lugs when in their radially outward position. Upon activation of the motor, torque from the electric motor is transferred to the hammer 880 via the transmission 816, causing the hammer 880 and the cam shaft 883 to rotate in unison relative to the anvil shaft 881 until the impact members on the hammer 880 impact the respective blades on the anvil shaft 881 to deliver a rotational impact to the anvil shaft 881. Further details regarding the construction and operation of the impact mechanism 802HI can be found in the aforementioned U.S. Pat. No. 11,260,515.

Figure 25B:
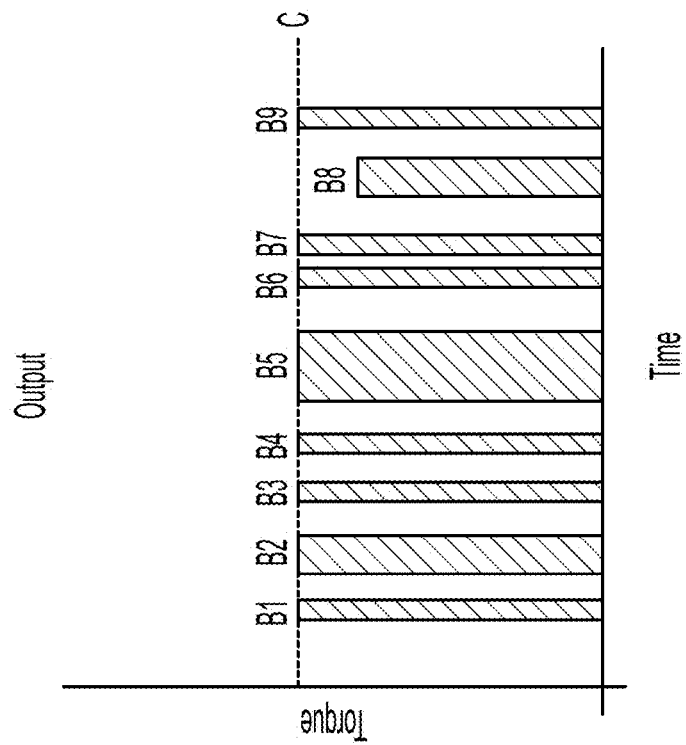
FIGS. 25A-26B show exemplary graphical representations of operation of exemplary power tool with an exemplary electrostatic clutch assembly, where the power tool includes a rotary impact mechanism.
Figure 25A:
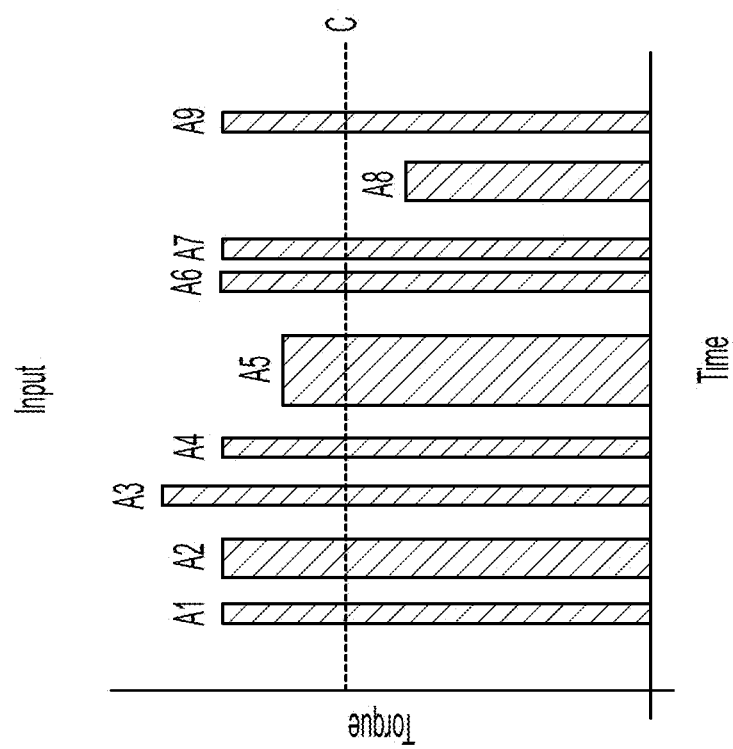

Referring to FIGS. 25A-25B, in one implementation of the above described embodiments of impact tools with an electrostatic clutch assembly, the electrostatic clutch assembly 418, 518, 818 is configured to receive an input torque from one of the above-described impact mechanisms 402, 502, 802 (which may vary over time based on joint characteristics, power delivered to the motor, and characteristics of the impact mechanism) and limit an amount of the input torque that is delivered to the output spindle to be less than the second torque threshold (i.e., the output torque delivered to the output spindle is limited to be no more than the second torque threshold). The input torque (i.e., measured in Nm) or the output torque (i.e., measured in Nm) is shown on left-hand side Y-axis of the graphs, while time (i.e., measured in seconds) is shown in the X-axis of the graphs. FIG. 25A illustrates the input torque delivered from the hammer to the anvil by rotary impacts of the hammer, with each impulse labeled as A1, A2, etc. FIG. 25B illustrates the output torque transmitted from the anvil to the output spindle with each impulse labeled as B1, B2, etc. The electrostatic clutch assembly limits the amount of torque transmitted to be less than or equal to the second threshold torque (indicated by line C), by slipping when the torque exceeds the second threshold C, effectively clipping the maximum torque delivered to the spindle. This second torque threshold may be preset in the power tool or nay be user adjustable. Further, as shown by impulse A8 in FIG. 25A and bar B8 in FIG. 25B, if the input torque delivered to the anvil is less than the second torque threshold C, then the torque delivered from the anvil to the output spindle will be the same as the input torque, since the electrostatic clutch will not slip. As shown in FIGS. 25A and 25B, in this embodiment, the second threshold is constant and/or fixed over time.

Figure 26B:
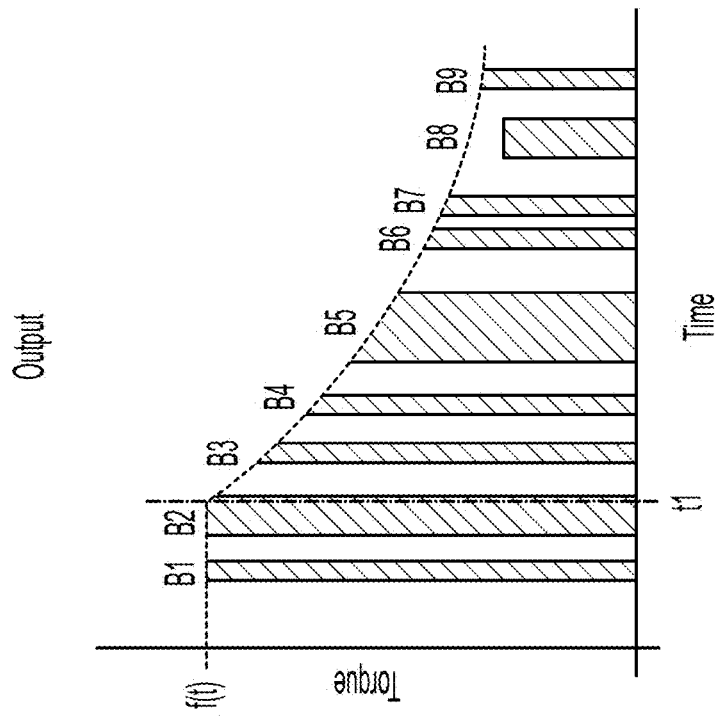
Figure 26A:
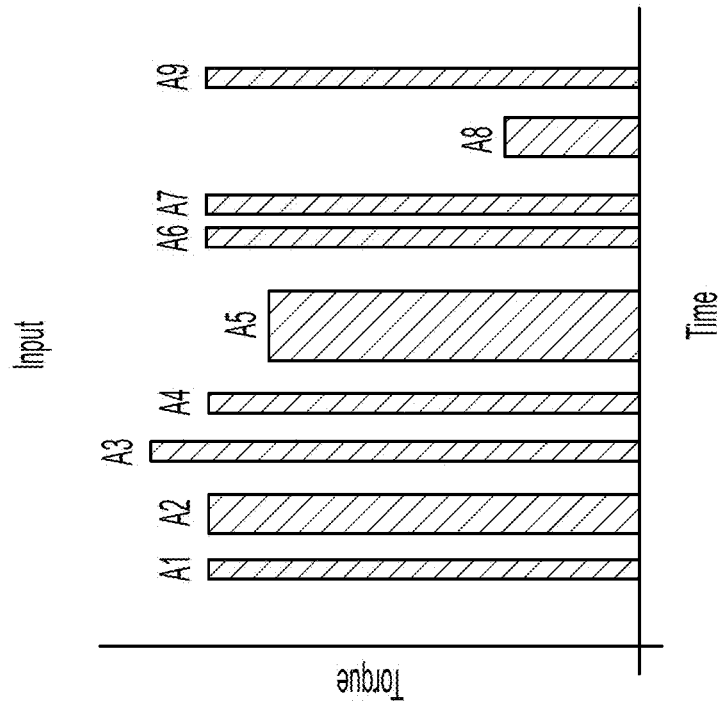

Referring to FIGS. 26A-26B, in another implementation of in one implementation of the above described embodiments of impact tools with an electrostatic clutch assembly, the second torque threshold is configured to be adjusted dynamically and/or vary over time. The second threshold value may be a function of time f(t) as shown in FIG. 26B. For example, as shown in FIG. 26B, the second threshold value may be constant until time t1 and then may decrease logarithmically after time t1. The function f(t) is not limited to the illustrated function and may comprise any function or method of dynamically varying the second torque threshold over time. This function f(t) may be preset in the power tool or may be user adjustable. Further, as shown by impulse B8 in FIG. 26A and impulse B8 in FIG. 25B, if the input torque delivered to the anvil is less than the torque threshold at a particular time t as indicated by the function f(t), then the torque delivered from the anvil to the output spindle will be the same as the input torque, since the electrostatic clutch will not slip.

Figure 21:
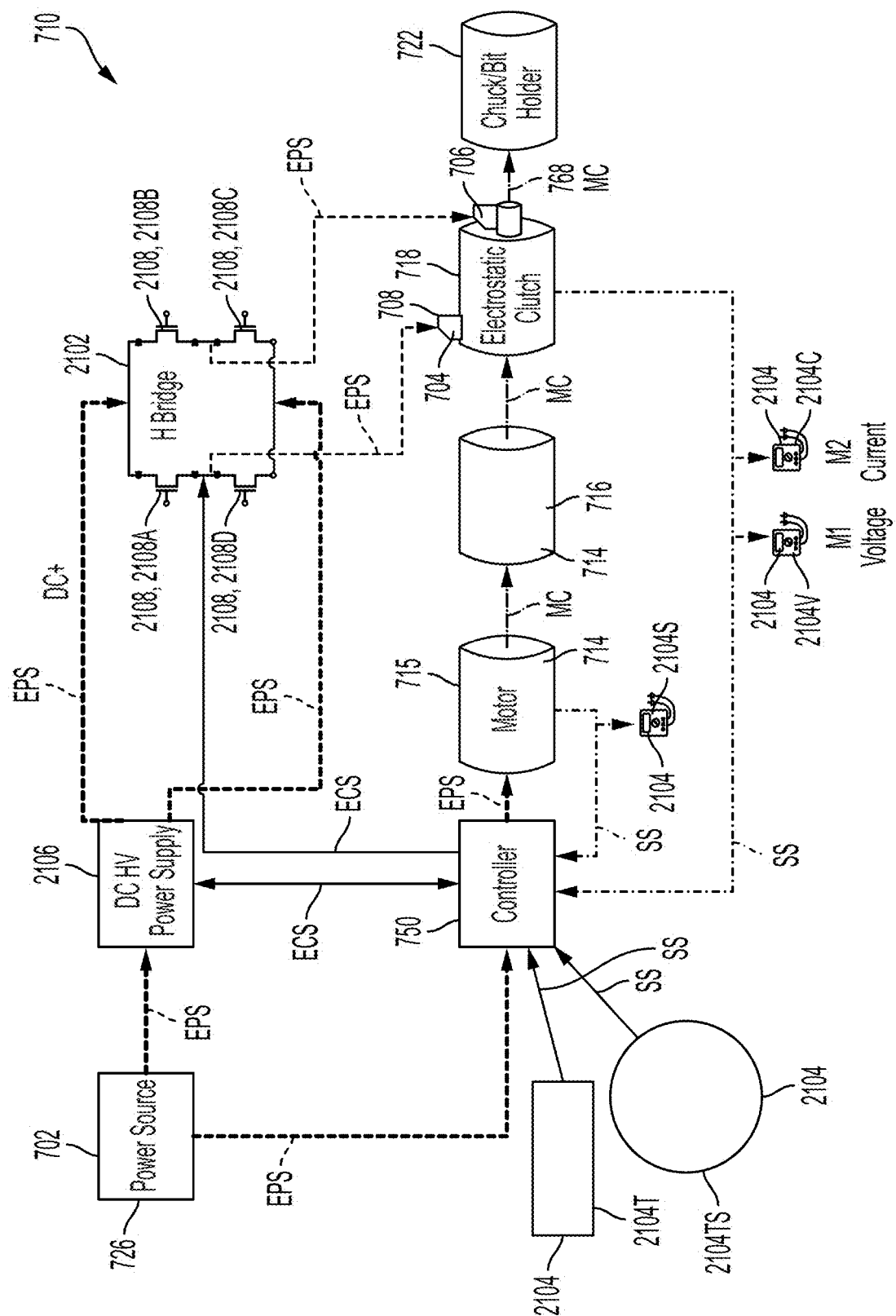
FIG. 21 shows a schematic block diagram of an exemplary power tool control system with an electrostatic clutch assembly according to various embodiments of the present patent application.

FIG. 21 shows a system architecture for one of more of the above-described power tools, which collectively will be referred to as a power tool 710 for purposes of this discussion. In one embodiment, referring to FIG. 21, the power tool 710 includes a power source 702, a motor 715 (of the motor and transmission assembly 714, the motor and transmission assembly 714 may also include transmission 716) that is configured to be driven by the power source 702, an end effector 722 that is configured to perform an operation on a workpiece (not shown), and an electrostatic clutch assembly 718 that is arranged between the motor 715 and the end effector 722. The electrostatic clutch assembly 718 is similar to the electrostatic clutch 18, and includes a first electrode 704 and a second electrode 706 that are substantially parallel and adjacent to each other, and a dielectric layer 708 arranged between the first electrode 704 and the second electrode 706.

In one embodiment, the power source 702 may include the (removable) power tool battery 726. The power tool 710 may also include a high voltage power supply 2106. The high voltage power supply 2106 may have a range of voltage between 0 volts and 2 Kilovolts.

The motor and transmission assembly 714 include the motor 715 and the transmission 716. The electrostatic clutch assembly 718 is configured to couple the output of the motor and transmission assembly 714 to the output spindle 768 and the end effector 722 of the power tool 710. The chuck/bit holder 722 is configured to provide the output shaft/spindle 768 fixturing to couple bits/tools/accessories, to be applied to work surface/fasteners.

The power tool 710 may include a controller or control circuit 750 that is operatively cooperable with the electrostatic clutch assembly 718 to control power delivery from the power source 702 to the first electrode 704 and the second electrode 706. The control circuit 750 causes a first voltage to be applied to the first electrode 704 and a second voltage to be applied to the second electrode 706, the first voltage being different from the second voltage generating a first attractive force between the first electrode 704 and the second electrode 706. The control circuit 750 may include motor control circuit that is configured to provide intelligent control of the motor speed of the motor 715 and intelligent control of the high voltage power supply.

The power tool 710 also includes a switch circuit 2102 that is operatively cooperable with the control circuit 750. The switch circuit 2102 is configured to selectively apply power to the first electrode 704 and the second electrode 706. In one embodiment, the switching circuit 2102 may be a H-Bridge circuit. The H-Bridge circuit includes semiconductor switches/switching elements 2108 (2108A-D) that are used to selectively apply power to the first electrode 704 and the second electrode 706. A person of ordinary skill in the art would readily appreciate that the H-Bridge is an electronic circuit that is configured to switch the polarity of a voltage applied to a load and that the H-Bridge generally includes four switches 2108 (2108A-D) that are configured as the branches of a letter "H" and the load connected as the cross-bar.

The switch circuit 2102 may be configured to change/switch a voltage polarity between a) the first electrode 704 being at the first voltage at a first polarity and the second electrode 706 being at the second voltage at a second polarity, and b) the first electrode 704 being at the first voltage at the second polarity and the second electrode 706 being at the second voltage at the first polarity. The switch circuit 2102 may further be configured to drain residual voltages from the first and second electrodes 704, 706.

For example, in one embodiment, when the switches 2108A and 2108C are activated/closed, while the switches 2108B and 2108D are opened, a first voltage with a first polarity (e.g., one of the positive polarity and the negative polarity) is applied to the first electrode 704 and a second voltage with a second polarity (e.g., the other of the positive polarity and the negative polarity) is applied to the second electrode 706. When switches 2108B and 2108D are activated/close, while the switches 2108A and 2108C are opened, the first voltage with the second polarity (e.g., the other of the positive polarity and the negative polarity) is applied to the first electrode 704 and the second voltage with the first polarity (e.g., one of the positive polarity and the negative polarity) is applied to the second electrode 706.

When the switches 2108C and 2108D are closed/activated, while the switches 2108A and 2108B are opened, the H-bridge/switch circuit 2102 may be configured to provide additional operation mode in which the electrostatic clutch assembly 718 brakes and operates (e.g., free run) until a frictional stop. When the switches 2108A and 2108B are closed/activated, while the switches 2108C and 2108D are opened, the H-bridge/switch circuit 2102 may be configured to provide additional operation mode in which the electrostatic clutch assembly 718 brakes and operates (e.g., free run) until a frictional stop.

When the switches 2108A and 2108D are closed/activated at the same time, this would cause a short circuit on an input voltage source. Similarly, when the switches 2108B and 2108C are closed/activated at the same time, this would cause a short circuit on the input voltage source.

The power tool 710 may further comprise a sense circuit 2104 that is configured to sense a characteristic of the electrostatic clutch assembly 718 and provide the sensed characteristic as an input to the control circuit 750. The control circuit 750 is configured to determine, based on the input, the first voltage to be applied to the first electrode 704 and the second voltage to be applied to the second electrode 706. The control circuit 750 is configured to transmit a signal to the switch circuit 2102, the signal including the determined first voltage and/or polarity to be applied to the first electrode 704 and the determined second voltage and/or polarity to be applied to the second electrode 706.

In one embodiment, the sense circuit 2104 may include a voltage sense circuit 2104V that is configured to sense a voltage potential measurement representative of a voltage difference/potential between the first voltage applied to the first electrode 704 and the second voltage applied to the second electrode 706. The voltage sense circuit 2104V is configured to sense a characteristic (e.g., voltage difference/potential between the first voltage applied to the first electrode 704 and the second voltage applied to the second electrode 706) of the electrostatic clutch assembly 718. The voltage sense circuit 2104V is configured to provide the voltage potential measurement as an input to the control circuit 750. That is, the sensing signal is transmitted from the electrostatic clutch assembly 718 to the control circuit 750 via the voltage sense circuit 2104V. The control circuit 750 is configured to determine, based on the input from the voltage sense circuit 2104V, the first voltage and/or polarity to be applied to the first electrode 704 and the second voltage and/or polarity to be applied to the second electrode 706.

In one embodiment, the sense circuit 2104 may include a current sense circuit 2104C that is configured to sense a current measurement representative of a current flow between the first electrode 704 and the second electrode 706. The current sense circuit 2104C is configured to sense a characteristic (e.g., current flow between the first electrode 704 and the second electrode 706) of the electrostatic clutch assembly 718. The current sense circuit 2104C is configured to provide the current measurement as an input to the control circuit 750. That is, the sensing signal is transmitted from the electrostatic clutch assembly 718 to the control circuit 750 via the current sense circuit 2104C. The control circuit 750 is configured to determine, based on the input from the current sense circuit 2104C, the first voltage and/or polarity to be applied to the first electrode 704 and the second voltage and/or polarity to be applied to the second electrode 706.

In another embodiment, the sense circuit 2104 may include a motor speed sense circuit 2104S that is configured to sense a motor rotation speed measurement. The motor rotation speed measurement from which acceleration, and angle may be derived. The motor speed sense circuit 2104S is configured to sense a characteristic (e.g., motor rotation speed) of the motor 715 of the motor and transmission assembly 714. The motor speed sense circuit 2104S is configured to provide the motor rotation speed measurement as an input to the control circuit 750. That is, the sensing signal is transmitted from the motor and transmission assembly 714 to the control circuit 750 via the sense circuit 2104S. The control circuit 750 is configured to determine, based on the input from the sense circuit 2104S, the first voltage and/or polarity to be applied to the first electrode 304 and the second voltage and/or polarity to be applied to the second electrode 706.

Figure 23:
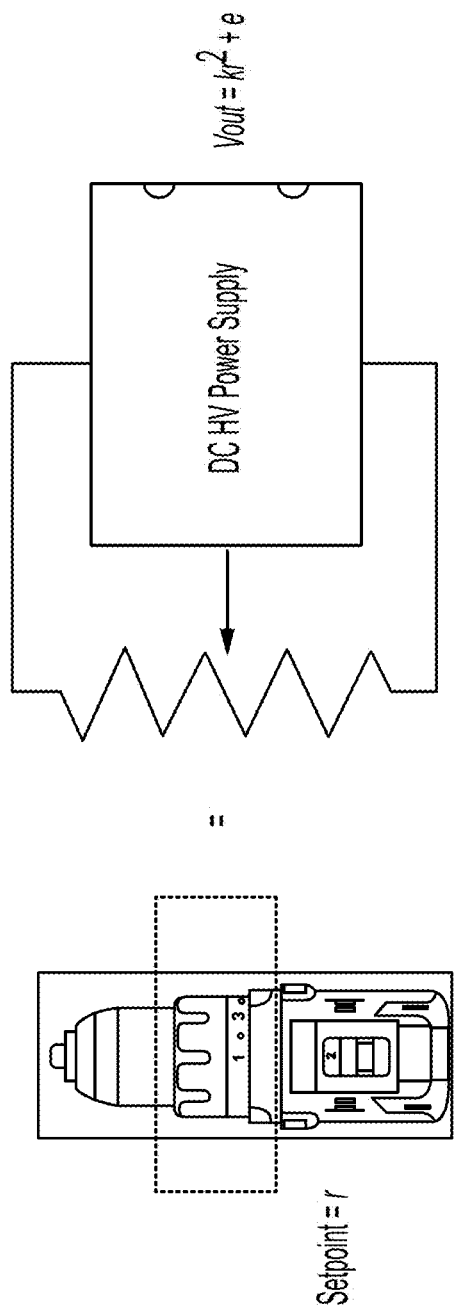
FIG. 23 show an exemplary torque setting user interface that converts numerical setpoints to a clutch setting voltage, which is provided as an input to a controller of a power tool according to various embodiments of the present patent application.

In another embodiment, referring to FIGS. 21 and 23, the sense circuit 2104 may include a torque setting sense circuit 2104TS that is configured to sense a torque setting interface measurement. U.S. Pat. No. 10,220,500, which is incorporated by reference in the patent application in its entirety, provides an exemplary torque setting interface for an electronic clutch. A similar type of torque setting interface could be implemented into the electrostatic clutch assembly 718 of the present patent application.

The torque setting sense circuit 2104TS is configured to provide the torque setting interface measurement as an input to the control circuit 750. The control circuit 750 is configured to determine, based on the input from the sense circuit 2104TS, the first voltage and/or polarity to be applied to the first electrode 704 and the second voltage and/or polarity to be applied to the second electrode 706.

Referring to FIGS. 21 and 23, a torque setting user interface is configured to convert numerical torque setpoints/threshold values to the voltage of the electrostatic clutch assembly 718. For example, in one embodiment, the torque setting interface may include a clutch ring that is coupled to a potentiometer/rheostat. In another embodiment, the torque setting interface may include a thumbwheel that is coupled to a potentiometer/rheostat. In yet another embodiment, the torque setting interface may include at least one pushbutton and a display.

In one embodiment, the control signal from the display of the torque setting interface to the DC high voltage power supply 2106 is an analog voltage. In another embodiment, the control signal from the display of the torque setting interface to the DC high voltage power supply 2106 is a pulse width modulated (PWM) signal. In yet another embodiment, the control signal from the display of the torque setting interface to the DC high voltage power supply 2106 is a digital code.

In one embodiment, as shown in FIG. 23, if the torque setpoint/threshold value is "r," then the voltage output (e.g., $V_{out}$) by the DC high voltage power supply 2106 to the H-Bridge/switch circuit 2102 is calculated using equation (1) below:

$$V_{out} = kr^2 + e \qquad \text{equation (1)}$$

where $V_{out}$ is the voltage output by the DC high voltage power supply 2106 to the H-Bridge/switch circuit 2102;

k is a constant;

r is a numerical torque setpoint/threshold value set by the user at a torque setting interface; and e is an error.

Figure 22:
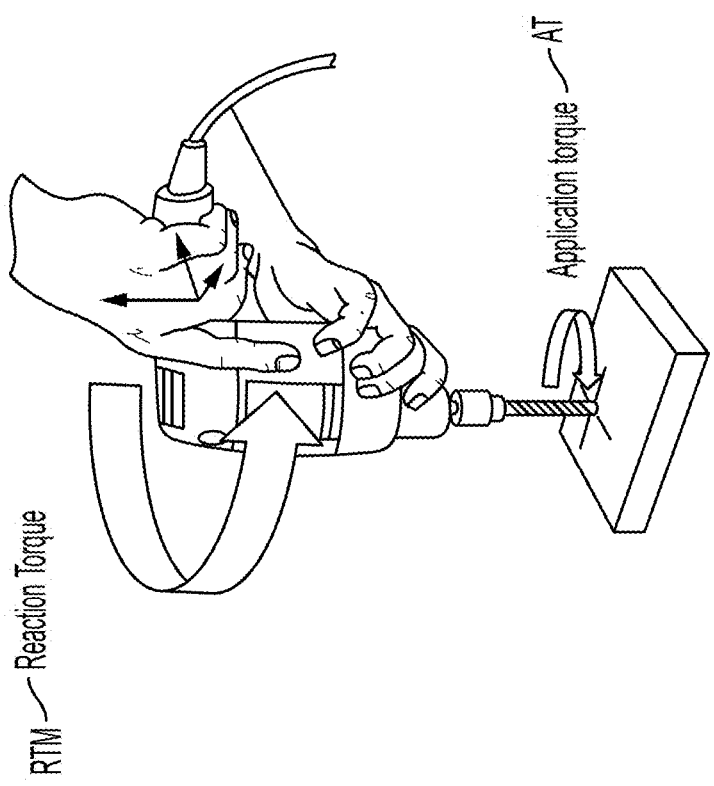
FIG. 22 shows an exemplary power tool with an electrostatic clutch assembly according to various embodiment of the present application, shown in use with an applied torque and a reaction torque being used to calculate an error.

In yet another embodiment, referring to FIGS. 21 and 22, the sense circuit 2104 may include a reaction torque sense circuit 2104T that is configured to sense a reaction torque measurement RTM. The reaction torque sense circuit 2104T is configured to provide the reaction torque measurement RTM as an input to the control circuit 750. The control circuit 750 is configured to determine an error using the reaction torque measurement RTM and an applied torque AT. The control circuit 750 is configured to determine, based on the error, the first voltage and/or polarity to be applied to the first electrode 704 and the second voltage and/or polarity to be applied to the second electrode 706. That is, the first voltage and/or polarity to be applied to the first electrode 704 and the second voltage and/or polarity to be applied to the second electrode 706 is adjusted to correct for the error due to the reaction torque on the power drill 710.

In one embodiment, an accelerometer or rate gyroscope is configured to measure reaction torque at the operator/user. This reaction torque measurement is then used to correct errors in an application/applied torque. For example, an error is calculated by subtracting the measured reaction torque from the applied torque. That is, error=(Applied torque−Reaction torque). The error is a computed signed voltage that is then added to the setpoint of the electrostatic clutch assembly 718.

Electrical control signals ECS between the DC high voltage power supply 2106 and the control circuit 750 and the electrical control signals ECS from the control circuit 750 and the switching circuit/H-Bridge 2102 are shown in FIG. 21.

Mechanical connection(s) MC between the motor and transmission assembly 714 (including the motor 715 and the transmission 716) and the electrostatic clutch assembly 718 and also the mechanical connection(s) MC between the electrostatic clutch assembly 718 and the end effector 722 are also shown in FIG. 21.

Sensing signals SS between the electrostatic clutch assembly 718 and the control circuit 750 and also the sensing signals SS between the motor and transmission assembly 714 (including the motor 715 and the transmission 716) and the control circuit 750 are shown in FIG. 21.

Electrical power signals EPS from the power source 702 to the DC high voltage power supply 2106, from the DC high voltage power supply 2106 to the switch circuit/H-Bridge 2102, from the switch circuit/H-Bridge 2102 to the first and second electrodes 704, 706 of the electrostatic clutch assembly 18, from the power source 702 to the control circuit 750, and from the control circuit 750 to the motor and transmission assembly 714 (including the motor 715 and the transmission 716) are also shown in FIG. 21.

Figure 24:
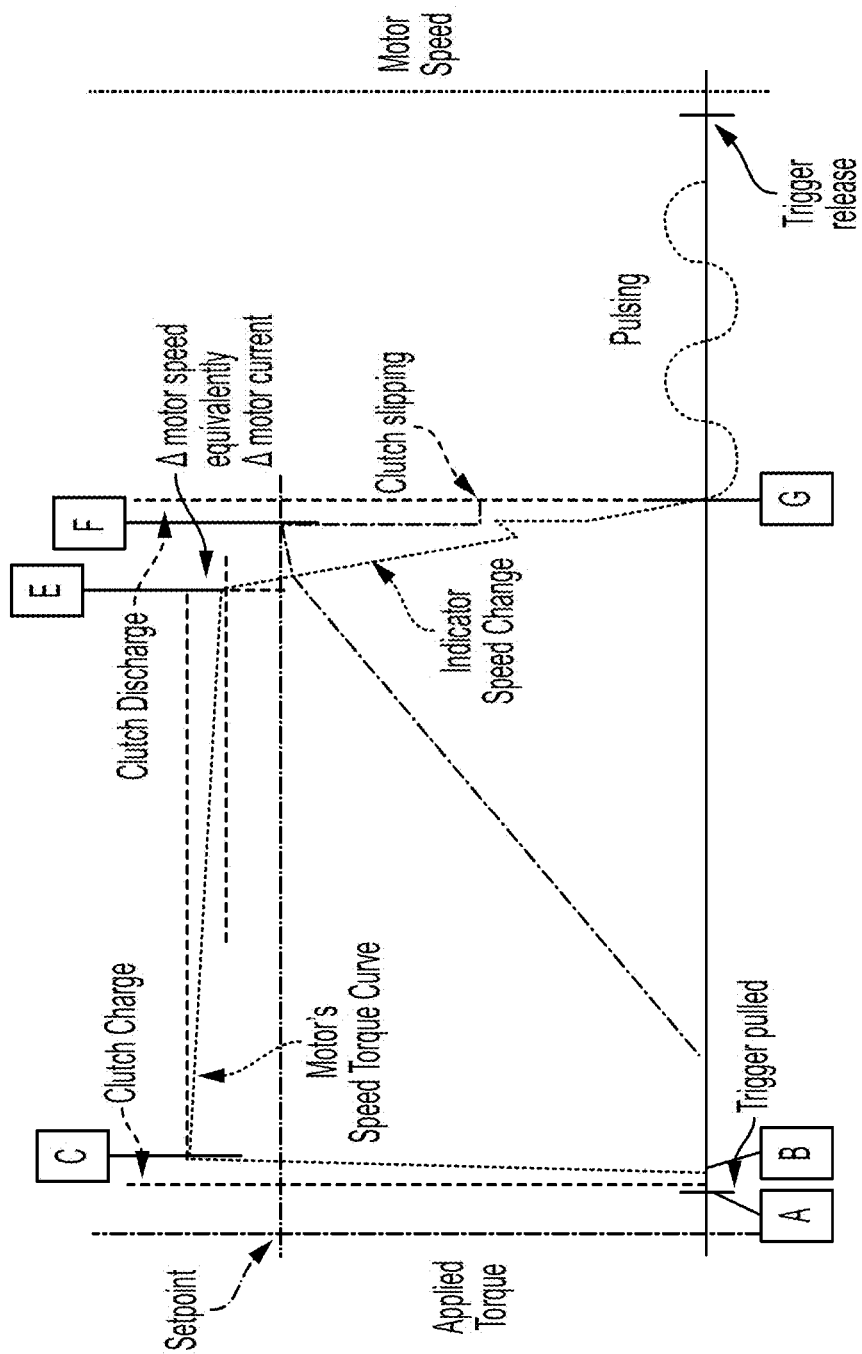
FIG. 24 shows an exemplary graphical representation of an operation of an exemplary power tool with an exemplary electrostatic clutch according to various embodiments of the present patent application, where time is shown on the x-axis and applied torque and motor speed are shown on the y-axis.

In one embodiment, referring to FIG. 24, a method of operating the power tool 10 is provided. As discussed in various embodiments of the present patent application, the power tool 10 includes the motor 15, the electrostatic clutch assembly 18, the output spindle 68, and the control circuit 50. The electrostatic clutch assembly 18 includes the first electrode 304, the second electrode 306 and the dielectric layer 308 arranged between the first electrode 304 and the second electrode 306. The electrostatic clutch assembly 18 is positioned between the motor 15 and the output spindle 68.

The method of operating the power tool 10 includes actuating the motor 15, and applying a first voltage difference between the first electrode 304 and the second electrode 306. For example, in one embodiment, applying a first voltage to the first electrode 304 and a second voltage to the second electrode 306, where the first voltage is different from the second voltage. The method of operating the power tool 10 also includes controlling the motor 15 to increase a torque applied to the output spindle 68 until the torque applied to the output spindle 68 reaches a first threshold value, where one of the first electrode 304 and the second electrode 306 rotationally slips relative to the other of the first electrode 304 and the second electrode 306 when the torque on the output spindle 68 exceeds the first threshold value. The method of operating the power tool 10 further includes discharging the first voltage from the first electrode 304 and the second voltage from the second electrode 306. The first threshold value may be interchangeably referred to as setpoint in FIG. 24. The torque applied to the output spindle 68 may be substantially same as the torque on one of the first electrode and the second electrode 304 and 306.

The method of operating the power tool 10 also includes initiating a protective action upon detecting that one of the first electrode 304 and the second electrode 306 rotationally slips relative to the other of the first electrode 304 and the second electrode 306. The initiating a protective action may include discharging the first voltage from the first electrode 304 and the second voltage from the second electrode 306. The initiating a protective action may include reducing or interrupting power delivery to the motor 15. The initiating a protective action may include braking the motor 15. The first threshold value may correspond to a holding force between the first electrode 304 and a second electrode 306. The holding force may correspond to a magnitude of a difference between the first voltage and the second voltage. The holding force is proportional to a square of the magnitude of the difference between the first voltage and the second voltage.

FIG. 24 shows a graphical illustration of an embodiment of behavior of the power tool system 10 in operation. Applied torque (i.e., measured in Nm) is shown on left-hand side Y-axis of the graph, while motor speed (i.e., measured in revolutions/minute (RPM)) is shown on the right-hand side Y-axis of the graph. Time (i.e., measured in seconds) is shown in the X-axis of the graph.

Referring to FIG. 24, at time A, the motor 15 is actuated. The motor 15 may be actuated by pulling/actuating the trigger assembly 24. When actuated/pulled the trigger assembly 24, for example, cooperates with the battery pack 26 to provide power to the motor and transmission assembly 14 (including the motor 15) in a manner that is generally well-known to a person of ordinary skill in the art. Also, from time A to time B, the control circuit 50 is configured to cause the first voltage is applied to the first electrode 304 and the second voltage is applied to the second electrode 306, where the first voltage is different from the second voltage, generating a first attractive force between the first and second electrodes 304, 306.

From time B to time E, the motor 15 is controlled (e.g., by actuating the trigger assembly 24) to increase a torque applied to the output spindle 68 until the torque applied to the output spindle 68 reaches a first threshold value, where one of the first electrode 304 and the second electrode 306 rotationally slips relative to the other of the first electrode 304 and the second electrode 306 when the torque on the output spindle 68 exceeds the first threshold value. Specifically, from time B to time C, the motor 15 ramps up to a full speed with very little torque is applied to the fastener. From time C to time E, fastener torque is increased and the motor speed of the motor 15 decreases. From time C to time E, the change in the motor speed of the motor 15 is equivalent to the changed in the motor current of the motor 15.

At time E, the motor speed of the motor 15 indicates that torque on the output spindle 68 has almost reached desired setpoint (i.e., the first threshold value). At this time E, the motor control circuit causes the motor speed to decrease so that the torque increases more gradually. At time F, the electrostatic clutch assembly 18 slips (i.e., the torque on the output spindle 68 exceeded the first threshold value), causing the motor speed to briefly increase. This brief increase in current can be detected by the current sense circuit, which can communicate to the controller that the clutch has reached its slip torque. At time F, the applied torque does not immediately drop to zero because there is still some non-static friction between the first and second electrodes 304, 306 of the electrostatic clutch assembly 18.

At time G, once slip of the clutch is detected, the controller causes the first and second electrodes 304, 306 of the electrostatic clutch assembly 18 to be discharged (e.g., by shorting them across the H-bridge) and the motor speed of the motor 15 and the applied torque both quickly drop to zero.

After time G, the motor 15 may be controlled for providing feedback to a user. For example, after time G, in one embodiment, the motor 15 may be pulsed to provide haptic feedback to the user. In another embodiment, the haptic feedback to the user may be provided by a vibrator. Alternatively, or in addition, a visual feedback or an acoustic/a sound feedback may be provided to the user.

Figure 28B:
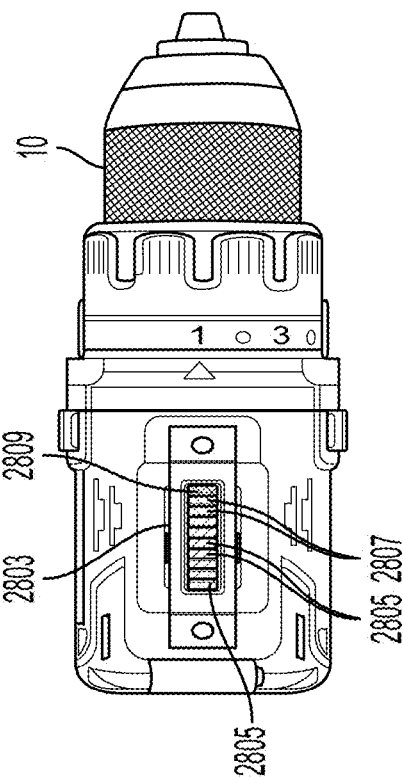
FIGS. 28A and 28B show exemplary power tools with exemplary indicators of slip indicating achieved torque setting according to various embodiments of the present patent application.
Figure 28A:
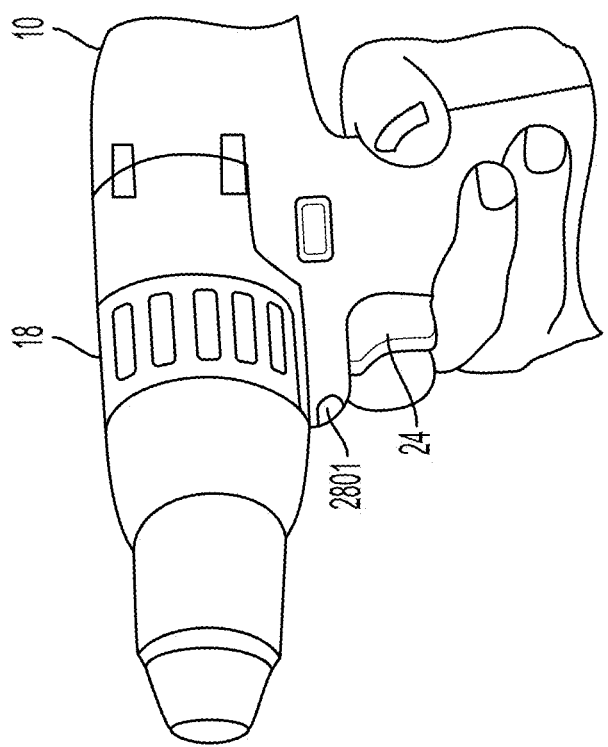

FIGS. 28A and 28B show various exemplary indicators of slip indicating achieved torque setting. For example, as shown in FIG. 28A, the indicators may be configured to provide visual feedback to the user, including, switching the light(s) 2801 on and off, change in color of the light(s) 2801, change in the brightness of the light(s) 2801, flashing/strobing of the light(s) 2801, etc. As shown in FIG. 28B, the indicators may include other visual indicators such as progress meter 2803 indicating the progress of the operation of the power tool 10. Such progress meter 2803 may include different colored light output (e.g., green, yellow and red) that are turned on based on and to indicate the progress of the operation of the power tool 10. Green colored light output 2805 may be turned on until a torque applied to the output spindle 68 below a first threshold value, yellow colored light output 2807 may be turned on when the torque applied to the output spindle 68 is approaching the first threshold value, and red colored light output 2809 may be turned on when the torque applied to the output spindle 68 exceeds the first threshold value.

After, providing the feedback (e.g., pulsed/haptic, visual, acoustic/sound) to the user, the trigger assembly 24 of the power tool 10 may be released.

Figure 27:
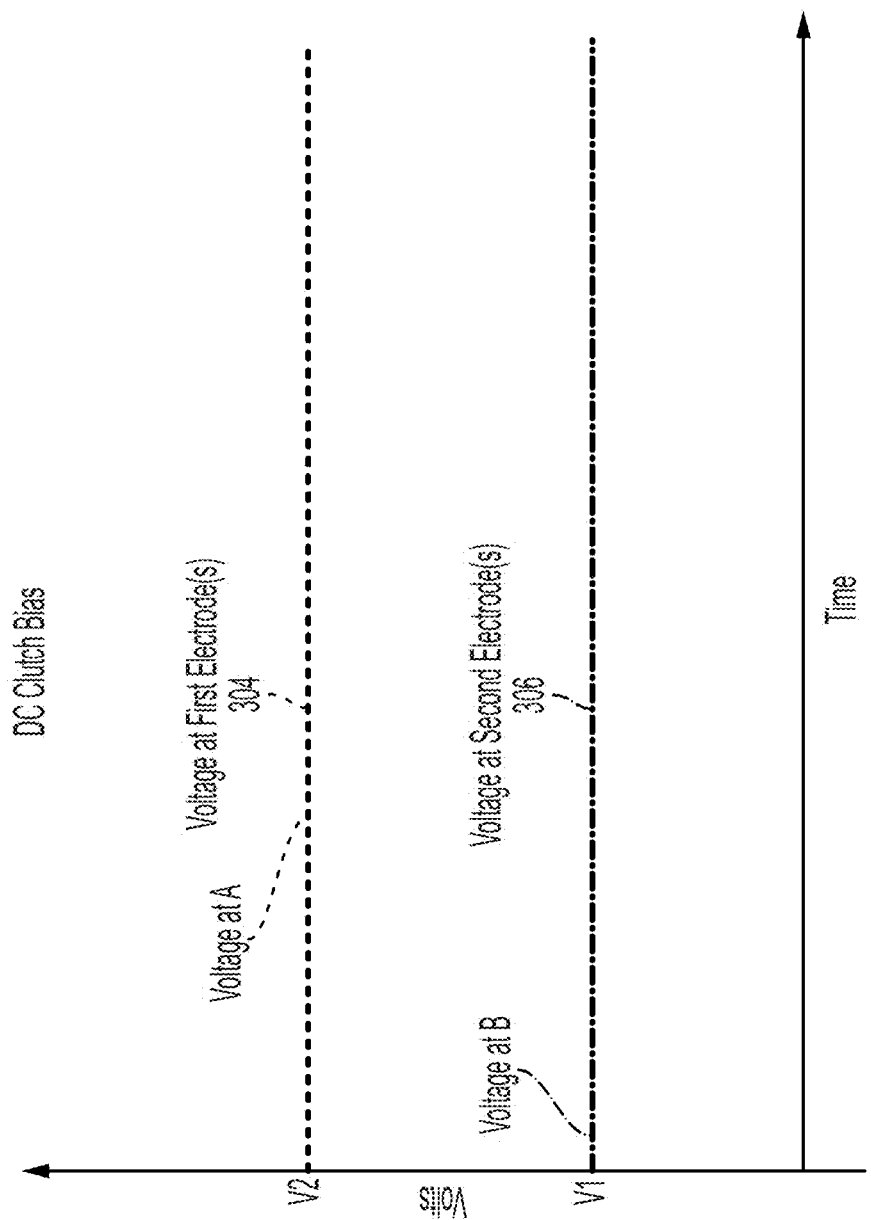
FIG. 27 shows a graphical representation of an operation of an electrostatic clutch assembly in a torque-limit mode according to various embodiments of the present patent application.

The operation of the electrostatic clutch assembly 18 in a torque-limited mode is shown in FIG. 27. FIG. 27 shows a graphical illustration of the operation of the electrostatic clutch assembly 18 in the torque-limited mode. Voltage (i.e., measured in volts) is shown on the left-hand side Y-axis, while time (i.e., measured in seconds) is shown in the X-axis of the graph. A voltage potential is applied to the electrostatic clutch assembly 18 between the plurality of electrodes 304 (e.g., disc stack A) and the plurality of electrodes 306 (e.g., disc stack B). In one embodiment, the plurality of electrodes may be referred to as disc stack (e.g., a stack of disc electrodes), the plurality of second electrodes 306 may be referred to as disc stack B, and the plurality of second electrodes 304 may be referred to as disc stack A in the discussions for FIGS. 27 and 29-31.

The voltage potential may include a voltage difference between voltage V1 that is applied to the plurality of electrodes 306 (e.g., disc stack B) and voltage V2 that is applied to the plurality of electrodes 304 (e.g., disc stack A). As shown in FIG. 27, the voltage V1 that is applied to the plurality of electrodes 306 (e.g., disc stack B) is different from the voltage V2 that is applied to the plurality of electrodes 304 (e.g., disc stack A).

The higher the voltage potential between the plurality of electrodes 304 (e.g., disc stack A) and the plurality of electrodes 306 (e.g., disc stack B), the greater the frictional torque coupling between the plurality of electrodes 304 (e.g., disc stack A) and the plurality of electrodes 306 (e.g., disc stack B). The voltage potential applied to the plurality of electrodes 304 (e.g., disc stack A) and the plurality of electrodes 306 (e.g., disc stack B) is proportional to the frictional coupling between the plurality of electrodes 304 (e.g., disc stack A) and the plurality of electrodes 306 (e.g., disc stack B), and thus a breakaway torque may be configured for the system.

In the power tool 10, the controller/control circuit 50 may be configured to adjust the DC amplitude of the high voltage power supply 2106. This allows the user to select a breakaway torque setpoint. As torque builds on the output shaft/spindle 68 in the power tool 10, the frictional coupling is eventually overcome causing a slip between the plurality of electrodes 304 (e.g., disc stack A) and the plurality of electrodes 306 (e.g., disc stack B). As a slip is detected, the voltage potential between the plurality of electrodes 304 (e.g., disc stack A) and the plurality of electrodes 306 (e.g., disc stack B) is immediately removed, decoupling the output shaft/spindle 68 from the motor 15 allowing the output shaft/spindle 68 to coast. This allows the electrostatic clutch assembly 18 to be operated as a torque limiting power tool (i.e., a torque wrench), or as a virtual shear-pin in a machine as a safety device.

Figure 29:
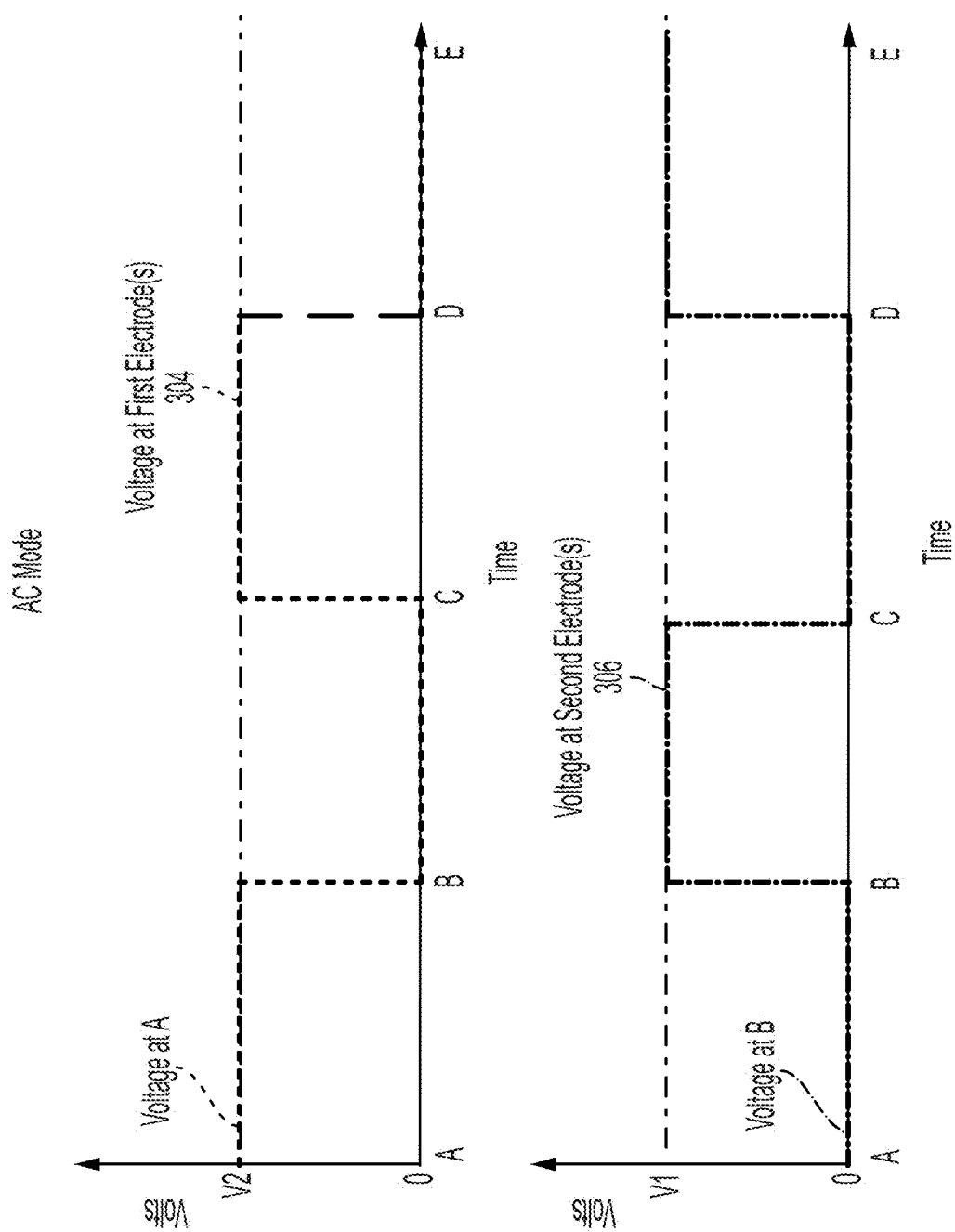
FIG. 29 shows a graphical representation of an operation of an electrostatic clutch assembly in a power tool in which alternating polarity is provided in each cycle according to various embodiments of the present patent application.

The operation of the electrostatic clutch assembly 18 in an AC anti-polarization mode is shown in FIG. 29. FIG. 29 shows a graphical illustration of reversing polarity across the electrodes 304, 306 of the electrostatic clutch assembly 18 in alternating cycles of operation. Voltage (i.e., measured in volts) is shown on the left-hand side Y-axis, while time (i.e., measured in seconds) is shown in the X-axis of the graph.

Certain materials used in the electrostatic clutch assembly 18 provide favorable attributes, but accumulate polarizing features limiting their function, after repeated operation in the same voltage polarity. Periodic reversal of the operational voltage polarity mitigates accumulated surface polarization. Reversal of operational polarity can be achieved using the switch circuit/H-Bridge 2102 to periodically transpose the voltage on the first and second electrodes 304 and 306 of the electrostatic clutch assembly 18. This is descried in detail above in FIG. 21 and with respect to the operation of the switch circuit/H-Bridge 2102.

In one embodiment, in the power tool 10, the operational voltage polarity reversal can be applied instantaneously and periodically during the operation of the power tool 10 while maintaining the potential (and thus the attractive force) between the he first and second electrodes 304 and 306 of the electrostatic clutch assembly 18. In another embodiment, the operational voltage polarity reversal can be applied during the off time between pulls of the trigger assembly 24, beginning each tool use cycle with an applied polarity opposite the previous.

For example, as shown in FIG. 29, from time A to time B, voltage that is applied to the second plurality of electrodes 306 (e.g., disc stack B) is zero, while voltage that is applied to the first plurality of electrodes 304 (e.g., disc stack A) is V2. This is the same from time C to time D.

From time B to time C, voltage that is applied to the second plurality of electrodes 306 (e.g., disc stack B) is V1, while voltage that is applied to the first plurality of electrodes 304 (e.g., disc stack A) is zero. This is the same from time D to time E.

In another embodiment, not shown, from time A to time B, voltage that is applied to the second plurality of electrodes 306 (e.g., disc stack B) is V1, while voltage that is applied to the first plurality of electrodes 304 (e.g., disc stack A) is zero. This is the same from time C to time D.

From time B to time C, voltage that is applied to the second plurality of electrodes 306 (e.g., disc stack B) is zero, while voltage that is applied to the first plurality of electrodes 304 (e.g., disc stack A) is V2. This is the same from time D to time E.

Figure 30:
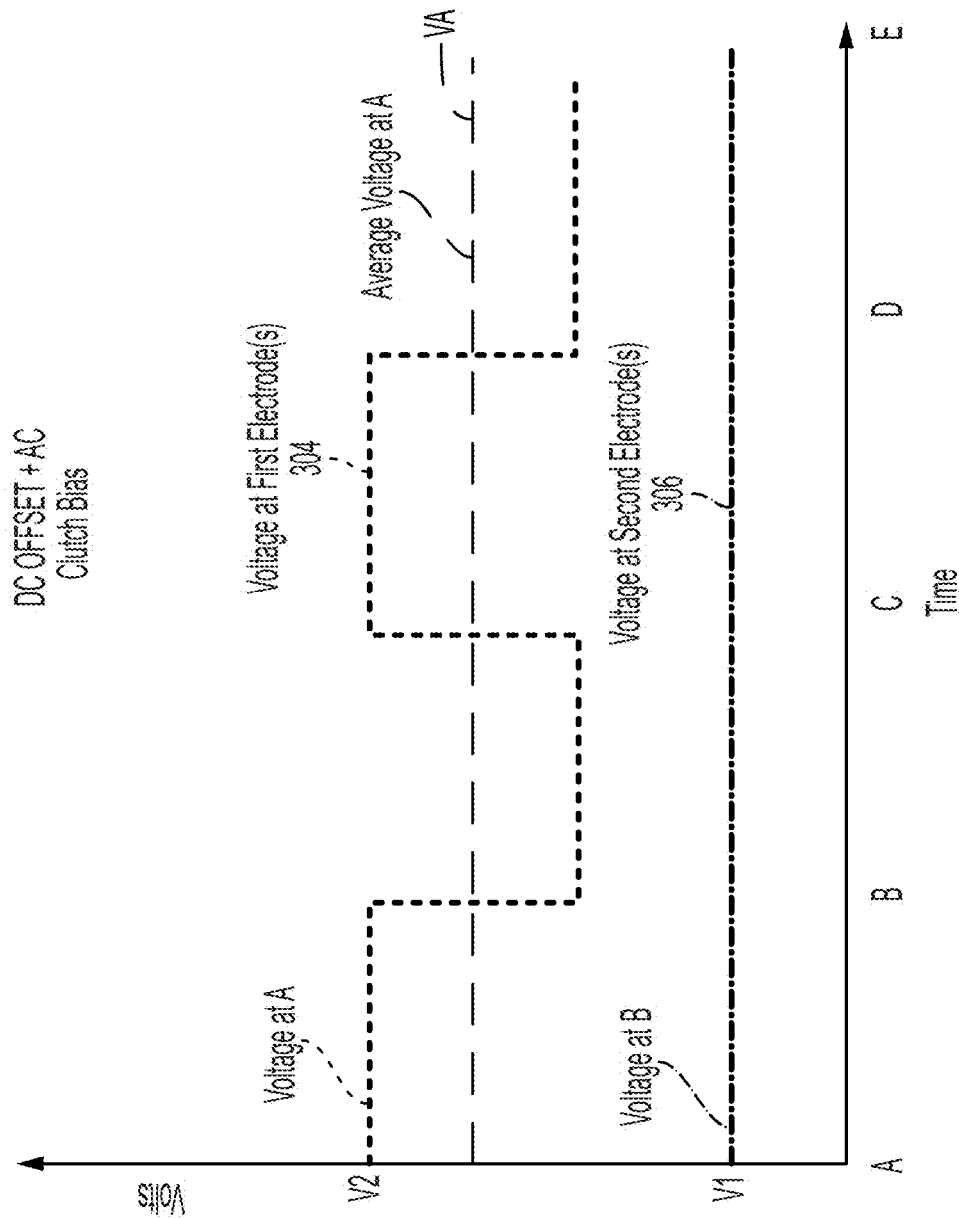
FIG. 30 shows a graphical representation of an operation of an electrostatic clutch assembly in a power tool according to various embodiments of the present patent application, where short intervals of slip of the electrostatic clutch assembly followed by re-engagement is shown so as to prevent a fastener bit of the power tool from camming out or stripping a fastener head.

The operation of the electrostatic clutch assembly 18 in an anti-cam-out mode is shown in FIG. 30. FIG. 30 shows a graphical representation of the operation of the electrostatic clutch assembly 18 in the anti-cam-out mode. That is, FIG. 30 shows a graphical representation of short intervals of slip of the electrostatic clutch assembly 18 followed by re-engagement to prevent a fastener bit from camming out of or stripping the fastener head. Voltage (i.e., measured in volts) is shown on the left-hand side Y-axis of the graph, while time (i.e., measured in seconds) is shown in the X-axis of the graph.

The electrostatic clutch assembly 18 may be operated with controlled modulation while driving a screw/fastener so as to prevent cam-out. The electrostatic clutch assembly 18 may be driven at a torque setpoint, while using the control circuit 50 to monitor the motor speed (e.g., see M3 using 2104/2104S in FIG. 21) of the motor 15 for a sudden acceleration. Sudden acceleration of the motor 15 (in the absence of a detected slip of the electrostatic clutch assembly 18) while driving a fastener load is indicative of cam-out (i.e., slipping and displacement of the drive bit against the screw head). If the initiation of a cam-out event is detected, the clutch control voltage is lowered slightly using the setpoint of the programmable power supply, allowing the electrostatic clutch assembly 18 to slip (i.e., rather than at the bit-to-fastener interface). This intentional momentary slip of the electrostatic clutch assembly 18 is configured to allow the relief of the cam-out forces, correcting the engagement of the tool bit to the fastener. This process can be repeated multiple times as necessary in the driving of a fastener, allowing aggressive driving of a fastener without damage.

In FIG. 30, the voltage that is applied to the plurality of electrodes 304 (e.g., disc stack A) is controllably modulated while driving a screw/fastener so as to prevent cam-out. That is, the voltage that is applied to the first plurality of electrodes 304 (e.g., disc stack A) is high and at voltage V2 from time A to time B and from time C to time D and is low or zero at voltage V3 from time B to time C and from time D to time E such that the average voltage $V_A$ is applied to the first plurality of electrodes 304 (e.g., disc stack A). Also, as shown in FIG. 30, voltage V1 is applied to the second plurality of electrodes 306 (e.g., disc stack B) and may be maintained constant.

In another embodiment, not shown, as would be appreciated by a person of ordinary skill in the art, the voltage that is applied to the second plurality of electrodes 306 (e.g., disc stack B) may be controllably modulated while driving a screw/fastener so as to prevent cam-out. That is, the voltage that is applied to the second plurality of electrodes 306 (e.g., disc stack B) is high and at voltage V1 from time A to time B and from time C to time D and is low or zero at voltage V3 from time B to time C and from time D to time E such that the average voltage (e.g., (not shown)) is applied to the plurality of electrodes 306 (e.g., disc stack B). In such an embodiment, voltage V2 is applied to the first plurality of electrodes 304 (e.g., disc stack A) and may be maintained constant.

In yet another embodiment, the voltage applied to the electrostatic clutch assembly 18 may also be controlled by varying the width of the applied pulses and thereby varying the average voltage $V_A$ applied to the electrodes 304, 306 of the electrostatic clutch assembly 18.

Figure 31:
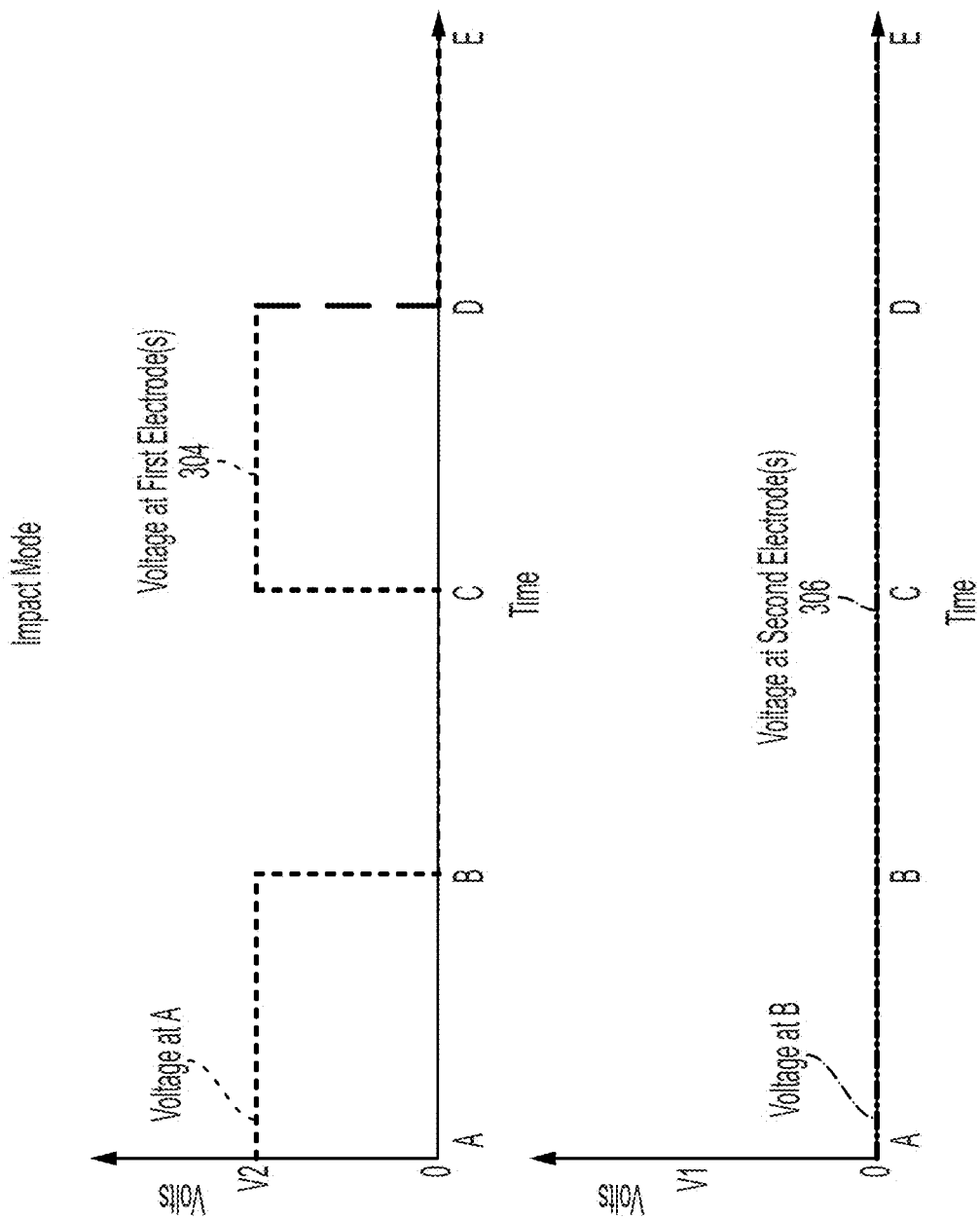
FIG. 31 shows a graphical representation of an operation of an electrostatic clutch assembly in an impact power tool according to various embodiments of the present patent application, where short intervals of slip of the electrostatic clutch assembly followed by re-engagement is shown to simulate operation of an impact mechanism in a direct drive power tool.

The operation of the electrostatic clutch assembly 18 in an impact mode is shown in FIG. 31. FIG. 31 shows a graphical representation of the operation of the electrostatic clutch assembly 18 in the impact mode. That is, FIG. 31 shows a graphical representation of short intervals of slip of the electrostatic clutch assembly 18 followed by re-engagement to simulate operation of an impact mechanism in a direct drive power tool. Voltage (i.e., measured in volts) is shown on the left-hand side Y-axis of the graph, while time (i.e., measured in seconds) is shown in the X-axis of the graph.

The electrostatic clutch assembly 18 may be repeatedly engaged and disengaged while driving a fastener, creating a virtual impact mechanism under electronic control. This may be accomplished by using the H-Bridge/switch circuit 2102 to fully remove and restore the voltage potential on the first electrodes 304 (i.e., disc stack A) and the second electrodes 306 (i.e., disc stack B) of the electrostatic clutch assembly 18 repeatedly with a given period and duty cycle. This impact mode could likewise be employed to create a virtual hammer drill mechanism, by limiting the off time of the duty cycle to something significantly less than 50% (i.e., conserving forward momentum, while still introducing an impulse event).

In FIG. 31, the voltage that is applied to the plurality of electrodes 304 (e.g., disc stack A) is fully removed and restored repeatedly with a given period and duty cycle. For example, a voltage V2 is applied to the plurality of first electrodes 304 (e.g., disc stack A) from time A to time B and from time C to time D, while the voltage is reduced or fully removed from the first plurality of electrodes 304 (e.g., disc stack A) from time B to time C and from time D to time E. As shown in FIG. 31, the voltage that is applied to the second plurality of electrodes 306 (e.g., disc stack B) is maintained constant, for example, at zero.

In another embodiment, not shown, the voltage that is applied to the second plurality of electrodes 306 (e.g., disc stack B) may be fully removed and restored repeatedly with a given period and duty cycle. For example, a voltage V1 is applied to the second plurality of electrodes 306 (e.g., disc stack B) from time A to time B and from time C to time D, while the voltage is fully removed from the first plurality of electrodes 304 (e.g., disc stack B) from time B to time C and from time D to time E. In such an embodiment, the voltage that is applied to the plurality of electrodes 304 (e.g., disc stack A) is maintained constant.

In one embodiment, an electric field above a first predetermined threshold is applied across the first electrode 304 and the second electrode 306 causing a first electrostatic force between the first electrode 304 and the second electrode 306 to rotationally couple the shaft 302 and the clutch housing 310 of the electrostatic clutch assembly 18 such that the shaft 302 and the clutch housing 310 of the electrostatic clutch assembly 18 rotate together at the same velocity. An electric field below a second predetermined threshold between the first electrode 304 and the second electrode 306 causes one of the shaft 302 and the clutch housing 310 of the electrostatic clutch assembly 18 to be rotationally decoupled from the other of the shaft 302 and the clutch housing 310 of the electrostatic clutch assembly 18. An electric field between the first predetermined threshold and the second predetermined threshold is applied across the first electrode 304 and the second electrode 306 causing a second electrostatic force between the first electrode 304 and the second electrode 306 to rotationally couple the output member 68 with the motor and transmission assembly 14 such that the output member 68 rotates together at the same velocity when the torque therebetween is below a set torque and to decouple the output member 68 from the motor and transmission assembly 14 so that the output member 68 can rotate at a lower or zero velocity while the motor and transmission assembly 14 continues to rotate at a higher velocity when the torque therebetween is above the set torque.

When the electrostatic clutch assembly 18 is in a clutch mode and when the torque between the output shaft 68 and the motor and transmission assembly 14 is above the set torque, the velocity of the output shaft 68 is zero. When the electrostatic clutch assembly 18 is in the clutch mode, the first electrode 304 and the second electrode 306 of the electrostatic clutch assembly 18 are variably attracted to each other. When the electrostatic clutch assembly 18 is in the clutch mode, the first electrode 304 and the second electrode 306 of the electrostatic clutch assembly 18 are positioned in such a way that no gap (i.e., only dielectric material layer 308) exists between surfaces of the first electrode 304 and the second electrode 306 that face each other.

In one embodiment, the clutch mode of the electrostatic clutch assembly 18 may include a first mode of operation and a second mode of operation.

In the first mode of operation, the control circuit 50 causes a first voltage to be applied across the first electrode 304 and a second voltage with a polarity opposite a polarity the first voltage to be applied to the second electrode 306, generating a first attractive force between the first and second electrodes 304, 306, which causes the output member 68 to rotate together with the motor and transmission assembly 14 when a torque on the output member 68 is less than or equal to a first threshold value (e.g., when the torque on the output member is such that a shear force or torque about the rotational axis of the output member is less than or equal to the attractive force between the electrodes 304, 306) and which causes one of the shaft 302 and the clutch housing 310 to rotationally slip relative to the other of the shaft 302 and the clutch housing 310 when the torque on the output member 68 exceeds the first threshold value (e.g., when the torque on the output member is such that a shear force or torque about the rotational axis of the output member is greater than the attractive force between the electrodes), interrupting torque transmission from the motor and transmission assembly 14 to the output member 68. In one embodiment, the first threshold corresponds to the first attractive force.

In one embodiment, in the second mode of operation, the control circuit 50 causes a third voltage to be applied across the first electrode 304 and a fourth voltage with a polarity opposite a polarity the third voltage to be applied to the second electrode 306, generating a second attractive force between the first and second electrodes 304, 306, which causes one of the shaft 302 and the clutch housing 310 to rotate together with the other of the shaft 302 and the clutch housing 310 when a torque on the output member 68 is less than or equal to a second threshold value and which causes one of the shaft 302 and the clutch housing 310 to (e.g., rotationally) slip or rotate relative to the other of the shaft 302 and the clutch housing 310 when the torque on the output member 68 exceeds the second threshold value, interrupting torque transmission from the input member 66 to the output member 68. That is, in one embodiment, in the second mode of operation, the control circuit 50 causes the third voltage to be applied to the first electrode 304 and a different fourth voltage to be applied to the second electrode 306.

In one embodiment, the third voltage is greater than the first voltage, the fourth voltage is greater than the second voltage, the second attractive force is greater than the first attractive force, and the second threshold value is greater than the first threshold value. In one embodiment, a second voltage difference between the third voltage and the fourth voltage is greater than a first voltage difference between the first voltage and the second voltage. The power tool 10 may further include a selector switch coupled to the housing 12 that is actuatable by a user to select between the first and second modes of operation.

In one embodiment, in a third mode of operation, the control circuit 50 causes a zero voltage difference to be applied to the first and second electrodes 304, 306, allowing the second electrode to rotate relative to the first electrode and preventing torque transmission from one of the shaft 302 and the clutch housing 310 to the other of the shaft 302 and the clutch housing 310. In one embodiment, the control circuit 50 is configured to automatically switch from the first mode to the third mode upon sensing (e.g., by a sensor) that one of the shaft 302 and the clutch housing 310 has rotationally slipped or rotated relative to the other of the shaft 302 and the clutch housing 310.

In one embodiment, in a fourth mode of operation, the electrostatic clutch assembly 18 is configured to prevent interruption of torque transmission from one of the shaft 302 and the clutch housing 310 to the other of the shaft 302 and the clutch housing 310.

In one embodiment, in the fourth mode of operation, the control circuit may cause a fifth voltage to be applied across the first electrode 304 and a different sixth voltage to be applied to the second electrode 306, generating a third attractive force between the first and second electrodes 304, 306, the third attractive force exceeding a torque on the output member 68 during operation of the power tool 10. The second voltage may have a polarity opposite a polarity of the first voltage. In one embodiment, the first voltage difference is user selectable to adjust the first attractive force and the first threshold value. In one embodiment, a greater voltage difference corresponds to a greater first attractive force and a greater first threshold value. In one embodiment, the electrostatic clutch assembly 18 is held in the clutch mode such that when the working element meets a dynamic impact event, the electrostatic clutch assembly 18 slips or rotates. Thus, this configuration provides protection to the elements of the power tool, e.g., a mower blade striking a rock.

When energized, the electrodes 304, 306 rotate together as a unit until the output torque on the chuck/tool holder 22 exceeds the holding force of the electrostatic films/layers. At this time, the electrodes 304, 306 rotate relative to one another with only a small frictional force between them. The input electrode 304, 306 will continue to rotate, while the output electrode 304, 306 coasts to rest.

In one embodiment, the power tool 10 may further comprise a selector switch actuatable by a user to select between the first and second modes of operation. In a third mode of operation, the control circuit 50 causes zero voltage to be applied to the first and second electrodes 304, 306, preventing motion from being transmitted from the motor and transmission assembly 14 to the output member 68. In one embodiment, the control circuit 50 is configured to automatically switch from the first mode to the third mode upon sensing that the motion transmission from the motor and transmission assembly 14 to the output member 68 has been interrupted.

Although the present patent application has been described in detail for the purpose of illustration, it is to be understood that such detail is solely for that purpose and that the present patent application is not limited to the disclosed embodiments, but, on the contrary, is intended to cover modifications and equivalent arrangements that are within the spirit and scope of the appended claims. In addition, it is to be understood that the present patent application contemplates that, to the extent possible, one or more features of any embodiment can be combined with one or more features of any other embodiment.

The invention claimed is:

1. A power tool comprising:
   a power tool housing;
   a motor received in the power tool housing and configured to be driven by a power source;
   an end effector configured to perform an operation on a workpiece;
   an electrostatic clutch assembly disposed in the power tool housing and between the motor and the end effector, the electrostatic clutch assembly comprising:
      a shaft;
      a first electrode and a second electrode axially arranged along an axial direction of the shaft, the first electrode and the second electrode being substantially parallel and adjacent to each other;
      a dielectric layer arranged between the first electrode and the second electrode;
      a clutch housing containing the first electrode, the second electrode, and at least a portion of the shaft;
      wherein the first electrode is non-rotatably coupled to the clutch housing and is axially movable relative to the clutch housing;
      wherein the second electrode is non-rotatably coupled to the shaft and is axially movable relative to the shaft; and
   a control circuit disposed in the power tool housing and operatively cooperable with the electrostatic clutch assembly,
   wherein the control circuit causes a first voltage difference to be applied between the first electrode and the second electrode, generating a first attractive force between the first and second electrodes, causing the shaft and the clutch housing to be coupled to each other when a torque on one of the shaft or the clutch housing is less than or equal to a first threshold value, and allowing the one of the shaft or the clutch housing to rotationally slip relative to the other of the shaft or the clutch housing when the torque on the one of the shaft or the clutch housing exceeds the first threshold value,
   wherein the end effector is mounted to an output spindle of the power tool, and
   wherein the power tool includes:
      the motor, and
      an impact mechanism that is configured to apply intermittent rotational impacts to the output spindle.

2. The power tool of claim 1, wherein the shaft and the clutch housing are non-rotatably coupled to each other when the torque on the shaft is less than or equal to the first threshold value.

3. The power tool of claim 1, wherein the first electrode is one of a plurality of first electrodes in the electrostatic clutch assembly, wherein the second electrode is one of a plurality of second electrodes in the electrostatic clutch assembly, wherein the first electrode and the second electrode form an electrode pair, wherein the electrode pair is one of a plurality of electrode pairs that are axially arranged along the axial direction of the shaft, and wherein the plurality of electrode pairs is substantially parallel to each other.

4. The power tool of claim 1, wherein each first electrode of the plurality of electrode pairs includes an annular plate member, and each second electrode of the plurality of electrode pairs includes an annular plate member.

5. The power tool of claim 3, wherein each first electrode of the plurality of electrode pairs has a first surface and a second surface and each second electrode of the plurality of electrode pairs has a first surface and a second surface that is facing the first surface of each first electrode.

6. The power tool of claim 5, wherein the dielectric layer is disposed on surfaces of the first electrode and the second electrode that face each other.

7. The power tool of claim 5, wherein the electrostatic clutch assembly further comprises a conductive material on at least one of the first surface of each first electrode or the second surface of each second electrode.

8. The power tool of claim 7, wherein the conductive material is disposed on surfaces of each first electrode and each second electrode that face each other.

9. The power tool of claim 3, wherein the end effector includes a tool holder that is configured to receive a tool bit portion therein, wherein the shaft has a first portion and a second portion, wherein one of the first portion and the second portion of the shaft is operatively connected to each second electrode of the plurality of electrode pairs, and wherein the other of the first portion and the second portion of the shaft is operatively connected to the output spindle of the power tool.

10. The power tool of claim 1, wherein the impact mechanism is a rotational impact mechanism.

11. The power tool of claim 10, wherein the impact mechanism comprises a Pott-type impact mechanism, and wherein the other of the shaft or the clutch housing is operatively coupled to an output of the Pott-type impact mechanism.

12. The power tool of claim 11, wherein the Pott-type impact mechanism comprises a cam shaft rotationally driven by the motor, a hammer received at least partially over the cam shaft and operatively coupled to the cam shaft to be movable axially and rotationally relative to the cam shaft, an anvil, and a spring axially biasing the hammer toward the anvil, wherein, when the torque is at or below a threshold value, the cam shaft, the hammer, and the anvil rotate in unison, and wherein, when the torque exceeds the threshold value, the hammer moves axially and rotationally along the cam shaft to apply rotational impacts to the anvil, and wherein the other of the shaft or the clutch housing is operatively coupled to the anvil.

13. The power tool of claim 10, wherein the impact mechanism includes a twin hammer impact mechanism, and wherein the other of the shaft or the clutch housing is operatively coupled to an output of the twin hammer impact mechanism.

14. The power tool of claim 12, wherein the motor is an electric motor.

15. The power tool of claim 10, wherein the impact mechanism includes an oil pulse impact mechanism, and wherein the other of the shaft or the clutch housing is operatively coupled to an output of the oil pulse impact mechanism.

16. The power tool of claim 1, wherein the electrostatic clutch assembly is configured to receive an input torque from the impact mechanism and produce an output torque in response thereto, the output torque being limited to a maximum threshold value and transmitted to the output spindle of the power tool.

17. The power tool of claim 16, wherein the maximum threshold value is a fixed value.

18. The power tool of claim 16, wherein the maximum threshold value is configured to be adjusted dynamically.

19. The power tool of claim 16, wherein the maximum threshold value is a variable value.

20. The power tool of claim 16, wherein the maximum threshold value is a function of time.

\* \* \* \* \*